(12) United States Patent
Nam et al.

(10) Patent No.: US 10,708,028 B2
(45) Date of Patent: Jul. 7, 2020

(54) METHOD AND APPARATUS FOR REFERENCE SIGNALS IN WIRELESS SYSTEM

(71) Applicant: Samsung Electronics Co., Ltd., Gyeonggi-do (KR)

(72) Inventors: Young-Han Nam, Plano, TX (US); Hao Chen, Allen, TX (US); Boon Loong Ng, Plano, TX (US); Vikram Chandrasekhar, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/913,730

(22) Filed: Mar. 6, 2018

(65) Prior Publication Data

US 2018/0262313 A1 Sep. 13, 2018

Related U.S. Application Data

(60) Provisional application No. 62/468,670, filed on Mar. 8, 2017, provisional application No. 62/475,614, filed on Mar. 23, 2017, provisional application No. 62/484,193, filed on Apr. 11, 2017, provisional application No. 62/514,384, filed on Jun. 2, 2017, (Continued)

(51) Int. Cl.
*H04L 5/00* (2006.01)
*H04W 72/04* (2009.01)
*H04W 24/10* (2009.01)

(52) U.S. Cl.
CPC ............ *H04L 5/0053* (2013.01); *H04L 5/005* (2013.01); *H04L 5/0044* (2013.01); *H04W 24/10* (2013.01); *H04W 72/0446* (2013.01); *H04L 5/0007* (2013.01)

(58) Field of Classification Search
CPC ... H04L 5/0053; H04L 5/0048; H04L 5/0051; H04L 5/005; H04W 24/10; H04W 72/0446; H04W 72/04
See application file for complete search history.

(56) References Cited

U.S. PATENT DOCUMENTS

2011/0317657 A1* 12/2011 Chmiel ................... H04L 5/001 370/331
2012/0190356 A1* 7/2012 Zhao ..................... H04L 5/0035 455/422.1

(Continued)

OTHER PUBLICATIONS

Samsung et al.; "WF on CSI-RS Design"; 3GPP TSG RAN1 #88; R1-1703893; Athens, Greece; Feb. 13-17, 2017; 7 pages.

(Continued)

*Primary Examiner* — Michael Thier
*Assistant Examiner* — Nevena Zecevic Sandhu

(57) ABSTRACT

A method of user equipment (UE) is provided. The method comprises receiving, from a base station (BS), configuration information indicating one or more of first sets of CSI-RS configuration parameters; determining channel state information-reference signal (CSI-RS) resources per frequency in a wireless communication system including a plurality of cells; and determining the first sets of CSI-RS configuration parameters for the cells, respectively, each of the first sets of CSI-RS configuration parameters including a physical cell identifier for the respective cell.

18 Claims, 45 Drawing Sheets

Related U.S. Application Data provisional application No. 62/542,593, filed on Aug. 8, 2017, provisional application No. 62/543,704, filed on Aug. 10, 2017, provisional application No. 62/555,426, filed on Sep. 7, 2017, provisional application No. 62/556,749, filed on Sep. 11, 2017, provisional application No. 62/583,868, filed on Nov. 9, 2017, provisional application No. 62/587,853, filed on Nov. 17, 2017.

(56) References Cited

U.S. PATENT DOCUMENTS

| | | | |
|---|---|---|---|
| 2014/0362793 A1 | 12/2014 | Chai et al. | |
| 2015/0003271 A1* | 1/2015 | Park | H04L 5/0091 370/252 |
| 2015/0124896 A1* | 5/2015 | Jiang | H04W 16/10 375/260 |
| 2016/0119936 A1* | 4/2016 | Kim | H04J 11/0053 370/329 |
| 2016/0127095 A1* | 5/2016 | Chen | H04L 5/0048 370/329 |
| 2016/0174093 A1 | 6/2016 | Zhou et al. | |
| 2016/0301505 A1 | 10/2016 | Furuskog et al. | |
| 2016/0360454 A1* | 12/2016 | Soldati | H04W 48/12 |
| 2017/0064613 A1* | 3/2017 | Harada | H04W 16/32 |
| 2017/0078062 A1* | 3/2017 | Park | H04B 7/26 |
| 2018/0242324 A1* | 8/2018 | Luo | H04L 25/03866 |
| 2019/0052504 A1* | 2/2019 | Hayashi | H04L 5/001 |

OTHER PUBLICATIONS

InterDigital et al.; "WF on CSI-RS for sub-time unit"; 3GPP TSG RAN1 #88; Athens, Greece; Feb. 13-17, 2017; 3 pages.

International Search Report for PCT Patent Application No. PCT/KR2018/002784 dated Jun. 21, 2018; 3 pages.

Written Opinion of the International Searching Authority for PCT Patent Application No. PCT/KR2018/002784 dated Jun. 21, 2018; 6 pages.

"3rd Generation Partnership Project; Technical Specification Group Radio Access Network; Study on New Radio (NR) Access Technology Physical Layer Aspects (Release 14)," 3GPP TR 38.802, V1.1.0, Jan. 2017, 71 pages.

"3rd Generation Partnership Project; Technical Specification Group Radio Access Network; Study on Channel Model or Frequency Spectrum above 6GHz (Release 14)," 3GPP TR 38.900, V14.0.0, Jun. 2016, 77 pages.

LTE; Evolved Universal Terrestrial Radio Access (E-UTRA); Physical Channels and Modulation (3GPP TS 36.211 Version 13.0.0 Release 13), ETSI TS 136.211, V13.0.0, Jan. 2016, 143 pages.

LTE; Evolved Universal Terrestrial Radio Access (E-UTRA); Multiplexing and Channel Coding (3GPP TS 36.212 Version 13.0.0 Release 13), ETSI TS 136.212, V13.0.0, Jan. 2016, 123 pages.

LTE; Evolved Universal Terrestrial Radio Access (E-UTRA); Physical Layer Procedures (3GPP TS 36.213 Version 13.0.0 Release 13), ETSI TS 136.213, V13.0.0, May 2016, 328 pages.

LTE; Evolved Universal Terrestrial Radio Access (E-UTRA); Medium Access Control (MAC) Protocol Specification (3GPP TS 36.321 Version 13.0.0 Release 13), ETSI TS 136.321, V13.0.0, Feb. 2016, 84 pages.

LTE; Evolved Universal Terrestrial Radio Access (E-UTRA); Radio Resource Control (RRC) Protocol Specification (3GPP TS 36.331 Version 13.0.0 Release 13), ETSI TS 136.331, V13.0.0, Jan. 2016, 670 pages.

\* cited by examiner (a)

(b)

METHOD AND APPARATUS FOR REFERENCE SIGNALS IN WIRELESS SYSTEM

CROSS-REFERENCE TO RELATED APPLICATIONS AND CLAIM OF PRIORITY

The present application claims the benefit of U.S. Provisional Patent Application Ser. No. 62/468,670, filed on Mar. 8, 2017; U.S. Provisional Patent Application Ser. No. 62/475,614, filed on Mar. 23, 2017; U.S. Provisional Patent Application Ser. No. 62/484,193, filed on Apr. 11, 2017; U.S. Provisional Patent Application Ser. No. 62/514,384, filed on Jun. 2, 2017; U.S. Provisional Patent Application Ser. No. 62/542,593, filed on Aug. 8, 2017; U.S. Provisional Patent Application Ser. No. 62/543,704, filed on Aug. 10, 2017; U.S. Provisional Patent Application Ser. No. 62/555,426, filed on Sep. 7, 2017; U.S. Provisional Patent Application Ser. No. 62/556,749, filed on Sep. 11, 2017; U.S. Provisional Patent Application Ser. No. 62/583,868, filed on Nov. 9, 2017; and U.S. Provisional Patent Application Ser. No. 62/587,853, filed on Nov. 17, 2017. The contents of the above-identified patent documents are incorporated herein by reference.

TECHNICAL FIELD

The present application relates generally to wireless communication systems. More specifically, this disclosure relates to reference signal operation in next generation wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, a user equipment (UE) is provided. The UE includes a transceiver configured to receive, from a base station (BS), configuration information indicating one or more of first sets of CSI-RS configuration parameters. The UE further includes a processor that is operable connected to the transceiver and the processor is configured to determine channel state information-reference signal (CSI-RS) resources per frequency in a wireless communication system including a plurality of cells, and determine the first sets of CSI-RS configuration parameters for the cells, respectively, each of the first sets of CSI-RS configuration parameters including a physical cell identifier for the respective cell.

In another embodiment, a BS is provided. The BS includes a processor configured to configure CSI-RS resources per frequency in a wireless communication system including a plurality of cells, and configure first sets of CSI-RS configuration parameters for the cells, respectively, each of the first sets of CSI-RS configuration parameters including a physical cell identifier for the respective cell. The BS further includes a transceiver that is operably connected to the processor, and the transceiver is configured to transmit, to a UE, configuration information indicating one or more of the first sets of CSI-RS configuration parameters.

In yet another embodiment, a method of UE is provided. The method comprises receiving, from a BS, configuration information indicating one or more of first sets of CSI-RS configuration parameters; determining CSI-RS resources per frequency in a wireless communication system including a plurality of cells; and determining the first sets of CSI-RS configuration parameters for the cells, respectively, each of the first sets of CSI-RS configuration parameters including a physical cell identifier for the respective cell.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 45, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation;" 3GPP TS 36.212 v13.0.0, "E-UTRA, Multiplexing and Channel coding;" 3GPP TS 36.213 v13.0.0, "E-UTRA, Physical Layer Procedures;" 3GPP TS 36.321 v13.0.0, "E-UTRA, Medium Access Control (MAC) protocol specification;" and 3GPP TS 36.331 v13.0.0, "E-UTRA, Radio Resource Control (RRC) Protocol Specification," 3GPP TR 38.802 v1.1.0, "Study on New Radio Access Technology Physical Layer Aspects," and 3GPP TR 38.900 v14.0.0, "Study on Channel Model for Frequency Spectrum Above 6 GHz."

To meet the demand for wireless data traffic having increased since deployment of 4G communication systems, efforts have been made to develop an improved 5G or pre-5G communication system. Therefore, the 5G or pre-5G communication system is also called a "beyond 4G network" or "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
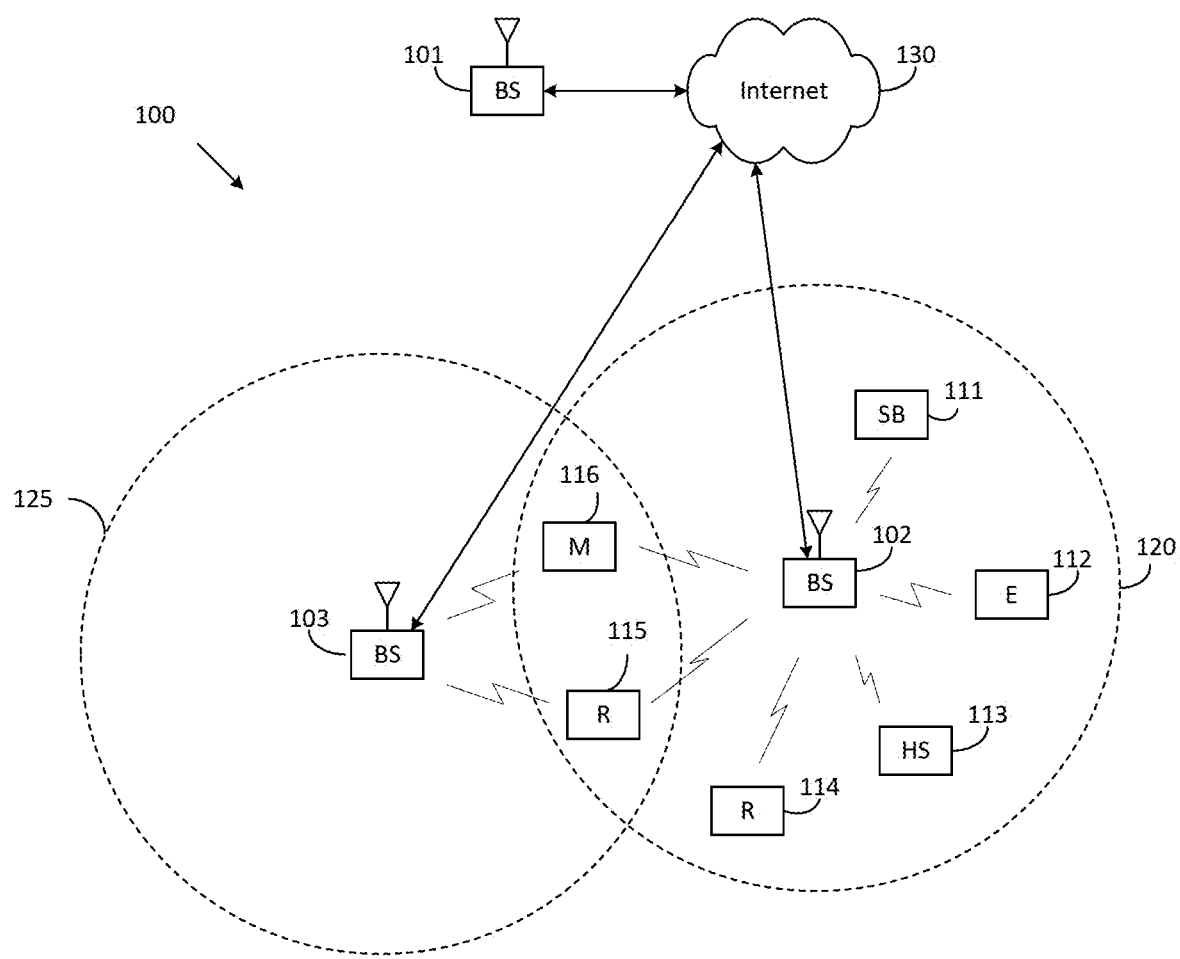
FIG. 1 illustrates an example wireless network according to embodiments of the present disclosure.
Figure 2:
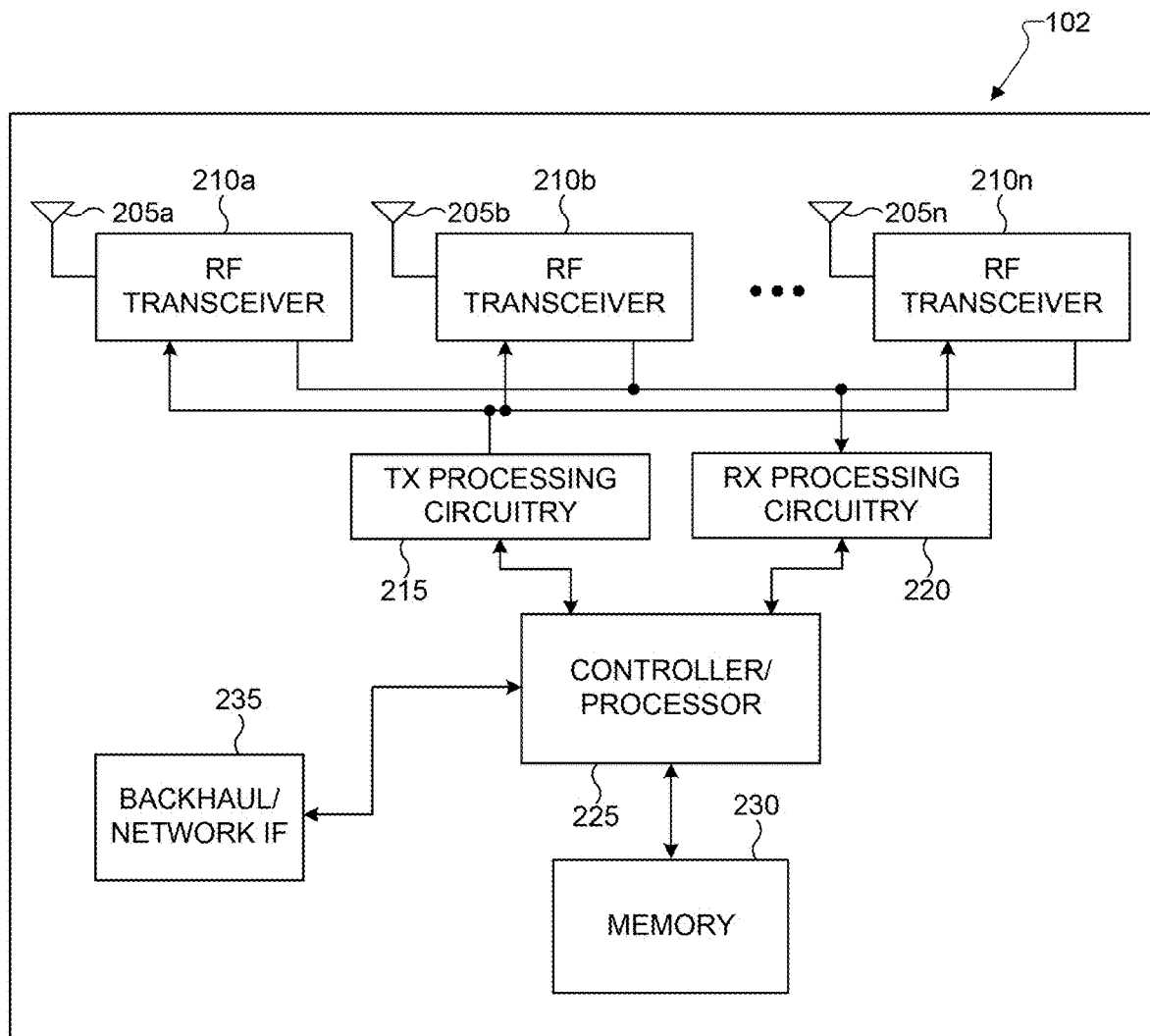
FIG. 2 illustrates an example eNB according to embodiments of the present disclosure.
Figure 3:
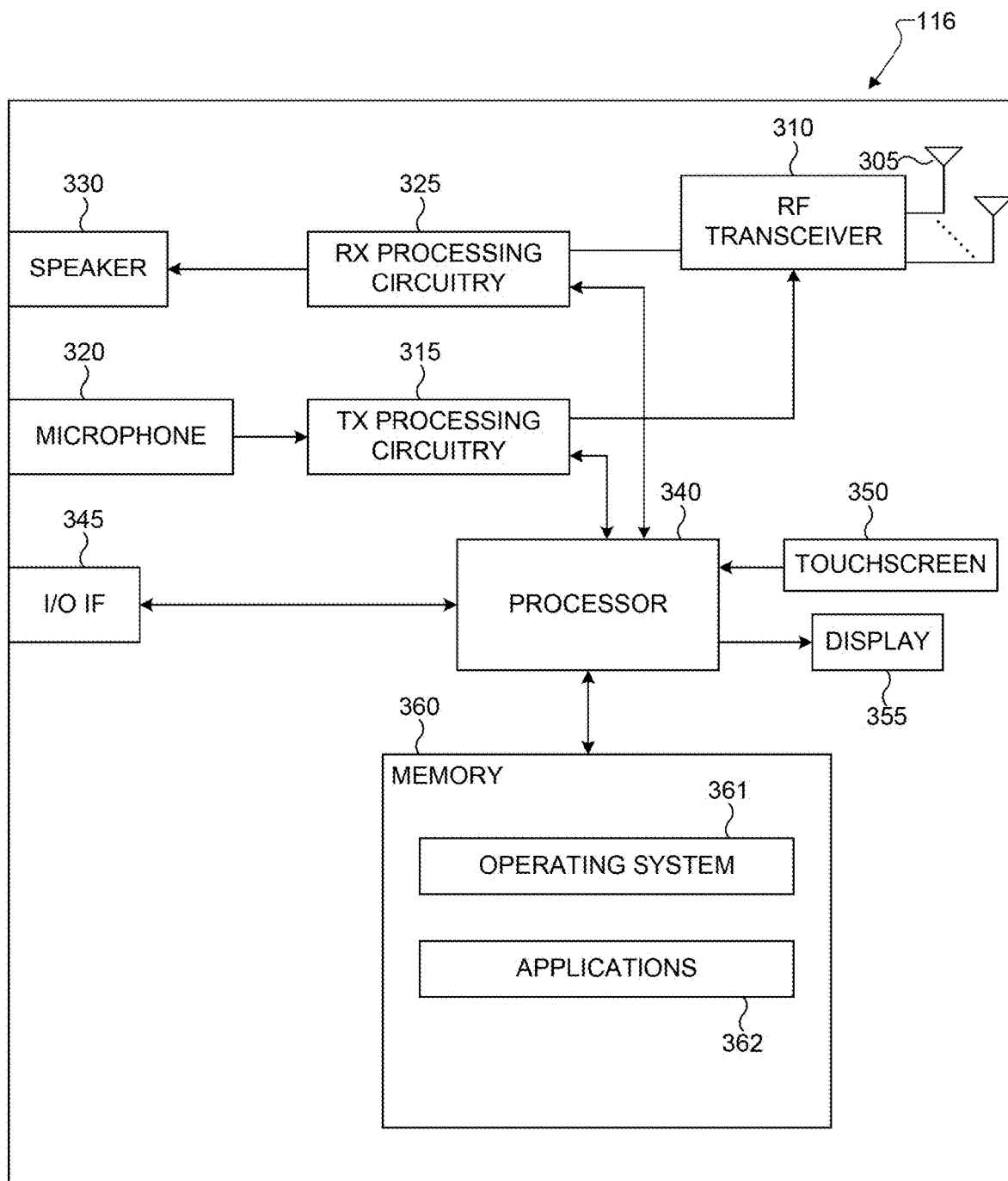
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal,"

"receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient CSI report in an advanced wireless communication system. In certain embodiments, and one or more of the eNBs 101-103 includes circuitry, programming, or a combination thereof, for efficient CSI report an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
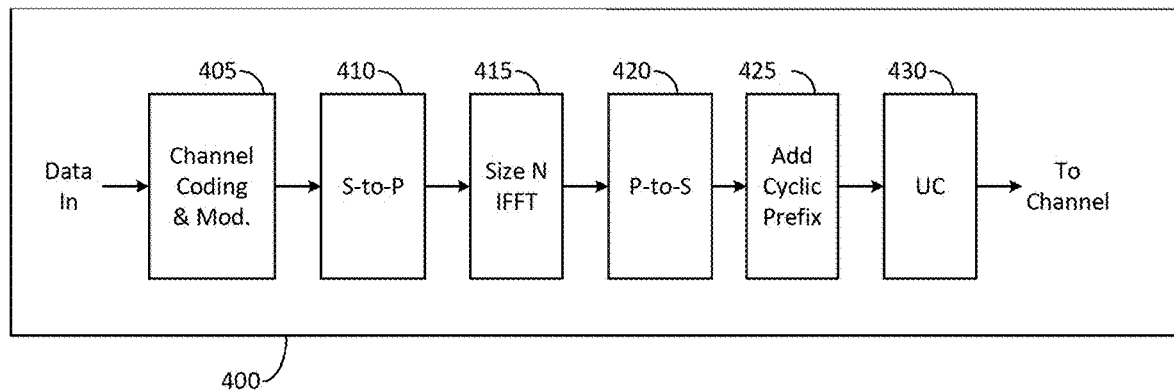
FIG. 4A illustrates an example high-level diagram of an orthogonal frequency division multiple access transmit path according to embodiments of the present disclosure.
Figure 4B:
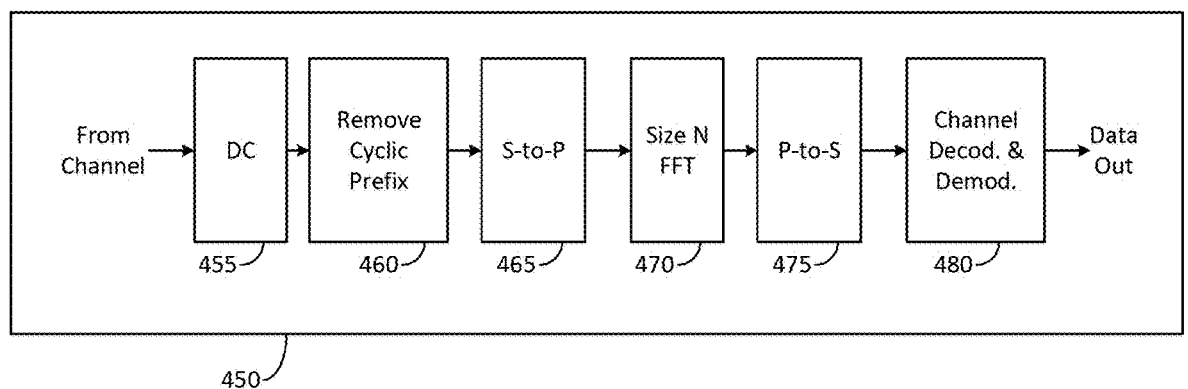
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

Figure 5:
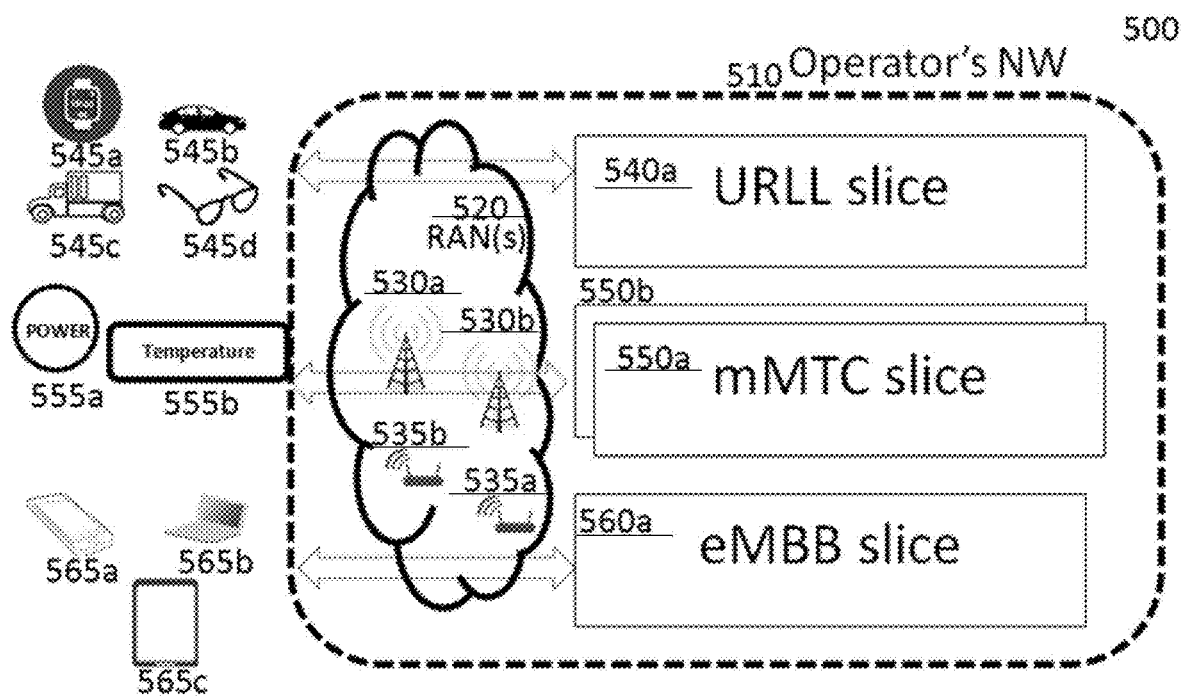
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530a, 530b, a plurality of small cell base stations 535a, 535b, a URLL slice 540a, a smart watch 545a, a car 545b, a, truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a scheme to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 are not necessarily associated with particular types of slices. For example, the cell phone 565a, the laptop 565b and the tablet 565c are associated with the eMBB slice 560a, but this is just for illustration and these devices can be associated with any types of slices.

In some embodiments, one device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
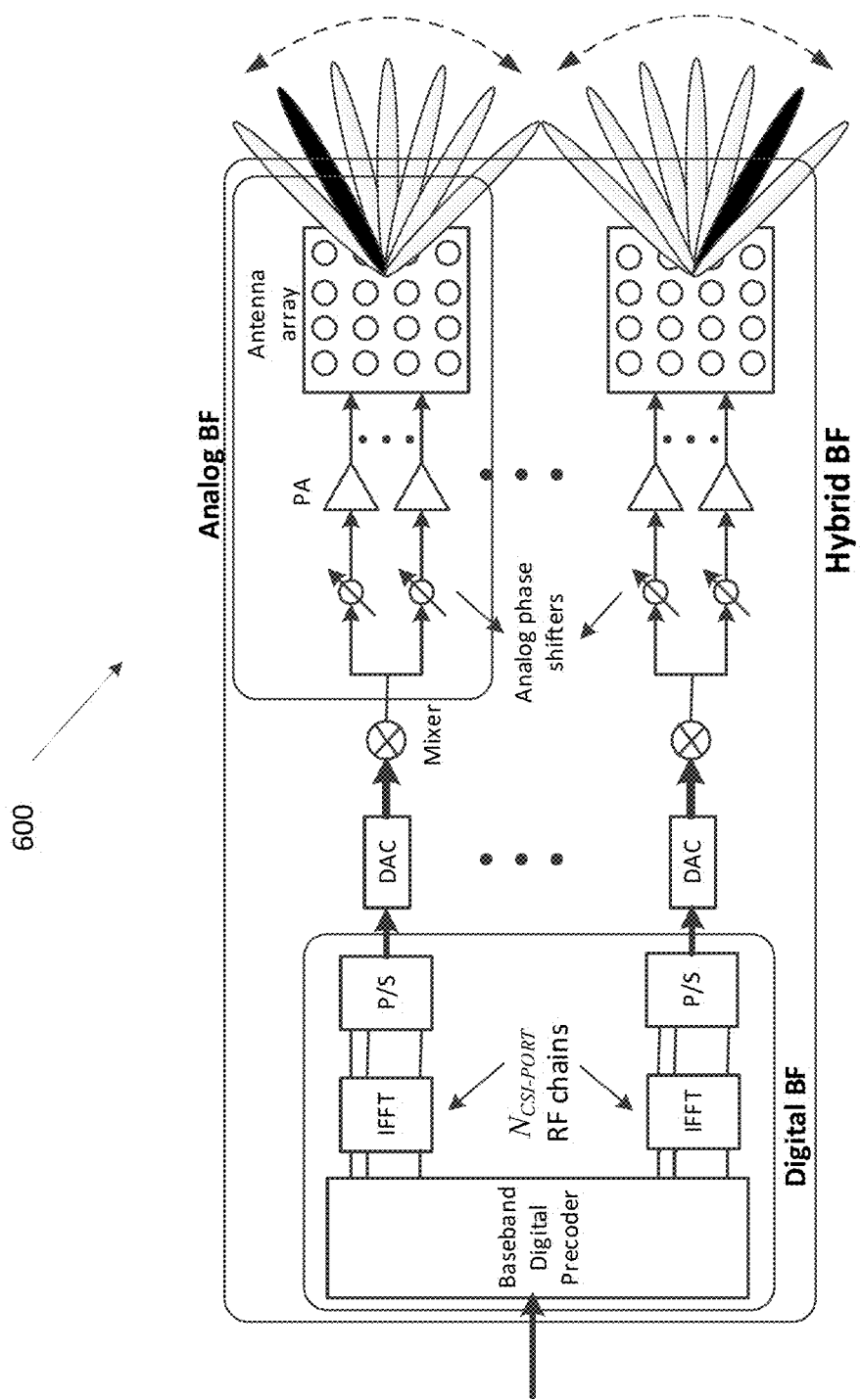
FIG. 6 illustrates an example number of digital chains according to embodiments of the present disclosure.

FIG. 6 illustrates an example number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

LTE specification supports up to 32 channel state information-reference signal (CSI-RS) antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may be feasible for gNB to provide coverage with a single transmit beam, i.e., ensure adequate received signal quality at the UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at UE locations within the coverage area.

However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB may form a number of transmit beams, each providing coverage over a region narrower than the overall coverage region, but providing the transmit power amplification sufficient to overcome the higher signal propagation loss due to the usage of higher transmit signal carrier frequencies.

Figure 7:
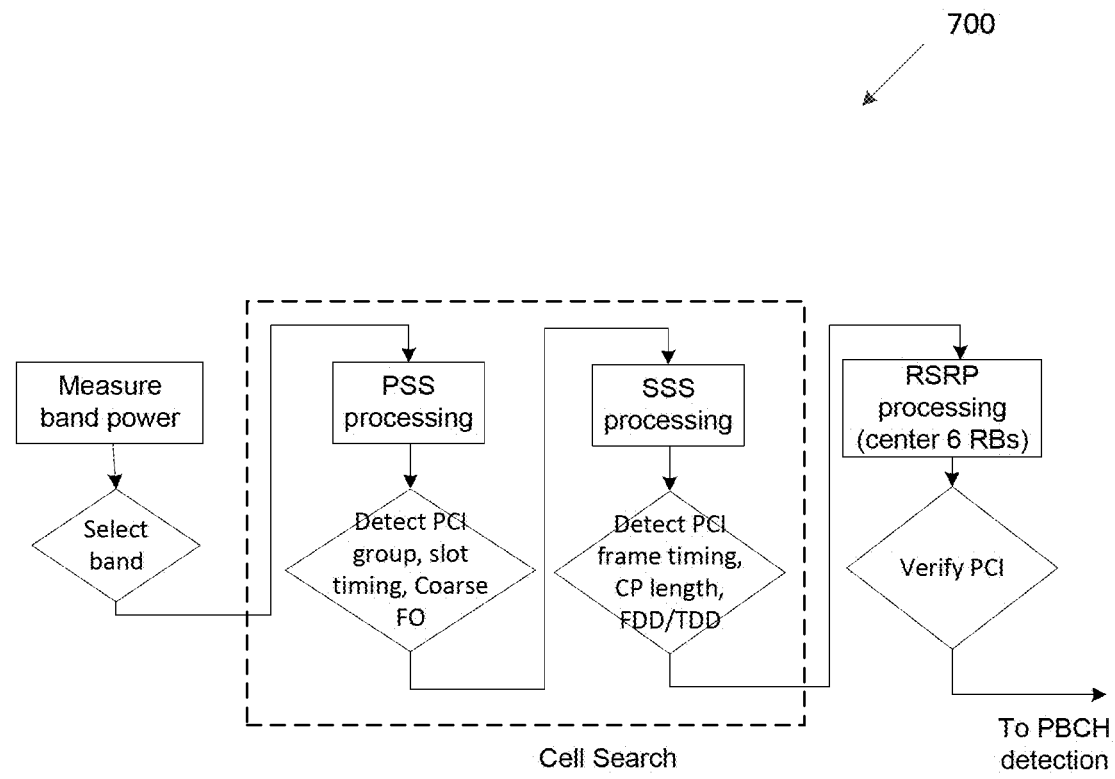
FIG. 7 illustrates an example LTE cell search operation according to embodiments of the present disclosure.

FIG. 7 illustrates an example LTE cell search operation 700 according to embodiments of the present disclosure. An embodiment of the LTE cell search operation 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

Before a UE can receive or transmit data to an eNB, the UE first needs to perform a cell search procedure in order to acquire time and frequency synchronization with the eNB.

The 4 main synchronization requirements are: symbol, subframe, and frame timing; carrier frequency offset (CFO) correction; sampling clock synchronization; and physical cell ID (PCI) detection and potentially some other cell-specific parameters.

The following steps are taken during synchronization. In one example of step 1, after power on, a UE tunes the UE's RF and attempts to measure the wideband received signal strength indicator (RSSI) at specific frequencies (channels, as commanded by higher layer) over a set of supported frequency bands one after another, and rank associated cells based on respective RSSI values.

In one example of step 2, the UE uses downlink synchronization channels, that is locally stored primary synchronization signal (PSS) and secondary synchronization signal (SSS) to correlate with a received signal. The UE first finds the PSS, that is located, for example for a FDD system, in a last symbol of a first time slot of a first and a sixth subframes in a frame. This enables the UE to synchronize with the eNB at the subframe level. The PSS detection helps the UE with the slot timing detection and the physical layer cell identity (PCI) detection (0, 1, 2) based on 3 sequences. The 3 sequences are used for PSS to mitigate so-called single frequency network (SFN) effect where a correlation output can exceed a cyclic prefix (CP) length.

In one example of step 3, the SSS symbols are also located in the same subframe as PSS but in the symbol before PSS for a FDD system. From the SSS, the UE is able to obtain the PCI group number (0 to 167). The SSS enables determination of additional parameters such as radio subframe timing determination, CP length determination and whether the eNB uses FDD or TDD. The process is depicted in the LTE cell search procedure shown in FIG. 7.

In one example of step 4, once a UE knows the PCI for a given cell, the UE also knows the location of cell-specific reference signals (CRS) that are used for channel estimation, cell selection/reselection and handover procedures. After channel estimation using CRS, equalization is performed to remove channel impairments from received symbols.

In one example of step 5, in case of initial synchronization, a UE can decode a primary broadcast channel (PBCH) to obtain a master information block (MIB) that carries critical system information such as the DL bandwidth, CRS transmit power, number of eNB transmitter antennas, system frame number (SFN), and a configuration for a physical hybrid-ARQ channel (PHICH).

TABLE 1 shows SSS locations relative to PSS locations for both the TDD-based and FDD-based systems. In case of FDD, PSS is always transmitted in the last symbol of a slot to enable the UE to acquire slot timing independent of the CP length. Since a UE does not know a CP length in advance, the UE needs to examine a total of 4 possible SSS locations when the UE is searching for either FDD or TDD cells. Two SSS codes are used which alternate between the $1^{st}$ and $2^{nd}$ SSS transmissions in the sub-frame which enables the UE to determine the radio timing from a single observation of the SSS, which can be beneficial for UEs handing over to LTE from another RAT.

TABLE 1

| | SSS location | | | | | | | | | |
|---|---|---|---|---|---|---|---|---|---|---|
| Subframe | 0 | 1 | 2 | 3 | 4 | 5 | 6 | 7 | 8 | 9 |
| FDD | PSS (#6) SSS (#5) | | | | | PSS (#6) SSS (#5) | | | | |
| TDD | SSS (#13) | PSS(#2) | | | | SSS (#13) | PSS(#2) | | | |

Figure 8:
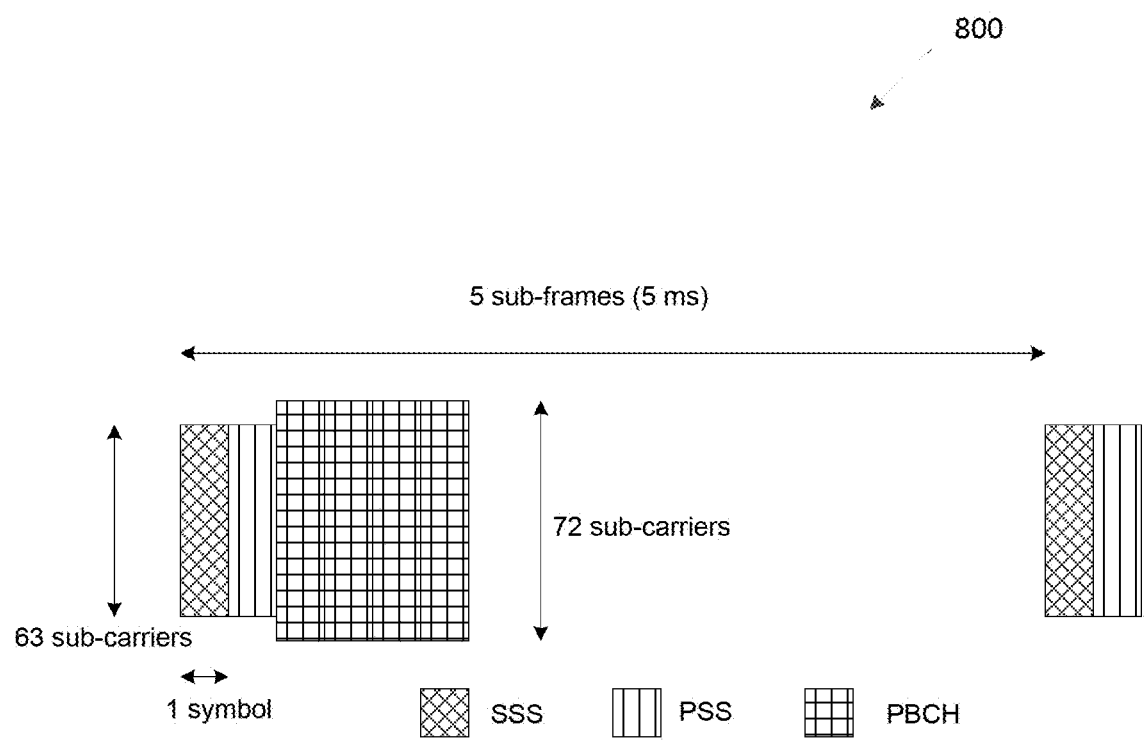
FIG. 8 illustrates an example frame structure of the PSS/SSS/PBCH transmission in the FDD configuration according to embodiments of the present disclosure.

FIG. 8 illustrates an example frame structure of the PSS/SSS/PBCH transmission 800 in the FDD configuration according to embodiments of the present disclosure. An embodiment of the frame structure of the PSS/SSS/PBCH transmission 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

As shown in FIG. 8, the PSS and SSS are always transmitted in the central 6 RBs so that even a minimum bandwidth UE can detect the signals. In case of multiple transmit antennas, PSS and SSS are always transmitted from the same antenna port in a given sub-frame while the PSS and SSS can be switched in between sub-frames for antenna diversity. The PBCH carriers the MIB with just 14 bits that carries some of the most frequently transmitted parameters essential for initial access to the cell, such as the DL system bandwidth, PHICH size, and the SFN number. It is repeated every 40 msec.

The PSS and SSS are always transmitted in the central 6 resource blocks (RBs) of a DL system bandwidth so that the PSS and SSS can be detected by a UE before the UE determines the DL system bandwidth, assuming that a minimum DL system bandwidth is 6 RBs. The PSS is generated by a Zadoff-Chu (ZC) sequence of length 63 in the frequency domain with the middle element punctured to avoid transmitting on the DC subcarrier. ZC sequences satisfy a constant amplitude zero autocorrelation (CAZAC) property that enables the PSS to have characteristics of time/frequency flatness (resulting to low PAPR/CM and no dynamic range in frequency domain), good auto/cross-correlation profiles, low complexity detection at UE (by exploiting complex conjugate property, e.g. $u1=29$ and $u2=63-29=34$, and by exploiting central symmetry property in both time and frequency domain), and so on.

However, due to the duality of the CAZAC property in the time and frequency domains, a shift of a ZC sequence in the frequency domain is also translated in time domain, and the reverse. Therefore, in the context of timing synchronization using ZC sequences, a frequency/time offset displays the time/frequency offset, respectively, and the offset in these two dimensions cannot be distinguished. The central root indices in the available root ZC sequence index vector have less frequency offset sensitivity and, for this reason, the root indices $u=25$, 29 and 34 were selected in LTE to provide three cell IDs within a cell ID group.

The selection of the root indices also considered partial correlation to overcome large frequency offset in initial cell search. Due to the phase rotation in time domain as a result of a large frequency offset, partial correlations need to be considered not only for ZC sequences but also for other sequences under large frequency offset operation especially in initial cell search although a window size for each partial correlation can be different depending on the exact design.

A PSS sequence x(n) is composed of a length $N_{ZC}$ root $u_1$ ZC sequence and is given by:

$$x(n) = e^{-\frac{j\pi u_1 n(n+1)}{N_{ZC}}}, n = 0, 1, \ldots, N_{ZC} - 1. \qquad \text{equation 1}$$

The LTE ZC sequence is mapped to achieve the central symmetry property (i.e. index 5 corresponds to the DC sub-carried for a RB that includes 12 sub-carriers indexed from 0 to 11). The SSS sequences are based on M-sequences. 168 sequences are generated by frequency domain interleaving of two length-31 BPSK-modulated M-sequences, where the two length-31M-sequences are derived from two different cyclic shifts of a single length-31 M-sequence. The two part structure of the SSS leads to side-lobes during cross-correlation and scrambling is used to mitigate the side lobes. For SSS, coherent detection is possible when channel estimates can be obtained via PSS detection.

In order to achieve a better performance of coherent detection for SSS by estimating the channel from PSS, multiple PSS sequences are used with a trade-off in PSS detection complexity. The different PSS sequences can enable improved channel estimation accuracy by relaxing the SFN effect that exists due to having a single PSS sequence from all cells. Thus, the aforementioned PSS/SSS design can support both coherent and non-coherent SSS detection. A UE needs to operate three parallel correlators for three different PSS sequences.

However, the root indices 29 and 34 are a complex conjugate to each other and this enables a 'one-shot' correlator—two correlation outputs for $u=29$ and 34 can be obtained from correlation with either $u=34$ or $u=29$. The conjugate property holds in both time and frequency domains, for any sampling rate, with the central symmetry mapping in frequency domain. Therefore, only two parallel correlators are needed (one for $u=25$ and the other for $u=29$ (or $u=34$)).

There is a need to enhance the existing synchronization and cell search procedure for new communication systems such as 5G at least for the following reasons. In one example of beamforming support, in order to meet link budget requirements for operation in high carrier frequency bands, such as ones above 6 GHz, beamforming is required for transmissions by an eNB (and possibly also by a UE). Therefore, the aforementioned synchronization and cell search procedure needs to be updated for beamforming support.

In one example of large bandwidth support, for operation with large system bandwidths, such as 100 MHz or above, a different sub-carrier spacing than the one for operation in the smaller system bandwidths can apply and such design needs to be considered for the synchronization and cell search procedure design.

In one example of improved coverage, for some applications, such as ones associated with a requirement for increased coverage that can occur due to placements of UEs in locations experiencing a large path loss, the synchronization and cell search procedure needs to support enhanced coverage and increased repetitions of synchronization signals.

In one example of improved performance, the synchronization performance of the aforementioned procedure is limited due to false alarms caused by the partitioning a cell ID into 1 PSS and 2 SSS, thereby leading to invalid combinations of PSS/SSS that cannot completely resolved by scrambling. A new synchronization procedure can be designed with improved false alarm performance.

In one example of support for variable TTI, in current LTE specification, the TTI duration is fixed. However, for 5G systems, the TTI is expected to be variable due to support for different sub-carrier spacing, low latency considerations etc. In this scenario with variable TTI, the mapping of the synchronization sequences and cell search within the frame needs to be specified.

In the present disclosure, an SS burst set is periodically recurring with period P, where P is an integer, e.g., 5, 10, 20, 40, 80, 100 etc. in terms of millisecond.

In the present disclosure, an SS burst means a set of consecutive $N_2$ SS blocks, where $N_2$ is an integer, e.g., 1, 2, 3, 4.

In the present disclosure, an SS block comprises a combination of synchronization signals, broadcast signals, and reference signals, which are multiplexed in TDM, FDM, CDM or hybrid manner.

In the present disclosure, a cell coverage is provided by a beam sweeping manner over SS blocks comprising an SS burst set. Different Tx beams may be used for different SS blocks within an SS burst set.

Figure 9:
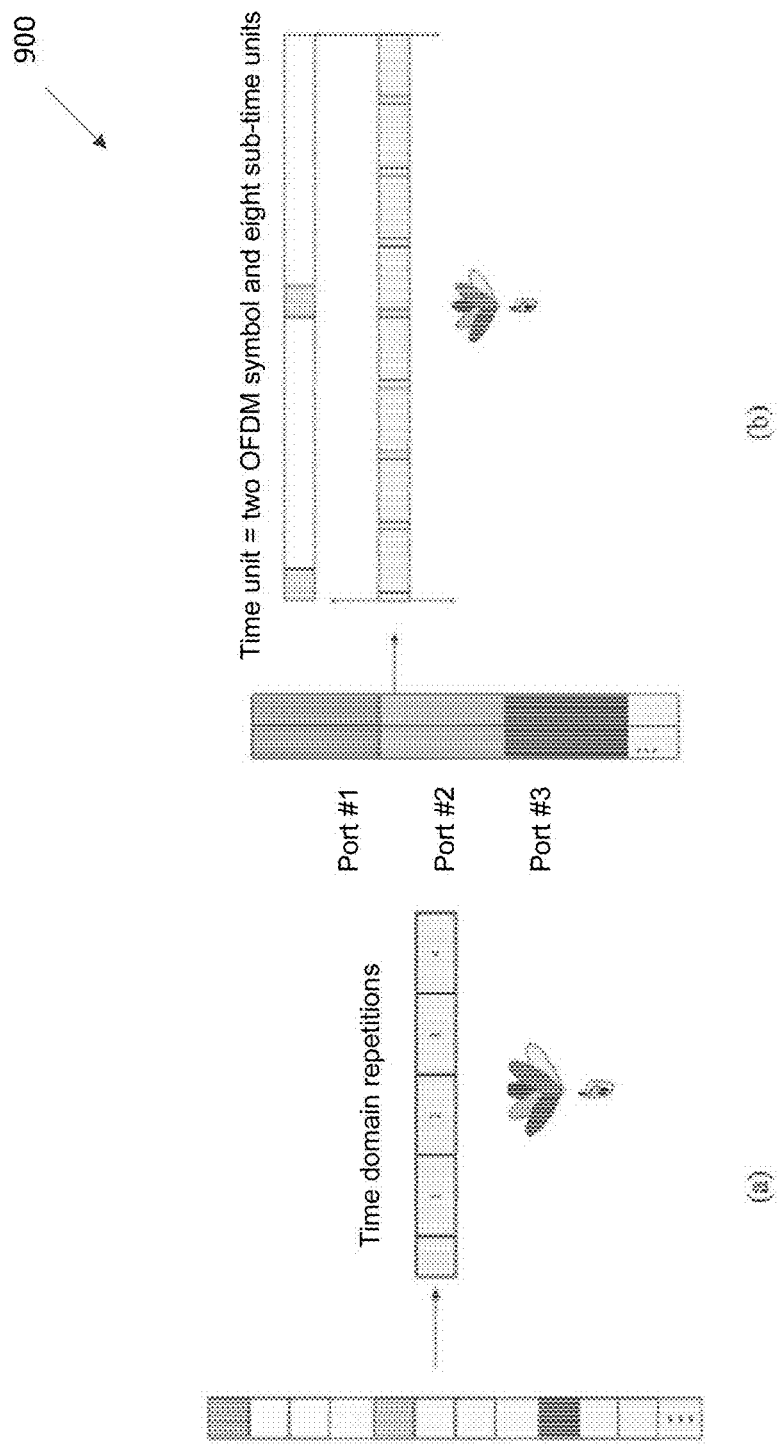
FIG. 9 illustrates an example IFDMA and subcarrier spacing scaling according to embodiments of the present disclosure.

FIG. 9 illustrates an example IFDMA and subcarrier spacing scaling 900 according to embodiments of the present disclosure. An embodiment of the IFDMA and subcarrier spacing scaling 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

As shown in FIG. 9, when IFDMA is used, the length of the individual sub-time unit is approximately $1/Q_1$-th of a time unit, wherein integer $Q_1$ refers to the repetition factor (every $Q_1$-the subcarrier carries signal). When subcarrier scaling is used, the length of the individual sub-time unit is $1/Q_1$-th of a time unit, wherein $Q_1$ refers to the subcarrier scaling factor (subcarrier spacing is $Q_1$ times larger than the reference subcarrier scaling).

In some embodiments, the following always-on signals are used for RRM measurement for L3 mobility in IDLE mode: NR synchronization signal; or NR synchronization signal, and additional DM-RS for PBCH if DM-RS is supported for PBCH (note: How to use DM-RS for RRM measurement is up to UE implementation); or DM-RS for PBCH if DM-RS is supported for PBCH. Note that down selection may be needed if DM-RS for PBCH is supported.

In some embodiments, for CONNECTED mode RRM measurement for L3 mobility, the following RS can be used if needed, in addition to IDLE mode RS: CSI-RS; and/or RS separately designed from CSI-RS. Note that possibility of multiplexing of wideband RS in SS block is not precluded In the present disclosure, a QCL resource may refer to a beam, an antenna port (across all the configured time units), a group of antenna ports corresponding to an RS resource, a CSI-RS resource, or a combination of an antenna port and a time unit of an RS resource.

In the present disclosure, an RS resource may refer to a CSI-RS resource, BRS (multi-beam mobility RS, can be cell-specifically configured, may correspond to PSS, SSS, PBCH DMRS, DMRS, CSI-RS or a newly designed RS), a set of DMRS ports, etc.

In the present disclosure, an RS setting may refer to a set of RS resources.

In the present disclosure, a time unit may correspond to a block of (consecutive) one or more OFDM symbols according to a configured numerology, on which UE can assume that a same QCL parameter is applicable to each antenna port (and/or in which the port-coherency holds).

In the present disclosure, a Tx beam (ID) may refer to a QCL resource of an RS resource, wherein the RS resource can be BRS or CSI-RS. Tx beams of an RS resource or an RS setting can be indexed with unique IDs, referred to Tx beam IDs. For example, if N Tx beams are available in an RS resource or an RS setting, N unique IDs can be allocated to these N individual Tx beams.

In the present disclosure, an Rx beam ID refers to an index that can be commonly understood by UE and gNB, for UE's Rx beamforming operation. A UE can be equipped with a single or multiple digital Rx chains. When the UE is equipped with a single Rx chain, a first Rx beam ID corresponds to a first Rx beam that is steered to a first angle; a second Rx beam ID corresponds to a second Rx beam that is steered to a second angle; and so on.

When the UE is equipped with N digital Rx chains, the first Rx beam ID corresponds to a first set of N Rx beams that are steered to a first set of N angles; the second Rx beam ID corresponds to a second set of NRx beams that are steered to a second set of N angles; and so on. Here, N is a positive integer. As an Rx beam ID may be associated with multiple Rx beams (especially in multiple digital chain case), an Rx beam ID may alternatively referred to an Rx mode.

In the present disclosure, Rx-beam, Rx mode, Rx beam set and Rx-beam related QCL parameters are used interchangeably, and refer to average AOA, ASD or antenna correlations. When an Rx beam of a first QCL resource can be inferred by that of a second QCL resource, the first and the second QCL resources are said QCL'ed in Rx-beam/Rx mode.

In the present disclosure, a set of QCL parameters refers to a combination of Rx-beam related parameters (average angle of arrival, arrival angle spread, Rx antenna correlation, etc.), delay and timing related parameters (Rx timing, delay spread, average delay), Doppler related parameters (average Doppler, Doppler spread), etc.

In some embodiments of the present disclosure, "a subframe" or "a time slot" is another name to refer to "a time interval X," or vice versa.

In some embodiments of additional RS for connected mode mobility, although NR-SSS can satisfy the RSRP measurement accuracy requirements, it does not mean that it may be sufficient for connected mode mobility. For the legacy LTE RRM measurement, various other requirements, (e.g., latency requirements) are separately defined for IDLE and CONNECTED, and for CONNECTED more stringent requirements were defined. In NR, it is expected that similar latency requirements may take place and it seems to be an open question whether NR-SSS can also satisfy these latency requirements for the CONNECTED mode.

The aforementioned embodiments are indeed to do with the periodicity of the SS burst sets. If SS burst sets are configured with relatively short periodicity (e.g., 5, 10 msec), the latency problem may not be severe and no additional RRM measurement signals may be necessary for L3 mobility. This could be the case for sub6 GHz for single-beam operation. However, at least for multi-beam over 6 GHz operation, beam-level measurement results could play a crucial role for hand-over performance, and it is not clear if NR-SSS is able to provide sufficient information for beam alignment for the hand-over process. If no beam-level information is available at the network side during the handover process, the network and UE may need to go through time-consuming beam management process, in which case UE may experience sudden throughput drop after handover until the beams are finally aligned. One possible solution is to allow UE reporting of SS-block-RSRP.

However, this solution may work in limited cases only, e.g., if the network implementation is such that NR-SSS are transmitted on narrow beams without SFN; this network implementation may happen if a cell has a single TXRU. When a cell has multiple TXRUs, the cell may transmit NR-SSS with SFN on multiple TXRUs in order to reduce number of SS blocks (which may constitute the static system overhead), where the TXRUs use different beams. In such a case the beam information that can be acquired with NR-SSS may be limited, and SS-block RSRP may not be sufficient for beam alignment during the handover process.

Having these observations, it seems that there are cases where additional RS are necessary, but it seems also be important to allow for possibility of turning off the additional RS, e.g., for maintaining low overhead for single-beam operations.

It is an open question whether UE is allowed to make cell-level RSRP measurement from the additional RS as well as the IDLE mode RS. If it is decided to allow both additional RS and SSS to be used for deriving the cell-level RSRP, a method to combine the beam-level RSRPs derived from the additional RS and those from the SSS to derive the cell-level RSRP needs to be devised. In order for the RSRP values derived from the two different measurement signals to be at least similar (e.g., within a certain fraction of dB margin), the network has to implement beamforming in a certain manner.

The main motivation of introducing additional RS are for the beam related operations, a natural candidate is CSI-RS introduced for beam management; but the additional RS may be differently designed from the CSI-RS.

It is another open question whether to multiplex the additional RS in SS blocks or not. To further clarify, the SS block here means both the SS block time duration and the initial access BW. When each SS block may comprise PSS/SSS/PBCH/TRS, multiplexing the additional RS within the SS block seems to be a challenging task. With inserting the additional RS within the SS block, other signals' coverage may get reduced, and hence it is proposed not to multiplex the additional RS within the SS block. However, it would still be beneficial to be able to map the additional RS outside the initial access BW of the SS block time duration, e.g., for efficiently utilizing the beam sweeping resources; and this option should be allowed.

When the additional RS are not multiplexed with the other signals in the SS block, the design constraints of multi-beam additional RS can be greatly reduced. If CSI-RS can support fairly flexible design, it may be able to be used as the additional RS. Although CSI-RS has been traditionally configured UE-specific only, it is not clear whether UE-specific configuration is desirable for the mobility use case.

Given that the main use case of the additional RS is for connected mode mobility for "initial" beam-level measurement of a selected neighbor cell for handover, the additional RS configuration should be simple, so that the network does not need to exchange much information over X2 interface. "Flexible" CSI-RS configuration may imply that many configuration parameters are available; and such high-level flexibility may neither be useful nor desirable for this use case. Hence, it would be preferable if limited configuration possibilities are allowed for the additional RS and the information is conveyed in the early stage of the initial access, e.g., in MIB/RMSI. If the additional RS are cell-specifically configured, it can also be used for the measurements necessary for cell-wide initial TRP Tx beam selection and TRP Tx switching (P1/P2); and also time-frequency tracking.

The number of antenna ports per resource could be to do with how many TXRUs can be simultaneously turned on for a serving cell, and the RS density of individual antenna ports. In relation to the number of TXRUs, the more would be the better; for the RS density, the fewer the better. Candidate numbers of antenna ports per resource are 1, 2, 4, 8.

Finally, the sync source for the additional RS can be PSS/SSS, and no other designs are necessary. For the decision, legacy LTE discovery RS can be a good reference. The legacy discovery RS comprises either PSS/SSS/CRS or PSS/SSS/CRS/CSI-RS, and the minimum periodicity of the discovery signals was 40 ms. PSS/SSS is sufficient for coarse time/frequency sync; and UE can find the additional RS with limited signaling in MIB/RMSI and physical cell ID only for neighbor cell measurements.

In some embodiments, an RS may be designed. The main functions of the RS include some of: additional mobility RS for connected mode; initial beam management procedure; and/or time-frequency tracking.

The RS may also referred to be CSI-RS in this disclosure, but the term "CSI-RS" is for convenience of the description, and other terms may also be used to refer to the RS without departing from the principles of the present disclosure.

In some embodiments for configuration and mapping of the RS, it is noted that the beams for SS blocks is likely to have a limited resolution to be used for initial cell selection, because: the number of SS blocks in an SS burst set is likely to be small, e.g., to maintain the resource overhead small for the always-on SS; and the number of antenna ports for the SSS is either 1 or 2, to maintain UE complexity small for cell ID detection.

One method to provision the number of beams of an SS burst set could be according to the maximum number of analog beams that can be swept on each TXRU. When a cell has a multiple TXRUs (and TRPs), the network can configure all the TXRUs can transmit the TXRUs' own beams in the SFN manner on each SS block, e.g., to reduce the system overhead related to beam sweeping. In particular, when a cell has a large number of TXRUs, the beam information the network can acquire out of SSS in each SS block may be limited due to the SFN transmission, and an additional procedure may be necessary for the network to acquire TXRU/TRP-specific beam information for each UE. This additional procedure may be referred to "initial beam selection." To facilitate the initial beam selection efficiently, the network can provide CSI-RS.

In one embodiment, CSI-RS is cell-specifically configured and transmitted cell-wide. This CSI-RS can also be used for beam switching due to intra-cell UE mobility. In addition, the CSI-RS can also be used for inter-cell beam measurement for L3 mobility. When the network considers a certain neighbor cell for handover for a UE, the network can configure UE to report the neighbor cell's beam measurement results so that the network can ensure beam alignment with the target cell, when the UE is handed over; otherwise, beam management delay may cause UE to experience service interruption.

In addition, the cell-wide CSI-RS can also be used for time-frequency tracking, if the CSI-RS pattern can specifically designed for such a purpose. To allow for all these operations, it is preferred to configure the cell-wide CSI-RS cell specifically via broadcast signaling, e.g., MIB based signaling on PBCH, or RMSI (remaining minimum system information or SIB) signaling on another broadcast channel or on PDSCH.

The CSI-RS mapping to support the cell-wide beam management may have at least the following features. In one example, in a resource setting (which corresponds to a CSI-RS set), K CSI-RS resources are configured, and the beams can be swept over K (sub)time units. In such example, each of the K CSI-RS resources corresponds to a (sub)time unit. In such example, CSI-RS ports of a CSI-RS resource are mapped onto subcarriers on one (sub)time unit.

In one example, same number of ports, $N_P$, is used for every resource; and maximum number of ports is less than or equal to $N_{P,max}$. In one example, the CSI-RS is periodically configured with periodicity P, and offset O, in terms of a first slot of a radio frame. In one example, the size of sub-time units can be configured; one time unit corresponds to Q sub-time units, where Q=1, 2, 4. In one example, the CSI-RS resource in these embodiments may alternatively referred to as CSI-RS resource set comprising $N_P$ CSI-RS resources each comprising one or two antenna port(s).

In one embodiment, in a resource set (which corresponds to a slot defined by a configured numerology), K OFDM symbols are configured to carry CSI-RS. In one embodiment, same number of resources, $N_P$, is mapped for every OFDM symbol. Then the total number of resources in a resource set becomes $K \cdot N_P$. In one embodiment, the CSI-RS is periodically configured with periodicity P, and offset O, e.g., in terms of a first slot of a radio frame.

A first subset of these parameters are indicated via PBCH (e.g., in MIB); a second subset of these parameters are indicated via a second PBCH or SIB; a third subset of these parameters are pre-configured; and a fourth subset of these parameters are UE-specifically RRC configured, wherein the union of the four subsets comprise all these parameters; these four subsets are mutually exclusive; and some of these four subsets can be empty.

In order for the network to configure this information more efficiently, some restrictions on the configurability should be taken into place.

In some embodiments, CSI-RS and SS blocks may be mapped on the same OFDM symbols. To save signaling overhead, in one method, K is pre-configured to be the same as the actual number of transmitted SS blocks; and the time domain locations of the K resources in a radio frame are also pre-configured. In this case, those OFDM symbols to map the SS blocks in each slot may also be used for mapping the K CSI-RS resources.

A UE may be allowed to derive RSRP with averaging power across antenna ports on a k-th CSI-RS resource, denoted as CSI-RSRP of resource k. The UE also derives SS-block RSRP on a k-th SS block in a SS burst set. In such a case, a k-th beam RSRP can be derived with taking weighted sum of CSI-RSRP of resource k and SS-block RSRP on k-th SS block. A weighted sum (or average) of m strongest beam RSRPs can be used as cell-specific RSRP, which is used as RRM measurement quantity for L3 mobility, where m is an integer.

When subcarrier spacing for the SS blocks is integer (Q) multiple of default subcarrier spacing of a given carrier frequency, the sub-time unit length is the same as 1/Q of the length of the OFDM symbol constructed with a default subcarrier spacing, so that the CSI-RS and other signals in the SS blocks can be multiplexed in the frequency domain according to the same numerology.

Figure 10:
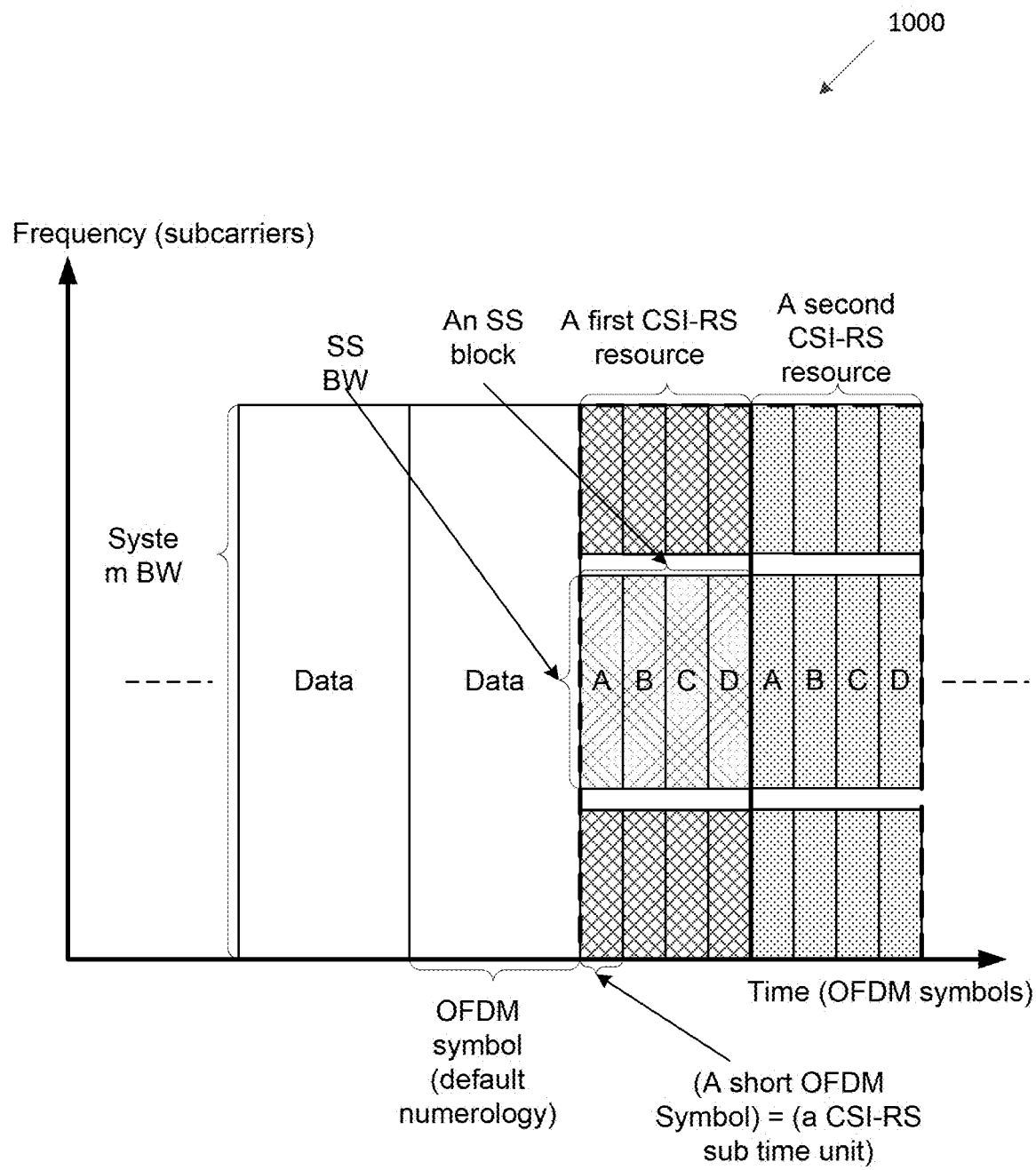
FIG. 10 illustrates an example CSI-RS and SS blocks according to embodiments of the present disclosure.

FIG. 10 illustrates an example CSI-RS and SS block 1000 according to embodiments of the present disclosure. An embodiment of the CSI-RS and SS blocks 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

The aforementioned embodiment is illustrated in FIG. 10. An SS block comprises 4 short OFDM symbols, corresponding to one OFDM symbol in default numerology; and comprises four signals, A, B, C, D to be mapped to on the four short OFDM symbols. The SS block is also band limited within the SS BW, which is a subset of the system BW. The CSI-RS are mapped on those OFDM symbols where SS blocks are mapped, but the CSI-RS are mapped on the edges of the system BW on which SS block is absent. A same Tx beam is used across the four short OFDM symbols comprising an OFDM symbol, and hence the antenna ports comprising each CSI-RS resource is mapped to these four short OFDM symbols. UE may apply different Rx beams across those four short OFDM symbols for Rx beam sweeping.

In one embodiment, the CSI-RS periodicity and offset are the same those for as SS blocks. In this case, for the CSI-RS configuration, only the following information may be additionally configured: a number of ports per CSI-RS resource; and the locations of actually transmitted SS blocks in each SS burst. UE may assume the following for the CSI-RS time domain locations: the CSI-RS periodicity and offset are the same those for as SS blocks; the CSI-RS are mapped on those OFDM symbols where SS blocks are mapped, and on the edges of the system BW on which SS block is absent; and/or the subcarrier spacing used for the CSI-RS mapping is the same as that for the SS blocks.

In some embodiments, CSI-RS periodicity can be configured to be different from that of SS blocks; but CSI-RS time offset is the same as that of SS blocks.

In one embodiment, the CSI-RS periodicity is configured differently from those for SS blocks. In particular, the SS block periodicity is an integer (Z) multiple of CSI-RS periodicity. In this case, CSI-RS may be FDM'ed with SS blocks in some time occasions, and CSI-RS may be mapped on the full system BW or a configured CSI-RS BW in some other time occasions.

In the aforementioned embodiment for the CSI-RS configuration, only the following information may be additionally configured: a number of ports per CSI-RS resource; the locations of actually transmitted SS blocks in each SS burst; and the periodicity of the CSI-RS (e.g., in terms of the integer $z \in \{1, 2, 4\}$).

A UE may assume the following for the CSI-RS time domain locations. In one example, the CSI-RS time offset are the same as those for as SS blocks. On the frame on which SS blocks are mapped, CSI-RS are mapped. The CSI-RS may be mapped in additional frames, if the configured periodicity scaling value (Z) is greater than 1.

In another example, the CSI-RS are mapped on the same subset of OFDM symbols where SS blocks are mapped. In such example, the CSI-RS may be mapped in a time slot with and without SS blocks, and the OFDM symbol numbers to map the CSI-RS are the same as those used for mapping the SS blocks. In such example, the CSI-RS may be mapped in a frame with and without SS blocks, and the slot numbers to map the CSI-RS are the same as those used for mapping the SS blocks.

In yet another example, the frequency domain mapping of CSI-RS is: if the time slot is configured for CSI-RS mapping without SS blocks, the CSI-RS are mapped on the full/configured BW; and/or if the time slot is configured for CSI-RS and SS block mapping, the CSI-RS are FDM'ed with the SS blocks.

In yet another example, the subcarrier spacing used for the CSI-RS mapping is the same as that for the SS blocks.

It is assumed that default periodicity of SS blocks (or SS burst sets) is $N_D$, and CSI-RS periodicity is $N_P$ frames, wherein the $N_D = Z \cdot N_P$. In a subset of time slots in frames 0, $N_D$, . . . , both SS blocks and CSI-RS are mapped; in the same subset of time slots in frames $N_P$, $2N_P$, . . . , which is different from integer multiple of $N_D$, CSI-RS are mapped without being constrained by the SS blocks. Note that the time units to describe the periodicity may be changed to different time units, e.g., slots, without departing from the principles of this embodiment.

Figure 11:
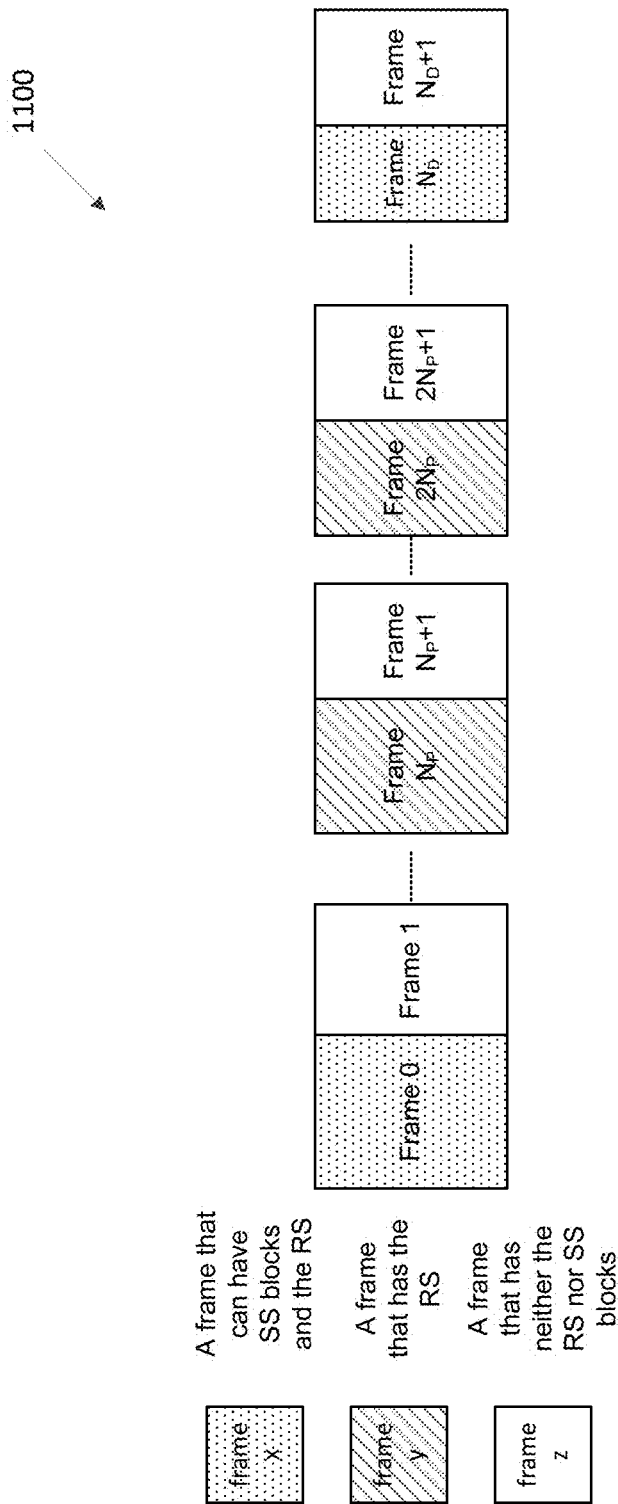
FIG. 11 illustrates an example CSI-RS configuration according to embodiments of the present disclosure.

FIG. 11 illustrates an example CSI-RS configuration 1100 according to embodiments of the present disclosure. An embodiment of the CSI-RS configuration 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

Figure 12:
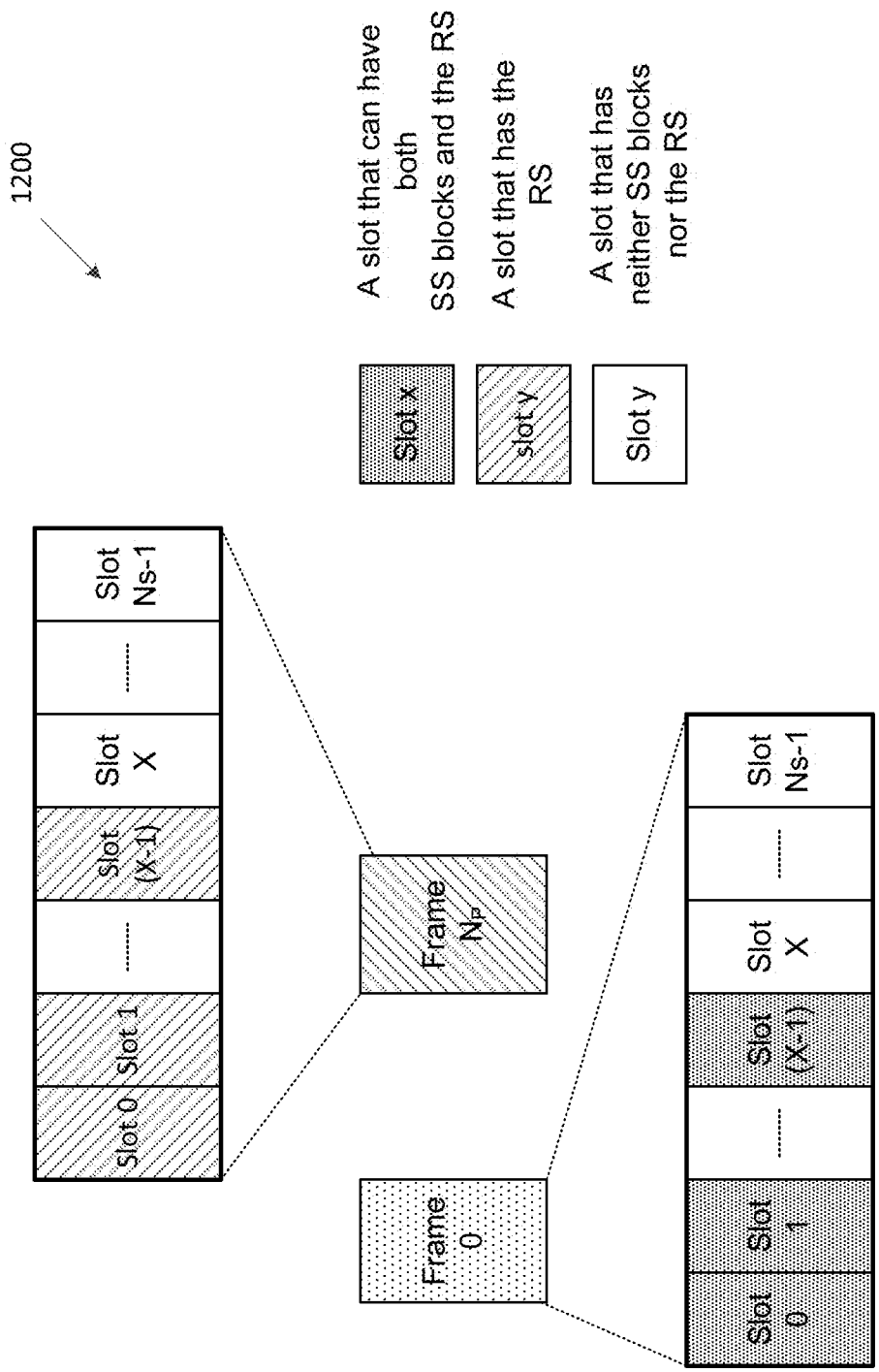
FIG. 12 illustrates an example subset of slots according to embodiments of the present disclosure.

FIG. 12 illustrates an example subset of slots 1200 according to embodiments of the present disclosure. An embodiment of the subset of slots 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

FIG. 12 illustrates the subset of slots on which CSI-RS and/or SS blocks are mapped. The subset of slots in this illustration are slots 0, 1, . . . , X.

Figure 13:
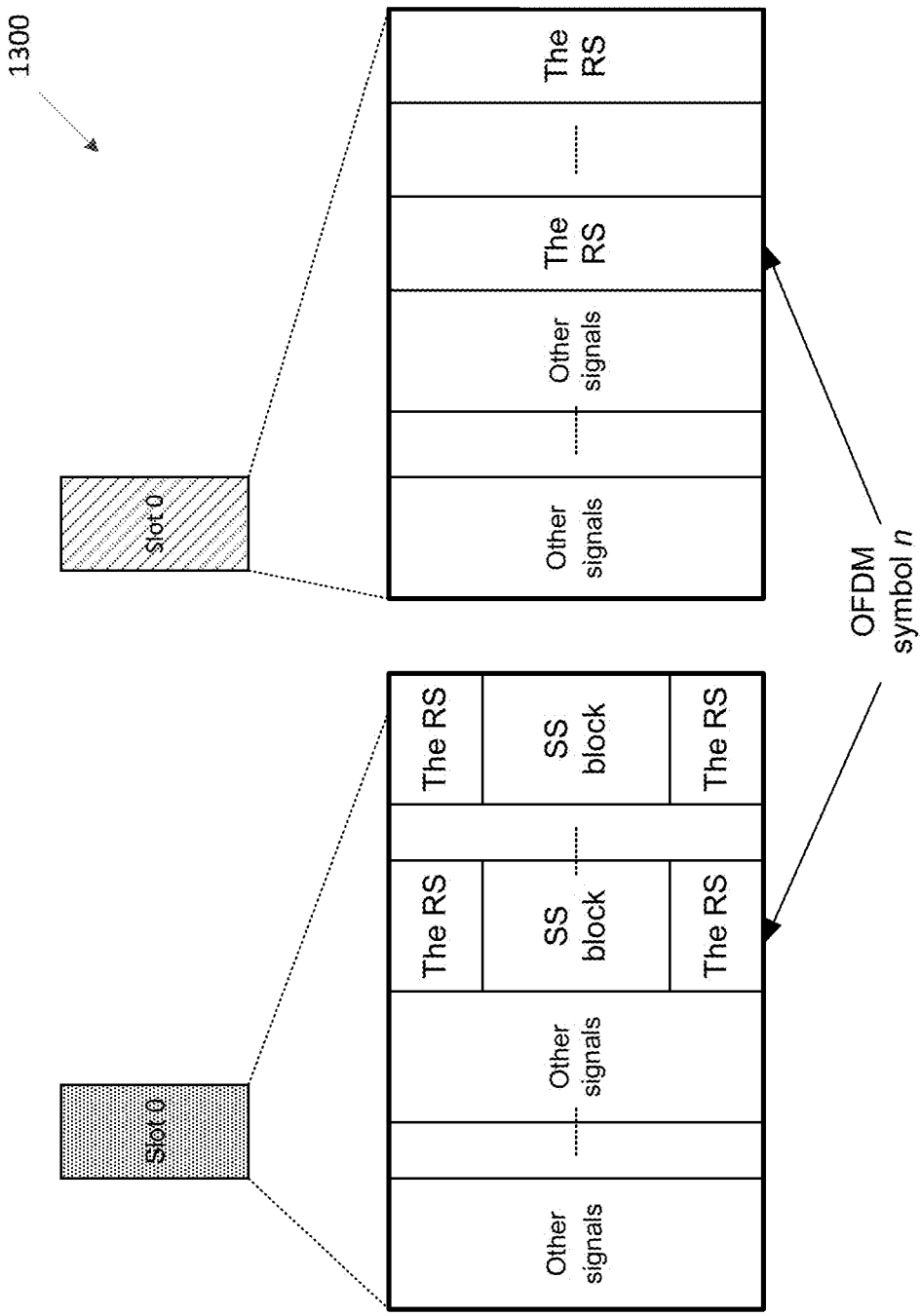
FIG. 13 illustrates an example OFDM symbols in a slot according to embodiments of the present disclosure.

FIG. 13 illustrates an example OFDM symbols in a slot 1300 according to embodiments of the present disclosure. An embodiment of the OFDM symbols in a slot 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

FIG. 13 illustrates OFDM symbols in a slot belonging to the subset of slots. In slot 0 of the each frame that can have SS blocks and/or the CSI-RS, a subset of OFDM symbols is used for mapping these signals. In the figure, OFDM symbol n through the end OFDM symbol of the slot are used for the mapping.

In some embodiment, a CSI-RS slot offset is different from those for SS blocks. In one example, the CSI-RS slot offset is configured differently from those for SS blocks. In one example, the CSI-RS slot offset is pre-configured to be $O_s$. In this case, CSI-RS may be FDM'ed with SS blocks in those slots for which SS blocks are also mapped, and CSI-RS may be mapped on the full system BW or a configured CSI-RS BW in those slots for which no SS blocks are mapped.

In such example, for the CSI-RS configuration, only the following information may be additionally configured: a number of ports per CSI-RS resource; the locations of actually transmitted SS blocks in each SS burst. The periodicity of the CSI-RS (e.g., in terms of the integer $Z \in \{1, 2, 4\}$) may be configured or pre-configured. A UE may assume the following for the CSI-RS time domain locations. In one instance, the CSI-RS slot offset is $O_s$. In one instance, the CSI-RS frame offset is the same as the one for SS blocks. On the frame on which SS blocks are mapped, CSI-RS are mapped. The CSI-RS may be mapped in additional frames, if the configured periodicity scaling value (Z) is greater than 1.

In one instance, the CSI-RS are mapped on the same subset of OFDM symbols where SS blocks are mapped. In such instance, the CSI-RS may be mapped in a time slot with and without SS blocks, and the OFDM symbol numbers to map the CSI-RS are the same as those used for mapping the SS blocks.

In one instance, the frequency domain mapping of CSI-RS is: if the time slot is configured for CSI-RS mapping without SS blocks, the CSI-RS are mapped on the full/configured BW; and/or if the time slot is configured for CSI-RS and SS block mapping, the CSI-RS are FDM'ed with the SS blocks. For ensuring full BW mapping of CSI-RS all the time, the slot offset may be configured such that the slots to map CSI-RS and SS blocks are orthogonal.

Figure 14:
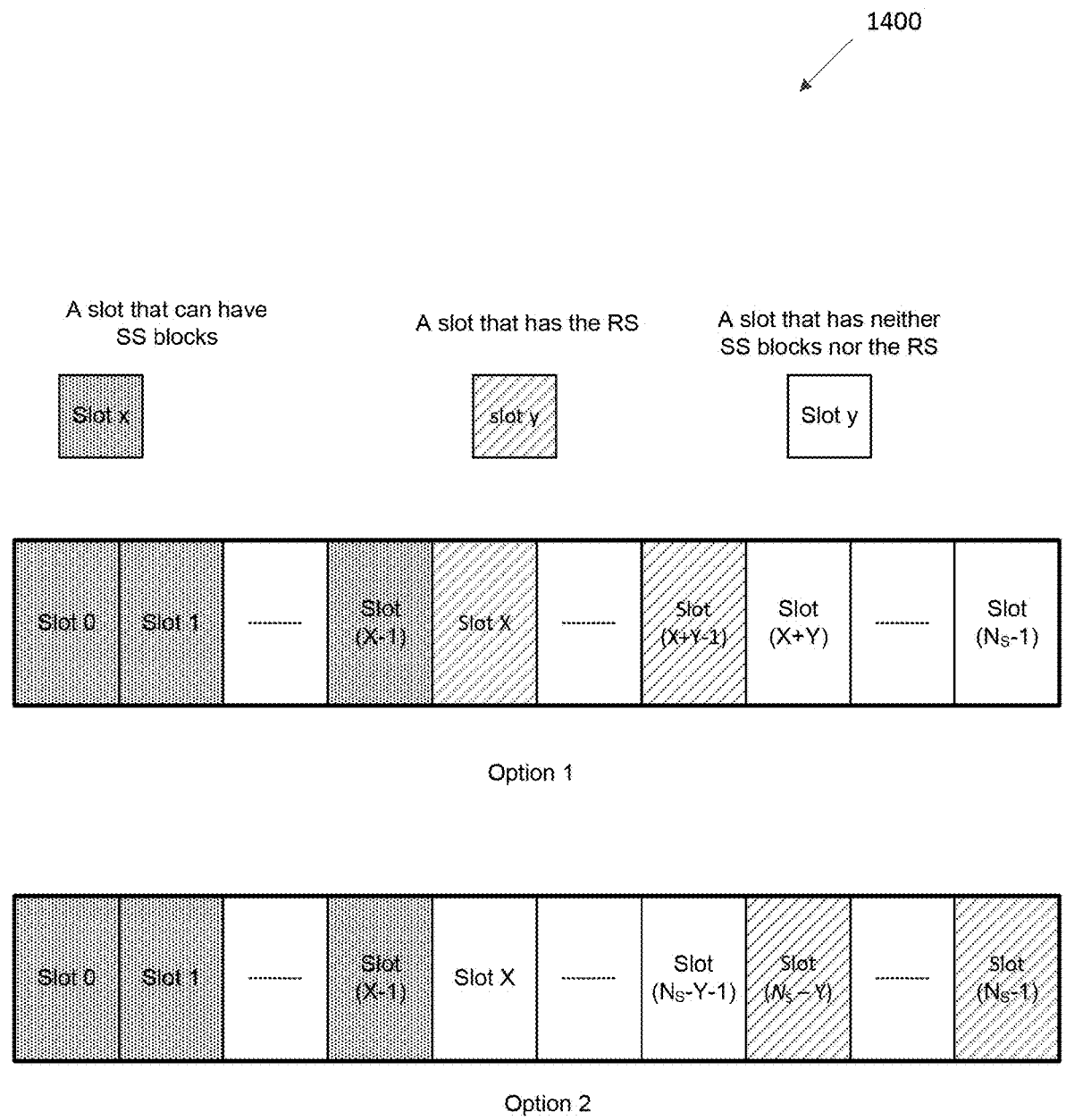
FIG. 14 illustrates an example slot and SS block mapping in a frame according to embodiments of the present disclosure.

FIG. 14 illustrates an example slot and SS block mapping 1400 in a frame according to embodiments of the present disclosure. An embodiment of the slot and SS block mapping 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

In some embodiments, slots that can be used for SS block mapping are contiguous. In case slots that can be used for SS block mapping in a frame are contiguous, the slots to map CSI-RS are selected from the rest of the slots in the frame. Some examples are illustrated in FIG. 14. In a frame, slots 0 to (X−1) may have SS blocks. In one option (option 1), the CSI-RS can be mapped on slots X to (X+Y−1), in this case, the CSI-RS slot offset is equal to X. In another option (option 2), the CSI-RS can be mapped on slots ($N_S$−Y) to ($N_S$−1).

In some embodiments, slots that can be used for SS block mapping are distributed. In case slots that can be used for SS block mapping in a frame are distributed, the slots to map CSI-RS are selected from the rest of the slots in the frame.

Figure 15:
FIG. 15 illustrates another slot and SS block mapping in a frame according to embodiments of the present disclosure.

One example is illustrated in FIG. 15. In a frame, slots 0, 2, ..., (2X−2) may have SS blocks. Then, the slot offset for CSI-RS is configured to be 1 slot, and the CSI-RS are mapped in slots 1, 3, ..., (2Y−1). Note that this example is just for illustration. The SS blocks may be mapped in slot numbers 0, S, 2S, (SX−S), wherein S is an integer; in such a case, the CSI-RS slot offset can be configured/pre-configured to be one of 1, 2, ..., S−1.

FIG. 15 illustrates another slot and SS block mapping 1500 in a frame according to embodiments of the present disclosure. An embodiment of the slot and SS block mapping 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

In some embodiments for a number of slots to map the CSI-RS, the number of slots that are used for CSI-RS mapping (Y) may be different from the number of slots that are used for SS blocks (X). This is related to the length of sub-time unit of CSI-RS. For sub-time unit partition of a time unit, either IFDMA or subcarrier scaling can be used. Suppose the length of sub-time unit of CSI-RS is about $1/Q_1$ of the default OFDM symbol length, wherein $Q_1$ is an integer. Then, in one method, the number of slots used for CSI-RS mapping (Y) is determined as: $Y=X/Q_1$.

In such embodiment, each sub-time unit comprises a CSI-RS resource, and different Tx beams are applied across different sub-time units within a CSI-RS burst set. UE may assume that a same Tx beam is applied for a same CSI-RS resource recurring with the CSI-RS period.

In some embodiments for CSI-RS mapping to allow for time-frequency tracking, for time frequency tracking, the CSI-RS may be mapped across multiple time-separated OFDM symbols.

Figure 16A:
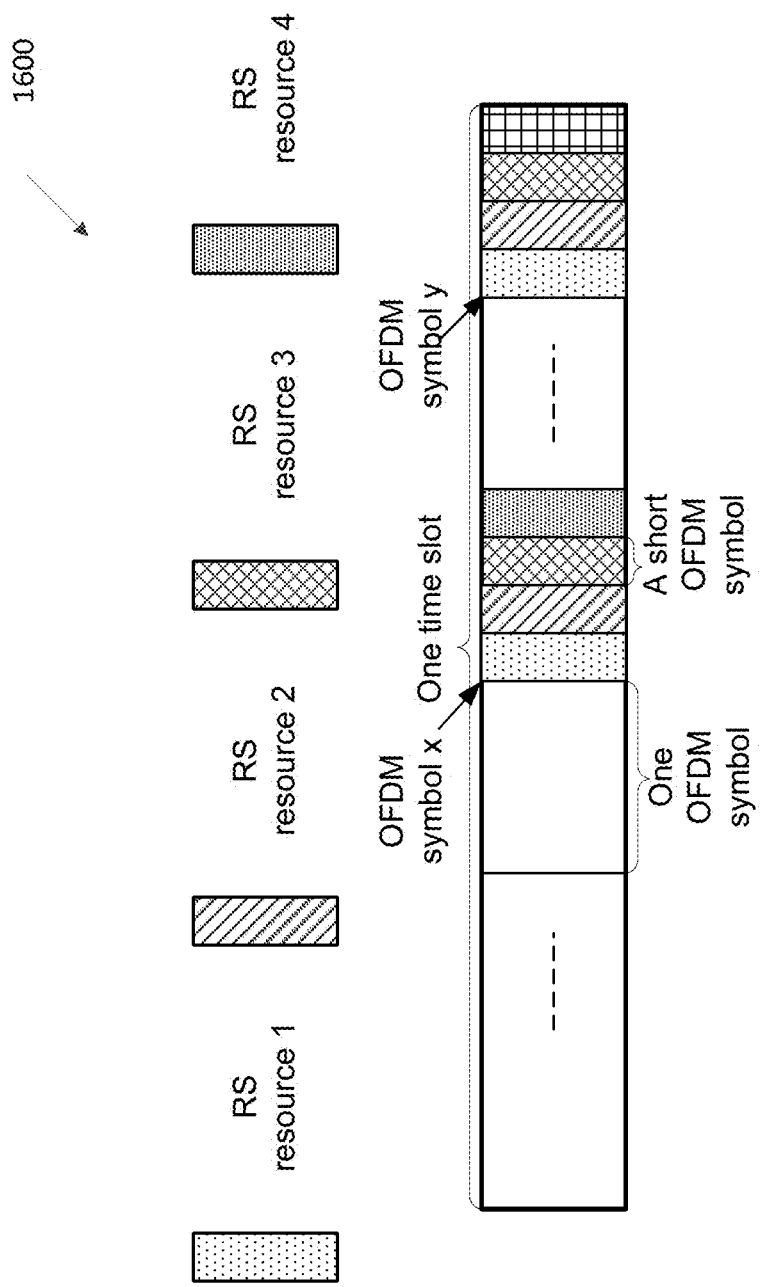
FIG. 16A illustrates an example CSI-RS mapping according to embodiments of the present disclosure.

FIG. 16A illustrates an example CSI-RS mapping 1600 according to embodiments of the present disclosure. An embodiment of the CSI-RS mapping 1600 shown in FIG. 16A is for illustration only. One or more of the components illustrated in FIG. 16A can be implemented in specialized circuitry configured to perform the noted functions or one or more of the components can be implemented by one or more processors executing instructions to perform the noted functions. Other embodiments are used without departing from the scope of the present disclosure.

One possible mapping pattern is illustrated in FIG. 16A. In FIG. 16A, one OFDM symbol corresponds to four sub-time units for CSI-RS mapping, and one CSI-RS resource comprises two time-separated sub-time units; a first sub time unit is in OFDM symbol x (in default numerology); and a second sub time unit is in OFDM symbol y (in default numerology). In one example, OFDM symbols x and y correspond to n and n+7, wherein n can be selected from 0, 1, 2, 3, 4, 5, 6. In these four resources, a gNB may apply Tx beam sweeping. In this case, the number of slots that are used for CSI-RS mapping (Y) is a ¼-th of the number of slots that are used for the SS blocks, as each time slot conveys 4 resources in case of CSI-RS, but each time slot conveys 1 resource in case of SS blocks.

FIG. 16A is just for illustration, and the principle of CSI-RS mapping is applicable regardless of the number of RS resources mapped in each slot. The number of RS resources to be mapped in a slot can be $Q_1=1, 2, 4$, and the length of sub-time unit is approximately $1/Q_1$-th of the time unit. In a special case, the length of the time unit is one OFDM symbol.

The number of RS resources per time slot ($Q_1$) may also be configured in RRC, or PBCH or RMSI or SIB, or pre-configured. The length of sub-time unit (or the time duration of the RS resource) may also be correspondingly determined as approximately $1/Q_1$-th of the time unit.

In some embodiments, slot structure when different numerologies are applied to SS blocks and data is considered. In FIG. 16A and the aforementioned embodiments, it was assumed that the subcarrier spacing for the default numerology is narrower than that for the CSI-RS numerology. In this embodiment, another case is considered; the subcarrier spacing of the default SS block numerology is wider than that for the data numerology.

Figure 16B:
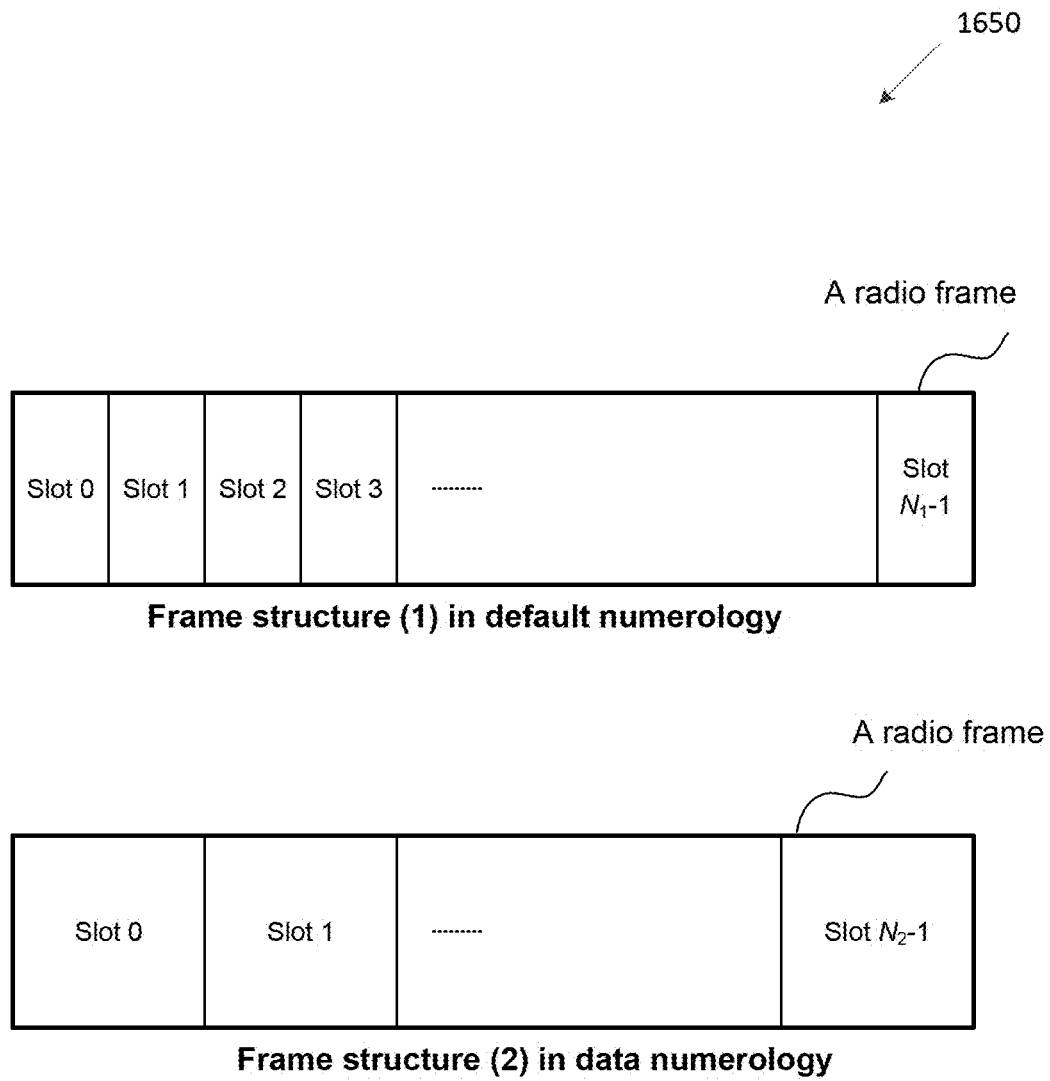
FIG. 16B illustrates an example different frame structure according to embodiments of the present disclosure.

FIG. 16B illustrates an example different frame structure 1650 according to embodiments of the present disclosure. An embodiment of the different frame structure 1650 shown in FIG. 16B is for illustration only. One or more of the components illustrated in FIG. 16B can be implemented in specialized circuitry configured to perform the noted functions or one or more of the components can be implemented by one or more processors executing instructions to perform the noted functions. Other embodiments are used without departing from the scope of the present disclosure.

FIG. 16B illustrates two different frame structures: a frame structure in default SS block numerology, whose subcarrier spacing is 2s kHz; a frame structure in data numerology, whose subcarrier spacing is s kHz. The resulting OFDM symbol length and slot length may be twice longer for frame structure than for frame structure, and hence the number of slots multiplexed in frame structure, $N_1$, is 2 times larger than the number of slots multiplexed in frame structure, $N_2$. The figure is for illustration, and any other relations between $N_1$ and $N_2$ can also be used.

When the CSI-RS is configured before the data numerology is configured, the period and the slot offset are configured based on frame structure.

When the CSI-RS is configured after the data numerology is configured, the period and the slot offset can be configured based on either frame structure or frame structure.

When a CSI-RS resource is used for time-frequency tracking as shown in FIG. 16A, the CSI-RS resource may comprise two OFDM symbols. An absolute time gap between the two OFDM symbols may correspond to different number of OFDM symbols in different numerology, as the OFDM symbol durations are different. For example, the time gap may correspond to $n_1$ OFDM symbols for frame structure; but it may corresponds to $n_2$ OFDM symbols for frame structure. In the particular example according to FIG. 16B, $n_1$ and $n_2$ have a relation of: $n_1=2n_2$. Hence, the OFDM symbol gap can be longer than one time slot duration in for certain numerology, in such a case, the CSI-RS resource mapping pattern may span two consecutive slots. To deal with the differences of the numerology and frame structure for the CSI-RS mapping, it is proposed to pre-configure parameters differently dependent upon the subcarrier spacing of the numerology and frame structure for the CSI-RS configuration.

In one example, the numerology and frame structure for the CSI-RS configuration are the same as those for SS block mapping (i.e., SS block default numerology). In such a case, the CSI-RS configuration and mapping parameters (i.e., slot offset, OFDM where to map the two OFDM symbols corresponding to a CSI-RS resource) are determined by the subcarrier spacing, e.g., according to TABLE 2.

TABLE 2

CSI-RS configuration parameters

| Subcarrier spacing for CSI-RS | Number of slots in a frame | CSI-RS configuration parameters |
|---|---|---|
| 60 kHz | 40 | Slot offset = X<br>Two OFDM symbols, n and n + 7 in each CSI-RS slot are used for mapping of a CSI-RS resource. FIG. 16A corresponds to this case. |
| 120 kHz | 80 | Slot offset = 2X<br>OFDM symbol m in two consecutive slots are used for mapping of a CSI-RS resource. The one time slot in FIG. 16A now corresponds to two slots, and OFDM symbols x and y correspond to OFDM symbol m in two consecutive slots. |
| 240 kHz | 160 | Slot offset = 4X<br>OFDM symbol l in two slots spaced apart by one slot (e.g., slots 4X and 4X + 2) are used for mapping of a CSI-RS resource. The one time slot in FIG. 16A now corresponds to four slots, and OFDM symbols x and y correspond to OFDM symbol l in slot 4X and 4X + 2. |

In some embodiments for QCL between SS blocks and CSI-RS, the CSI-RS is used for fine time-frequency tracking after acquiring a coarse time-frequency from an SS block. Hence, it is necessary to relate the CSI-RS resources and SS blocks, e.g., utilizing a QCL relation. A UE may be configured to assume that antenna ports in a CSI-RS resource (on a time unit, or on 1 or 2 sub-time units) is QCL with an SS block, in a first set of QCL parameters. The first set of QCL parameters comprises one or more of Rx beam related spatial parameters, gain, delay and Doppler. In one example, the first set of QCL parameters is all of these four types of parameters, so that further time-frequency refinement can be performed taking the parameters estimated in the SS block as a starting point.

An SS block that is QCL with a CSI-RS resource in the first set of QCL parameters can be pre-configured.

Figure 17:
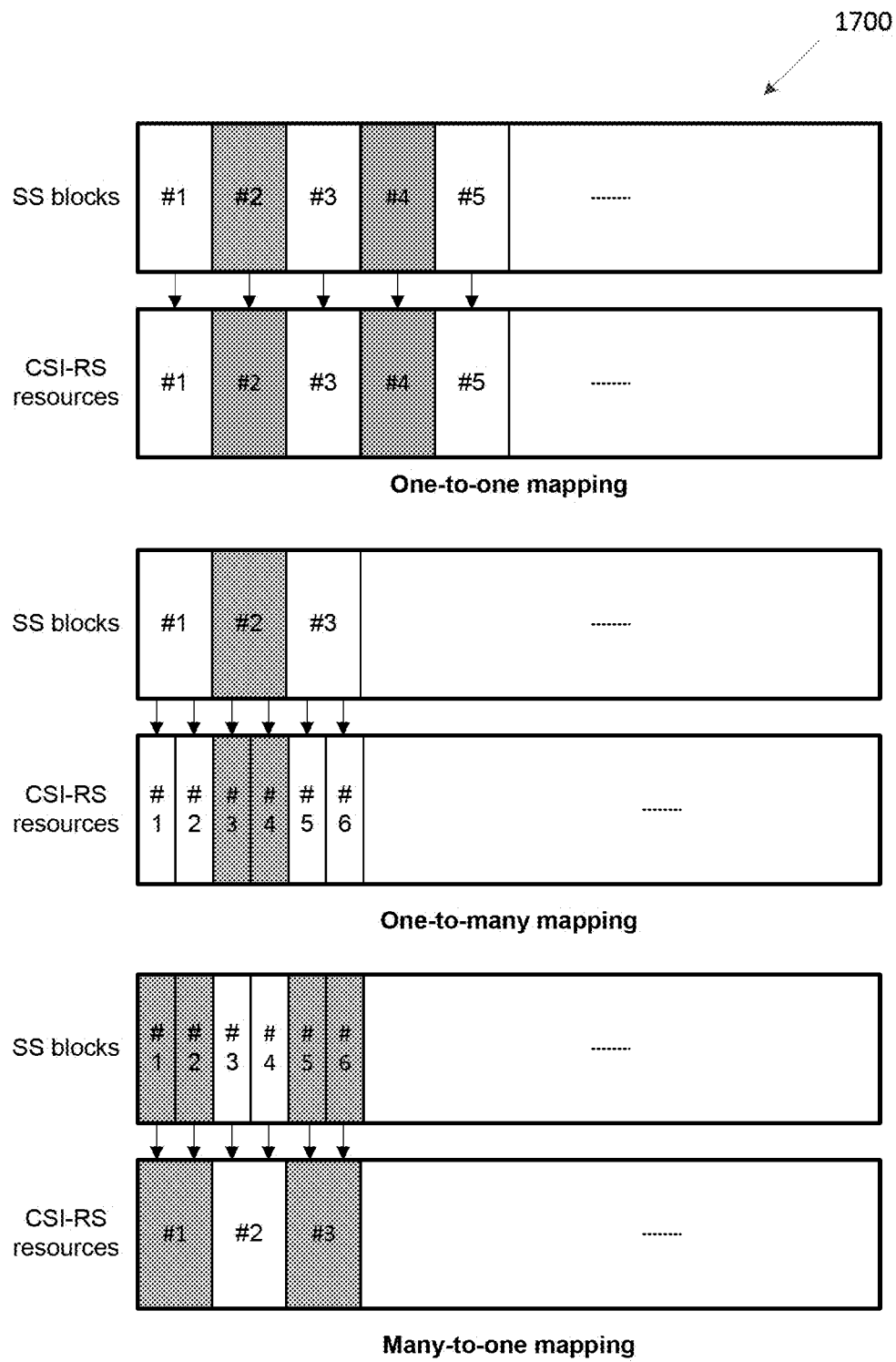
FIG. 17 illustrates an example QCL association between SS blocks and CSI-RS resources according to embodiments of the present disclosure.

FIG. 17 illustrates an example QCL association between SS blocks and CSI-RS resources 1700 according to embodiments of the present disclosure. An embodiment of the QCL association between SS blocks and CSI-RS resources 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

FIG. 17 illustrates three examples of the QCL association between SS blocks and CSI-RS resources. In one example, one-to-one mapping between SS blocks and the CSI-RS resources is pre-configured. The CSI-RS resources may be one-to-one mapped to (sub)time units for the beam management CSI-RS. CSI-RS resource x is QCL with SS block x, where x=0, 1, . . . , $X_{max}$−1. In another example, one-to-many (k) mapping is pre-configured. k CSI-RS resources are QCL with one SS block; CSI-RS resources kx, kx+1, . . . , kx+k−1 is QCL with SS block x, where k=1, 2, . . . . Here, k may be signaled in the broadcast signaling (e.g., RMSI or PBCH or SIB), or RRC configured.

In another example, many (j)-to-one mapping is pre-configured or signaled to the UE. A CSI-RS resource is QCL with j SS blocks; the CSI-RS resource is QCL with SS blocks jy, jy+1, . . . , jy+j−1, where j=1, 2, . . . , and y=0, 1, . . . . Here, j and y may be signaled in the broadcast signaling (e.g., RMSI or PBCH or SIB), or RRC configured.

In one embodiment, an SS block index is configured for each CSI-RS resource, such that the UE may assume that the SSS antenna ports in the SS block are QCL with the CSI-RS resource in the first set of QCL parameters.

In one embodiment, an SS block index is configured for each resource setting or each resource set (for CSI-RS), such that the UE may assume that the SSS antenna ports in the SS block are QCL with the CSI-RS resources in the setting/set in the first set of QCL parameters.

In one embodiment, the SS blocks and CSI-RS resources in this embodiment can be replaced with the first set of CSI-RS resources and the second set of CSI-RS resources.

In one embodiment, CSI-RS resource in this embodiment is replaced with (CSI-RS resource, antenna port).

In some embodiments for CSI-RS configuration in RRC for RRM measurements, CSI-RS can be configured for RRM measurement, whose mapping pattern may be configured similarly as in other embodiments in the present disclosure.

In legacy LTE specifications, the following parameters are configured for the RRM measurement based on CSI-RS. Below, DMTC refers to "DRS measurement timing configuration." Configuration of these parameters can be a good starting point to develop NR specifications for CSI-RS for the L3 mobility.

```
MeasDS-Config-r12 ::=        CHOICE {
    release                      NULL,
    setup                        SEQUENCE {
        dmtc-PeriodOffset-r12        CHOICE {
            ms40-r12                     INTEGER(0..39),
            ms80-r12                     INTEGER(0..79),
            ms160-r12                    INTEGER(0..159),
            ...
        }
},
```

```
            ds-OccasionDuration-r12        CHOICE {
                durationFDD-r12
            INTEGER(1..maxDS-Duration-r12),
                durationTDD-r12
            INTEGER(2..maxDS-Duration-r12)
            },
            measCSI-RS-ToRemoveList-r12    MeasCSI-RS-ToRemoveList-r12
        OPTIONAL, -- Need ON
            measCSI-RS-ToAddModList-r12    MeasCSI-RS-ToAddModList-r12
        OPTIONAL, -- Need ON
            ...
        }
    }
    MeasCSI-RS-ToRemoveList-r12 ::=  SEQUENCE (SIZE (1..maxCSI-RS-Meas-r12))
    OF MeasCSI-RS-Id-r12
    MeasCSI-RS-ToAddModList-r12 ::=  SEQUENCE (SIZE (1..maxCSI-RS-Meas-r12))
    OF MeasCSI-RS-Config-r12
    MeasCSI-RS-Id-r12 ::=            INTEGER (1..maxCSI-RS-Meas-r12)
    MeasCSI-RS-Config-r12 ::=        SEQUENCE {
            measCSI-RS-Id-r12                MeasCSI-RS-Id-r12,
            physCellId-r12                   INTEGER (0..503),
            scramblingIdentity-r12           INTEGER (0..503),
            resourceConfig-r12               INTEGER (0..31),
            subframeOffset-r12               INTEGER (0..4),
            csi-RS-IndividualOffset-r12      Q-OffsetRange,
            ...
    }
```

In NR, above configuration parameters are not likely to be sufficient because multiple beams need to be supported, which may be accomplished by transmitting multiple SS blocks in a cell. For example, if a set or a setting of CSI-RS resources (or CSI-RS resource) is configured per SS block, the number of CSI-RS configured per cell can be as many as the number of maximum number of SS blocks or the number of actually transmitted SS blocks. Hence, for reducing the signaling overhead in both RRC and X2, it seems desirable to make the configuration signaling such that multiple CSI-RS resources corresponding to a cell are configured in a batch.

In one embodiment, a UE is configured with an individual set/setting of CSI-RS resources (or a CSI-RS resource) that corresponds to an SS block of a cell. Here, the association implies either synchronization timing, or QCL (as in other embodiments) or both. For this purpose, the UE is configured with an SS block ID as well as a cell ID, and also corresponding resource configurations, slot timing. The slot timing can be configured in terms of a slot offset to the SS block slot occasion/location. The periodicity and slot offset of the CMTC (CSI-RS measurement timing configuration) may be obtained similarly to DMTC in the legacy LTE specifications.

A configuration information element (IE), denoted as MeasCSI-RS-Config, is constructed according to this method in the below box. This method is a simple extension of the legacy LTE, but it seems to require lots of configuration (IEs) for the UE to report RRM measurement. In addition, additional mechanism is likely to be necessary to facilitate UE to measure the cell-level quantities from these individual quantities corresponding to individual CSI-RS configurations. One possibility is that the UE is configured to derive the cell-level RSRP/RSRQ for a cell with cell ID X, using CSI-RS configured by multiple MeasCSI-RS-Config IEs whose configured cell ID is X.

```
MeasCSI-RS-Config :: = SEQUENCE {
    Cell ID               INTEGER (0, ..., Max_Cell_ID)
```

-continued

```
    Virtual Cell ID        INTEGER       (0,           ...,
    Max_Virtual_Cell_ID)
    SS block ID            INTEGER (0, ..., Max_SS_Block_ID)
    Resource configuration INTEGER       (0,           ...,
    Max_Resource_ID)
    Slot offset            INTEGER (0, 1, 2, ...)
    ...
}
```

Hence, a better method would be to configure a set/setting of multiple CSI-RS resources/sets that corresponds to a cell in a batch. To design this batch configuration, the multiple CSI-RS resources/sets can be configured with a set of configuration parameters. One possibility is to configure the slot timing of the multiple CSI-RS resources/sets with respect to that of SS blocks. For this purpose, the CSI-RS configuration for a cell or a virtual cell may include at least one of the following parameters. Here, some of these parameters not configured in the CSI-RS configuration may be pre-configured, or configured in other means, e.g., dynamic signaling or broadcast signaling.

In some embodiments, "CSI-RS" may refer to any of CSI-RS resource, resource set, setting. The corresponding construction of IE MeasCSI-RS-Config is illustrated in the below box, and the details of these parameters are also explained below the box.

```
MeasCSI-RS-Config :: = SEQUENCE {
    Cell ID                      INTEGER (0, ..., Max_Cell_ID)
    Virtual Cell ID              INTEGER       (0,           ...,
    Max_Virtual_Cell_ID)
    Cell-level SS block configuration
    Number of CSI-RS associated per SS block
    Batch RE mapping resource configuration
    Batch slot offset configuration
    ...
}
```

In such embodiments, a virtual cell ID is a scrambling ID (initialization) to be used for CSI-RS sequence generation.

In such embodiments, a cell-level (CSI-RS resource group level) SS block configuration is a parameter that represents the SS blocks of a cell, for the UE to figure out a number of CSI-RS resources/sets to measure for the cell; and the CSI-RS timing with respect to each identified SS block. In one instance, the parameter corresponds to a list of SS block IDs. When configured with this parameter, the UE is configured to use only those CSI-RS measurements associated with the indicated SS blocks of the cell, which are identified by the cell ID and SS block IDs, in order to derive and report the cell-level RSRP/RSRQ of the cell. In another instance, the parameter corresponds to a number of SS blocks, say, $N_S$. In this case, the UE is configured to use only those CSI-RS measurements associated with SS blocks 0, . . . , $N_S-1$ of the cell, which are identified by the cell ID and SS block IDs, in order to derive and report the cell-level RSRP/RSRQ of the cell.

In such embodiments, a number of CSI-RS associated per SS block is a number of CSI-RS resources (or resource sets, or resource settings) that are associated with an SS block. This number is denoted as $C_S$. If the total number of CSI-RS configured by MeasCSI-RS-Config is C, and the number of SS block configured by Cell-level SS block configuration is S, $C_S$ is equal to C/S; in other words, $C=C_S \cdot S$.

In such embodiments, a batch RE mapping source configuration is information on the RE mapping of $C_S$ CSI-RS associated with each SS block. This may correspond to a resource element index (k, l), representing a first subcarrier and a first OFDM symbol to map the CSI-RS. In one instance, the parameter corresponds to a list of $C_S$ resource configuration parameters, each corresponds to a RE mapping configuration of one of $C_S$ CSI-RS associated with an SS block. Every SS block is associated with $C_S$ CSI-RS, and a common set of RE mapping configurations is applicable to the $C_S$ CSI-RS of all the indicated SS blocks. In another instance, the parameter corresponds to a resource configuration parameter of a first CSI-RS associated with the SS block. The RE mapping (k,l) of the rest of CSI-RS are derived by function(s) of (k, l) of the first CSI-RS resource.

In such embodiment, a batch slot offset configuration is information on the $C_S$ slot offset values with respect to a slot number corresponding to each SS block. In one instance, the parameter corresponds to a list of $C_S$ slot offset values, each corresponds to a slot offset of one of $C_S$ CSI-RS associated with an SS block. Every SS block is associated with $C_S$ CSI-RS, and a common set of slot offset values is applicable to the $C_S$ CSI-RS of all the indicated SS blocks. In another instance, the parameter corresponds to a slot offset parameter of a first CSI-RS associated with the SS block. In one example, the slot offsets for the rest of CSI-RS associated with the SS block is the same as that for the first CSI-RS.

In one example, a single CSI-RS is configured per SS block (e.g., $C_S=1$ is preconfigured), and the slot timing of i-th CSI-RS resource/set is determined as a function of i-th SS block of the cell. In one such case, a UE is configured with an integer, say o, representing a slot offset of each CSI-RS with respect to each SS block. When the i-th SS block is transmitted in slot n, then based on the configuration, the UE is configured to receive the i-th CSI-RS in slot n+o.

In another example, $C_S (\geq 1)$ CSI-RS are configured per SS block (this implementation may be useful when SS blocks are transmitted in single-frequency network). When the cell transmits S SS blocks, the total number of configured CSI-RS becomes $C=C_S \cdot S$, which can be partitioned into S groups of $C_S$ CSI-RS. In this case, group configuration of CSI-RS seem to be efficient. The slot timing of the $C_S$ CSI-RS belonging to an s-th group is determined as a function of s-th SS block of the cell. In one such example, a UE is configured with an integer, say o, representing a common slot offset of all the CSI-RS belonging to a CSI-RS group with respect to each SS block. When the s-th SS block is transmitted in slot n, then based on the configuration, the UE is configured to receive the CSI-RS belonging to s-th CSI-RS group in slot n+o.

The aforementioned examples allow the network to configure CSI-RS slots of the multiple CSI-RS resources/sets in a batch, but the network still needs to configure the time-frequency resources of one or more CSI-RS resources/sets in each selected slot.

Suppose that the time frequency resource to map a CSI-RS spans a number of OFDM symbols, say N OFDM symbols, N=1, 2, 4, . . . . This integer N can be pre-configured or configured together with other parameters. Suppose further that a time slot is configured to contain M CSI-RS (e.g., according to the offset parameter o). M may correspond to a product of $C_S$ and a number of SS blocks that are mapped in each slot, wherein $C_S=1, 2, \ldots$, if a common offset parameter o is applicable to all the $C_S$ CSI-RS associated with an SS block.

When the second alternative is used for the RE mapping resource configuration, in which the RE mapping of the rest of the CSI-RS are determined as a function of the first CSI-RS, two possibilities can be further devised. One possibility is to consecutively map these M CSI-RS resources/sets in the time domain, in which case no additional parameters are configured for the time domain mapping of the M CSI-RS resources/sets in each slot, other than the first of the M CSI-RS resources/sets. For the first CSI-RS resource/set, a resource configuration parameter is provided so that the UE can identify at least a starting OFDM symbol, l, for the CSI-RS mapping (a starting subcarrier number k, may also be provided by the resource configuration parameter).

For example, suppose that a UE is configured with M=2 CSI-RS resources/sets in each slot; and N=4 and l=2. In this case, the first CSI-RS resource/set spans OFDM symbols 2 (=l), . . . , 5 (=l+N−1); and the second CSI-RS resource/set spans OFDM symbols 6 (=l+N), . . . , 9 (l+2N−1). Another possibility is to use an OFDM-symbol offset parameter, say p, between the multiple CSI-RS resources/sets to be mapped in each slot. The parameter p may be pre-configured or configured together with other parameters. For example, suppose that a UE is configured with M=3 CSI-RS resources/sets in each slot; and N=2, p=3 and l=2. In this case, the first CSI-RS resource/set spans OFDM symbols 2 (=l), 3 (=l+N−1); the second CSI-RS resource/set spans OFDM symbols 5 (=l+p), 6 (l+p+N−1); and the third CSI-RS resource/set spans OFDM symbols 8 (=l+2p), 9 (=l+2p+N−1). In such examples, when the subcarrier number parameter k is configured, the parameter is commonly applicable for all the CSI-RS resources/sets for the cell.

In some embodiments for single-beam vs. multi-beam operations, single beam operation tends to be used more in sub6 GHz carrier frequency, and multi-beam operation tends to be used more in over 6 GHz carrier frequency. Some embodiments in the present disclosure assume multi-beam operation only, and hence, some further configuration may be necessary to make these embodiments relevant for single-beam operation as well.

In one embodiment, the number of the CSI-RS resources mapped in each slot and the length of sub-time units are determined by the carrier frequency. If the carrier frequency is a first range, only a single ($Q_1=1$) CSI-RS resources are mapped in each slot; if a second range, two ($Q_1=2$) CSI-RS resources; if a third range, four ($Q_1=4$) CSI-RS resources. The length of sub-time units are determined by the number of CSI-RS resources, which is approximately $1/Q_1$-th of the time unit.

In some embodiments for sub-time unit partition, in a first CSI-RS resource type, a CSI-RS resource comprises a time unit, which comprises $Q_1$ sub-time units constructed with IFDMA. In a second CSI-RS resource type, a CSI-RS resource comprises a sub-time unit, which corresponds to a short OFDM symbol constructed by applying $Q_1$ times subcarrier scaling to the default subcarrier spacing. A CSI-RS configuration may include a CSI-RS resource type, for UE to distinguish the first and the second CSI-RS resource type.

In some embodiments for a configuration of additional SS burst sets, one potential method to reduce network power consumption is to specify a long default periodicity for initial cell selection, e.g., 80 ms. One issue is that it could result in long latency in UE's detecting cell initially and decoding PBCH, when power accumulation is necessary. Another issue is related to the idle mode operation. If the periodicity update is cell specific, the UE needs to assume the long default periodicity for cell measurement after waking up from IDLE mode DRx sleeping (e.g., to receive paging). This requires UE to listen to the idle mode SS much longer than currently allowed duration in LTE (typically 6 msec); and is likely to drain UE power quicker, and may be avoided. Still other issue is involved with UE Rx beam sweeping.

When the UE adopts Rx beam sweeping, UE may need to try multiple Rx beams in a number of SS burst sets to find out the best Tx/Rx beam pair for RACH process. If the default periodicity is long, the RACH beam selection may also take longer time. Moreover, in idle mode, the UE needs to be awake very long time to select appropriate Rx beam that is used for receiving paging message. This would occur severe power consumption in UE side. If this time duration is too long, a UE Rx beam can be changed during that period and may also give impact on the performance of paging reception.

When the UE in IDLE or CONNECTED is informed by the network with a shorter SS burst set periodicity, the latency problems can be mitigated to some extent. The UE may be informed in serving cell's MIB or SIB or RRC signaling of an updated periodicity of the serving cell, but the UE also needs to be informed by the network on the updated periodicity of neighbor cells, to efficiently perform PCID detection, SI decoding, and connected-mode RRM measurements of the neighbor cells. This neighbor cells' information may be conveyed to the UE via serving cell's SIB or RRC signaling or neighbor cell's MIB.

Among these options, the option of neighbor cell's MIB signaling may not be a valid solution as UE needs to know the updated periodicity of neighbor cells before decoding the neighbor cell's MIB. SIB signaling from the serving cell (preferably remaining minimum system information on $2^{nd}$ broadcast channel or on PDSCH, rather than other SI in order to also help IDLE UEs decoding latency) may be feasible and desirable if UE is allowed to make a simple assumption that the updated periodicity is applicable to all the cells. In one example, the updated periodicity of the SS burst sets of a serving cell is configured via MIB of a serving cell. In another example, the updated periodicity of the SS burst sets of a neighbor cell is configured via RMSI on $2^{nd}$ broadcast channels, SIB on PDSCH, or UE-specific RRC signaling. The identity of the neighbor cell may also be indicated together.

In some embodiment for updated configurations for the cell-wide CSI-RS in RRC connected mode, when a UE is in CONNECTED mode, the UE can be provided with further information regarding the cell-wide CSI-RS, or in a DCI in PHY. The cell-wide CSI-RS can be used for beam management for the purpose of the initial beam alignment and beam switching. The additional information comprises one or more of the following. In one example for an updated CSI-RS periodicity, a UE measures more accurately (if the updated periodicity is shorter than the cell-specific one), or to measure with less UE power consumption (if the updated periodicity is longer than the cell-specific one). This can be conveyed in RRC signaling. In another example, information on a subset of CSI-RS resources for UE to measure is to reduce the burden of UE measurement when the full set of cell-specific CSI-RS resources is large. The subset is selected from the set of K CSI-RS resources. The subset signaling can be done in bitmap, wherein each bit state of b=1 at position p indicates that CSI-RS resource p is configured for UE to measure; b=0 indicates UE is configured not to measure CSI-RS resource p. UE needs to measure the beam RSRPs on the subset of the CSI-RS resources, and report a subset of selected RSRPs among the beam RSRPs. This can be conveyed in MAC signaling.

In yet another example, the purpose of information on a subset of CSI-RS ports for UE to measure is similar to the information on a subset of CSI-RS resources. When configured with a subset of CSI-RS ports, the UE needs to measure beam RSRPs only on the configured antenna ports across all the K resources, and report a subset of selected RSRPs among the beam RSRPs. This can be conveyed in MAC signaling.

In some embodiments for updated configurations for the beam refinement CSI-RS in RRC connected mode, suppose that the UE is configured with a first set of CSI-RS resources and a second set of CSI-RS resources. The first set of CSI-RS resources is configured for UE to measure beam-specific RSRPs in the whole cell, and hence the number of beams to measure is relatively large, and a coarse or a wide beam is used for the beams. The second set of CSI-RS resources is configured for UE to measure beam-specific RSRPs so that the beam refinement can be performed. The first and the second sets of CSI-RS resources may be configured UE-specifically. Alternatively, the first set of CSI-RS resources is configured cell-specifically (i.e., broadcast signaling, e.g., MIB/RMSI/SIB) and the second set of CSI-RS resources is configured UE-specifically. For the first set of CSI-RS resources, UE is allowed to make measurement across multiple time slots to derive beam-specific RSRPs; for the second set of CSI-RS resources, UE may make measurement per time slot to derive beam-specific RSRPs.

A QCL resource for each CSI-RS resource of the second set in a set of QCL parameters can be a CSI-RS resource or a combination of (a CSI-RS resource, an antenna port) of the first set. For initial configuration of the second set, the RRC configuration may contain information of the QCL resource per CSI-RS resource of the second set. As UE moves around, based on the measurement reporting results on the first set, the network may decide to update the QCL resource of each CSI-RS resource of the second set. The updated QCL resource may be indicated via DCI or MAC CE signaling, so as to reduce the signaling overhead and delay. The set of QCL parameters comprises one or more of Rx beam related spatial parameters, gain, delay and Doppler. In one example, suppose that the UE is configured with two sets of CSI-RS: the first set: resources 0-99; and the second set: resources 0-2.

When the second set is configured by RRC, the UE is further indicated with the CSI-RS resource IDs of the first set, so that the UE may assume that each CSI-RS of the second set is QCL in the set of parameters with the CSI-RS corresponding to the CSI-RS resource ID of the first set. In one example, RRC configuration for the second set is configured according to resource 0, for example, QCL with resource x in the first set and/or RE mapping pattern, number of antenna ports, periodicity, offset, power control, sub-time unit composition, etc. In another example, RRC configuration for the second set is configured according to resource 1 for QCL with resource y in the first set, for example, RE mapping pattern, number of antenna ports, periodicity, offset, power control, sub-time unit composition, etc. In one example, RRC configuration for the second set is configured according to resource 2 for QCL with resource z in the first set, for example, RE mapping pattern, number of antenna ports, periodicity, offset, power control, sub-time unit composition, etc.

In another example, RRC configuration for the second set is configured according to: resource 0: QCL with resource x in the first set; resource 1: QCL with resource y in the first set; resource 2: QCL with resource z in the first set; and/or RE mapping pattern, number of antenna ports, periodicity, offset, power control, sub-time unit composition, etc.

The RE mapping pattern for resource 0 may be determined according to the configured RE mapping parameter. The RE mapping patterns for Resources 1 and 2 may be determined by applying a time or frequency offset to the RE mapping pattern for resource 0. For example, for resource 1, one time unit shift is applied to the RE mapping pattern of resource 0; and for resource two, two time unit shift is applied to the RE mapping pattern of resource 0. The other parameters, i.e., number of antenna ports, periodicity, offset, power control, sub-time unit composition, etc., may be commonly configured for all the three resources. Sub-time unit composition may correspond to the number of sub-time units comprising a time unit.

The aforementioned examples illustrate a case where three resources are configured for the second set. In general, the number of resources that can be configured to the second set can be an integer number, e.g., 1, 2, 3, . . . ; the methods in this embodiment is applicable to any integer number of such resources.

When a UE moves around in a cell (maybe to a vicinity of different TRPs or to different TRP beams), a subset of configuration parameters, e.g., QCL relations, of the CSI-RS resource in the second set may need to be updated. One method to update the subset of parameters would be to RRC re-configure the whole second set, but this involves large delay and signaling overhead. Hence, a better alternative is to update the parameters in the second set utilizing either MAC CE or PHY signaling. The update signaling is lighter than the initial RRC signaling in that it only updates a subset of parameters; the other configurations are not updated and maintained to be the same.

The update command may include individual activation & deactivation of the CSI-RS resources in the second set. The update command may include the following information: a resource index (or indices) in the second set to update; and/or corresponding resource index (indices) in the first set to make QCL relation. For example, from the update command, the UE is instructed to update the QCL resource of resource 1 in set 1 to be resource w in the first set, from resource x in the first set.

Alternatively, the update command may include information of updated parameters for all the activated resources in the second set. In this case, only the updated resource indices are signaled. For example, from the update command, the UE is instructed to update the QCL resources. The updated configuration for the second set is configured: resource 0 for QCL with resource a in the first set; resource 1 for QCL with resource b in the first set; and resource 2 for QCL with resource c in the first set. The update command contains three numbers {a, b, c} to indicate the resource indices of the first set.

In an alternative embodiment, a QCL resource corresponds to a combination of (CSI-RS resource, antenna port), instead of a CSI-RS resource in the first resource. In such a case, a resource index in the first set is also replaced with an SS block ID.

In an alternative embodiment, a resource in the second set corresponds to a combination of (CSI-RS resource, antenna port), instead of a CSI-RS resource.

In an alternative embodiment, a QCL resource corresponds to an SSS antenna port(s) in an SS block, instead of a CSI-RS resource in the first resource. In such a case, a resource index in the first set is also replaced with an SS block ID.

In some embodiments, for an SS block repetition for coverage extension, for coverage extension, the network may decide to transmit the same set of signals in different SS blocks in a SS burst set. Suppose that the total number of SS blocks in a SS burst set is N. The SS blocks are partitioned into $N_1$ groups of $N_2$ SS blocks, wherein $N=N_1N_2$. In one example, N=16, $N_1$=8 and $N_2$=2; and the SS blocks comprising a group have consecutive SS block indices.

In the initial cell selection, this information cannot be conveyed to the UE, and the UE may make a default assumption of no group partition of the SS blocks. However, when the UE is in CONNECTED or IDLE mode, the UE may be additionally configured of the SS block group partition information, so that the UE can detect SS block related parameters in a more reliable & efficient manner. The parameters include the actual number of transmitted SS blocks, number of SS blocks to comprise a group. In one example, UE figures out the SS block grouping upon receiving these parameters, with constructing a partition in which consecutive $N_2$ SS blocks comprise a group, from the first SS block (i.e., SS block with the smallest SS block index). The parameters can be conveyed in broadcast signaling (MIB, RMSI, SIB, etc.), or RRC or MAC signaling or DCI signaling.

In some embodiments for L3 CSI-RS configuration, L3 CSI-RS is non-always-on, UE-specifically configured and requiring separate sync signals; the L3 CSI-RS shares commonality with LTE discovery signals, and similar requirements/configuration properties are applicable. It may be noted that LTE discovery signals are designed to support mainly single-beam multi-TRP scenarios; hence the LTE discovery signal framework may not be able to be simply reused in NR which supports multi-beam multi-TRP scenarios. Hence, it is proposed to take LTE discovery signal configuration framework as baseline, and extend the LTE discovery signal configuration framework as necessary. TABLE 3 summarizes properties of LTE discovery signals and their limitations, and possible improvements for design of L3 CSI-RS in the new radio systems.

TABLE 3

LTE discovery signal configuration and further design considerations for L3 CSI-RS

| Properties | LTE Discovery Signals | Design basis | Further design considerations |
|---|---|---|---|
| Signals provided for sync timing for CSI-RS | PSS/SSS corresponding to the configured physical cell ID | SS block(s) corresponding to the configured physical cell ID | Multi-beam support, e.g., spatial (Rx beam) QCL between resource(s) of CSI-RS and SS block(s) |
| RS timing configuration | Periodic DMTC periodicity and offset CSI-RS offset (periodicity is the same as DMTC periodicity) | Periodic (SS block periodicity and offset) CSI-RS periodicity and offset | Relation of periodicity values of CSI-RS and SS block: same or different? Offset configuration ref.: wrt. an associated SS block or wrt. frame boundary |
| CSI-RS measurement unit | One RSRP per single-port resource (no multi-port resource configurable) | Per port and/or per resource | Applicable configurations for L3 CSI-RS measurement and reporting, e.g., maximum number of antenna ports per resource and per-port QCL |
| CSI-RS RE mapping configuration | One configuration per resource | FFS | Improvement to minimize signalling overhead to configure RE mapping of multi-beam CSI-RS resources corresponding to a cell or a virtual cell |
| Configurable BW | N/A | Yes | Details |
| Sequence generation parameters | VCID | FFS, with considering UE group ID, VCID, etc. | Use cases and possible spec support |
| Numerology | N/A | FFS | Same vs. different (configurable) numerology for CSI-RS and SS blocks |
| QCL | N/A | FFS | Implicit vs. explicit configurations of spatial QCL between CSI-RS and SS blocks |

In some embodiments for association of SS blocks to CSI-RS resource, in contrast to the LTE in which a cell is configured to transmit a single PSS/SSS/PBCH (i.e., a single SS block), an NR cell may be configured to transmit multiple SS blocks with applying potentially different beams for the SS blocks. In LTE DRS configuration, the configured physical cell ID and DMTC periodicity/offset configuration inform UE of an OFDM symbol level timing of single PSS/SSS to detect; and the CSI-RS sync timing is obtained from the detected single PSS/SSS. On the other hand, in the NR multi-beam scenarios, the configured physical cell ID corresponds to multiple time locations (SS blocks) which potentially have different sync timing. Hence, it can be beneficial to inform UE an SS block of a cell to acquire the sync timing of a CSI-RS resource or a CSI-RS resource set.

In over 6 GHz systems in which UE Rx beamforming may be used for combating high pathloss, an SS block can also be associated with a CSI-RS resource in a set of QCL parameters including spatial QCL parameters. When UE is configured with an SS block that is spatially QCL'ed a CSI-RS resource, the UE is effectively allowed to use the same or spatially-correlated Rx beam(s) for receiving both the CSI-RS resource and the SS block, which minimizes/reduces UE latency and power consumption for measuring RSRP/RSRQ on the CSI-RS resource.

In the aforementioned embodiment, "CSI-RS resource" is assumed to comprise multiple ports; "CSI-RS resource" can be replaced with "CSI-RS resource set" comprising multiple CSI-RS resources each comprising one or two ports. Hence, it is proposed to indicate an associate an SS block with a configured CSI-RS resource for sync timing reference; and QCL reference in spatial parameters.

In one embodiment, an SS block that is associated with a CSI-RS resource is to individually indicate an SS block per CSI-RS resource. In such embodiment, however, becomes inefficient in terms of signalling overhead when the number of CSI-RS beams per cell is many. To see this, consider a case where 64 SS blocks are configured per cell, a composite beam comprising four (4) beams is used per SS block, and four unit CSI-RS resources are configured for the four beam. Then for each cell, total number of CSI-RS resources is 256. In this case, for CSI-RS measurement configuration for just 3 neighbour cells and a serving cell, up to 1024 SS block identities need to be indicated for the CSI-RS resources.

A better alternative is to indicate SS block identities in a batch per CSI-RS resource group, formed by a group of CSI-RS resources whose timing sync references are identified by a physical cell ID and whose scrambling sequences are the same. For configuring measurement of cells for which the network does not have prior knowledge, the network may be able to configure all the beams (or CSI-RS resources) that are associated with all the (actually transmitted) SS blocks. On the other hand, for configuring measurement of cells for which the network does have prior knowledge (e.g., based on the prior reports), the network may also be able to configure a subset of beams (or CSI-RS resources) that are associated with a subset of (actually transmitted) SS blocks.

These two network configurations can be achieved by indicating a list of SS blocks and association information between the indicated SS blocks and the configured CSI-RS resources, for the CSI-RS configuration associated with a physical cell ID and a scrambling sequence generation. The association information can be a number of CSI-RS resources associated per SS block. In one example, a CSI-RS resource group corresponds to $N_P$ number of CSI-RS resources (ports); and one-to-one mapping is assumed between the CSI-RS resources and indicated SS blocks. In this case, the number of CSI-RS resources associated per SS block is also $N_P$; and the number of indicated SS blocks and the number of configured CSI-RS resources are the same.

associated with the configured CSI-RS resources, and $\log_2(N_P)$ bit parameter indicates the number of unit resources per resource. In this case, CSI-RS resource i is associated with i-th "turned on" SS block indicated by the bitmap. The number of CSI-RS resources and the number of "turned on" SS blocks (i.e., the number of "1" in the bitmap) are to be the same.

Figure 18:
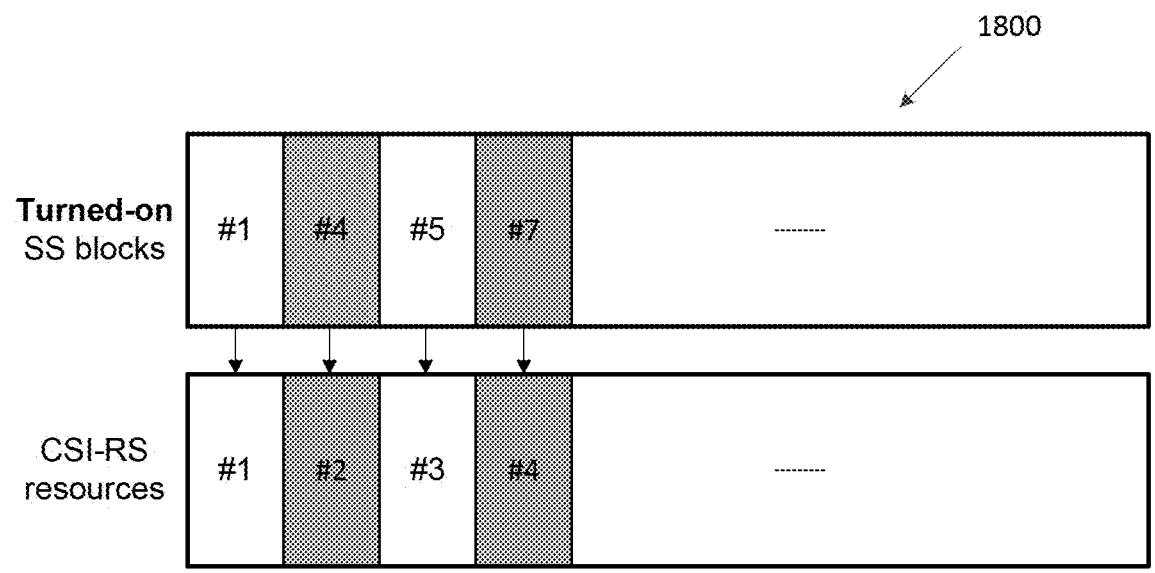
FIG. 18 illustrates an example association of CSI-RS resources and turned on SS blocks according to embodiments of the present disclosure.

FIG. 18 illustrates an example association of CSI-RS resources and turned on SS blocks 1800 according to embodiments of the present disclosure. An embodiment of the association of CSI-RS resources and turned on SS blocks 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

FIG. 18 illustrates the association of CSI-RS resources and "turned on" SS blocks. The UE is provided with a

TABLE 4

Configuration of SS block association to CSI-RS

| | Indication method | Number of states (or bits) for the configuration |
|---|---|---|
| Per Unit resource configuration | A list of up to 256 SS block IDs | Up to 2048 bits, i.e., 64^256 states (=64 possible SS block IDs configured for each of 256 unit resources) |
| Batch configuration Alt 1 | A 64-bit map for indicating on/off states of the up to 64 SS blocks; and a number of unit resources per SS block; $N_{SS}$ groups of $N_P$ unit resources are respectively associated with $N_{SS}$ SS blocks. | Up to 66 bits, i.e., 4 * 2^64 states (=the 64-bit map; and $N_{Pmax}$ = 4 states for indicating the number of unit resources per SS block) |
| Batch configuration Alt 2 | A number of SS blocks, $N_{SS}$, (indicates that SS blocks 0, 1, . . . , $N_{SS}$ − 1 are on and the others are off); and 4 states for the number of unit resources per SS block | Up to 8 bits, i.e., 64 * 4 states (=64 possible number of SS blocks; and 4 states for the number of unit resources per SS block) |
| Batch configuration Alt 3 | An L-bit map for indicating on/off states of the L SSBs. The bit positions with '1' correspond to the SSB indices associated with the OFDM symbols with CSI-RS in the slot | Up to L = 64 bits |

TABLE 4 illustrates three different indication methods of SS block association to a CSI-RS resource group that have a common physical cell ID and common scrambling information. Suppose that SS block association is indicated per CSI-RS resource, and up to 256 beams (or measurement units, which can be the product of the number of ports per resource and the number of resources; or the product of the number of resources per resource set and the number of resource sets) can be configured per group. If an arbitrary SS block can be associated with each unit resource, the total number of bits required for the SS block association configuration can be as many as 2048 bits per group, which brings significant signalling overhead. On the contrary, if the SS block association information is provided in a batch, for the configured CSI-RS resources, the signalling overhead can greatly be reduced.

In one alternative (batch configuration alt 1), up to 64 bit map is used for indicating on/off of SS blocks to be bitmap staring with [1001101 . . . ], which indicates that SS blocks #1, #4, #5 and #7 are turned on. The configured CSI-RS resources #1, #2, #3 and #4 belonging to the CSI-RS resource group are associated respectively with the "turned on" SS blocks #1, #4, #5 and #7 in an ascending order of the SS block ID.

In another alternative (batch configuration Alt 2), up to 64-state information is used for indicating the actually transmitted number of SS blocks, $N_{SS}$, and $\log_2(N_P)$ bit parameter indicates the number of unit resources per resource; then the UE is configured to assume that the first $N_{SS}$ SS blocks are transmitted and the others are muted.

Figure 19:
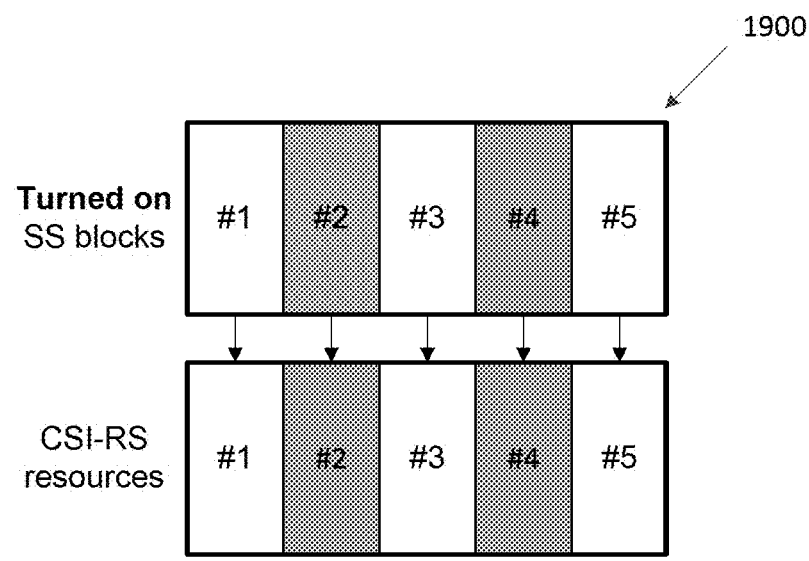
FIG. 19 illustrates another example association of CSI-RS resources and turned on SS blocks according to embodiments of the present disclosure.

FIG. 19 illustrates another example association of CSI-RS resources and turned on SS blocks 1900 according to embodiments of the present disclosure. An embodiment of the association of CSI-RS resources and turned on SS blocks 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

FIG. 19 illustrates the association of CSI-RS resources and "turned on" SS blocks. The UE is provided that the number of actually transmitted SS blocks is 5, which indicates that SS blocks #1 to #5 are turned on. The configured CSI-RS resources #1 to #5 belonging to the CSI-RS resource group are associated respectively with the "turned on" SS blocks #1 to #5 in an ascending order of the SS block ID.

In the aforementioned two alternatives, $N_{SS}$ configured CSI-RS resources comprising $N_P$ unit resources (ports) each are associated with $N_{SS}$ SS blocks by one-to-one mapping. An illustrative example of Alt 3: Suppose that SSB QCL configuration indicates an L=64 bit bitmap of [111100 . . . 00]; and the first bitmap (for time domain) of RE mapping indicates 14 bit bitmap of [1011010 . . . 0]. According to the first bitmap, the CSI-RS are mapped on OFDM symbols 0, 2, 3, 5; and according to the L-bit bitmap for QCL, the QCL'ed SSBs are SSBs 0, 1, 2, 3. Then, UE can one-to-one associate the OFDM symbols and SSBs to find one-to-one QCL relation: OFDM symbols 0, 2, 3 and 5 are respectively QCL'ed with SSBs 0, 1, 2 and 3.

In some embodiments for numerology for the configured CSI-RS resources, NR supports configurable numerology, and numerology settings for sync, data and CSI-RS are not necessarily the same. Hence, the L3 mobility CSI-RS configuration needs to take numerology aspects into account. A numerology setting includes subcarrier spacing, OFDM symbol duration, slot composition, etc., which may also affect signalling design for timing indication (i.e., especially timing offset).

In the legacy LTE CSI-RS RE mapping was designed per PRB, and hence it may be natural to consider per-PRB CSI-RS mapping in NR as well. However, the numerology assumed for the CSI-RS needs to be jointly taken into account with that for the data. In one alternative, a "data numerology setting" is used as reference numerology for CSI-RS, i.e., the CSI-RS RE mapping patterns are defined on the PRB grid defined with the data numerology. This approach, however, does seem to introduce various combinations to deal with, of a selected data numerology and a selected CSI-RS numerology as CSI-RS numerology can be chosen differently from the data numerology (i.e., sub-time units defined for beam management CSI-RS). For example, CSI-RS with numerology A is mapped on a PRB grid defined by data numerology B, where A and B are selected from the set of configurable numerology settings on each frequency band.

Hence, a simpler alternative could be to define CSI-RS RE mappings on a PRB grid defined by CSI-RS numerology, without considering the interaction between data and CSI-RS numerology settings. As long as the signalling design is flexible enough for CSI-RS, possible conflicts of CSI-RS with control/data can be avoided by network signalling implementations.

There are mainly two alternatives for the L3 mobility CSI-RS numerology setting: configurable numerology; and SS block numerology. Advantages of configurable numerology include flexibility and forward compatibility. It is furthermore noticed that the SS block numerology setting is just a special case of the set of configurable numerology settings, and hence it is proposed to adopt a configurable numerology for L3 mobility CSI-RS. The configured numerology setting is used for constructing PRB grid, and slot/frame structure (with 14 OFDM symbols per slot).

Hence, it is proposed that at least for L3 mobility CSI-RS, CSI-RS RE mapping patterns are constructed on a PRB grid defined by a CSI-RS numerology setting, irrespective of the configured data numerology. In addition, the CSI-RS numerology setting can be explicitly configured for the CSI-RS configured in a batch; and the CSI-RS numerology setting defines PRB grid and slot/frame structure with 14 OFDM symbols per slot.

In some embodiments for CSI-RS timing and RE mapping configuration, For the periodic transmission/reception of legacy discovery signals, DMTC is defined to indicate periodicity and offset for both CSI-RS and PSS/SSS, and a small offset is additionally defined for CSI-RS timing relative to the PSS/SSS timing. The small offset value is allowed to be up to 5 msec, so that the measurement duration taking into account both sync acquisition and CSI-RS measurement is short, and this short duration helps UE to save powers.

A similar operation/configuration can be considered/defined for NR. The principles of mapping L3 mobility CSI-RS close to SS blocks in time and same periodicity for L3 mobility CSI-RS and SS blocks may be kept for UE power saving. It is noted that it could be still possible that the same physical CSI-RS is used for L3 mobility and BM, but the network provides two different configurations for L3 mobility and BM, so that BM CSI-RS is measured more frequently (i.e., with shorter periodicity configured) than for L3 mobility CSI-RS. Hence, it is proposed that a CSI-RS measurement timing configuration (CMTC) is defined, comprising a periodicity and an offset that may be used for determining timing of both L3 mobility CSI-RS and SS burst sets. A CMTC is configured for each CSI-RS resource group.

Regarding the timing reference of an individual CSI-RS resource, two alternatives can be considered. In a first alternative, the timing reference is a frame boundary; and in a second alternative, the timing reference is an SS block timing. The measurement duration and complexity involved with the L3 mobility CSI-RS needs to be minimized, particularly when the L3 mobility CSI-RS is provided for neighbour cell measurement. If the frame boundary can be obtained without PBCH decoding, it could be ok to use the frame boundary as timing reference to the CSI-RS resources; however if PBCH decoding is required to obtain the frame boundary, using the SS block timing could be a better alternative for saving UE power.

Hence, it is proposed that UE can be indicated with which of the two timing references to use for the CSI-RS resource identification. The indication can be explicitly configured in the RRC message configuring the L3 CSI-RS resources. Alternative, the indication can be implicitly configured. In one example, if the number of SS blocks indicated in the CSI-RS resource configuration is less than a certain number, e.g., 8 or 16, the UE is configured to use the frame boundary as timing reference; otherwise, the UE is configured to use the individual SS block timing as timing reference.

Figure 20:
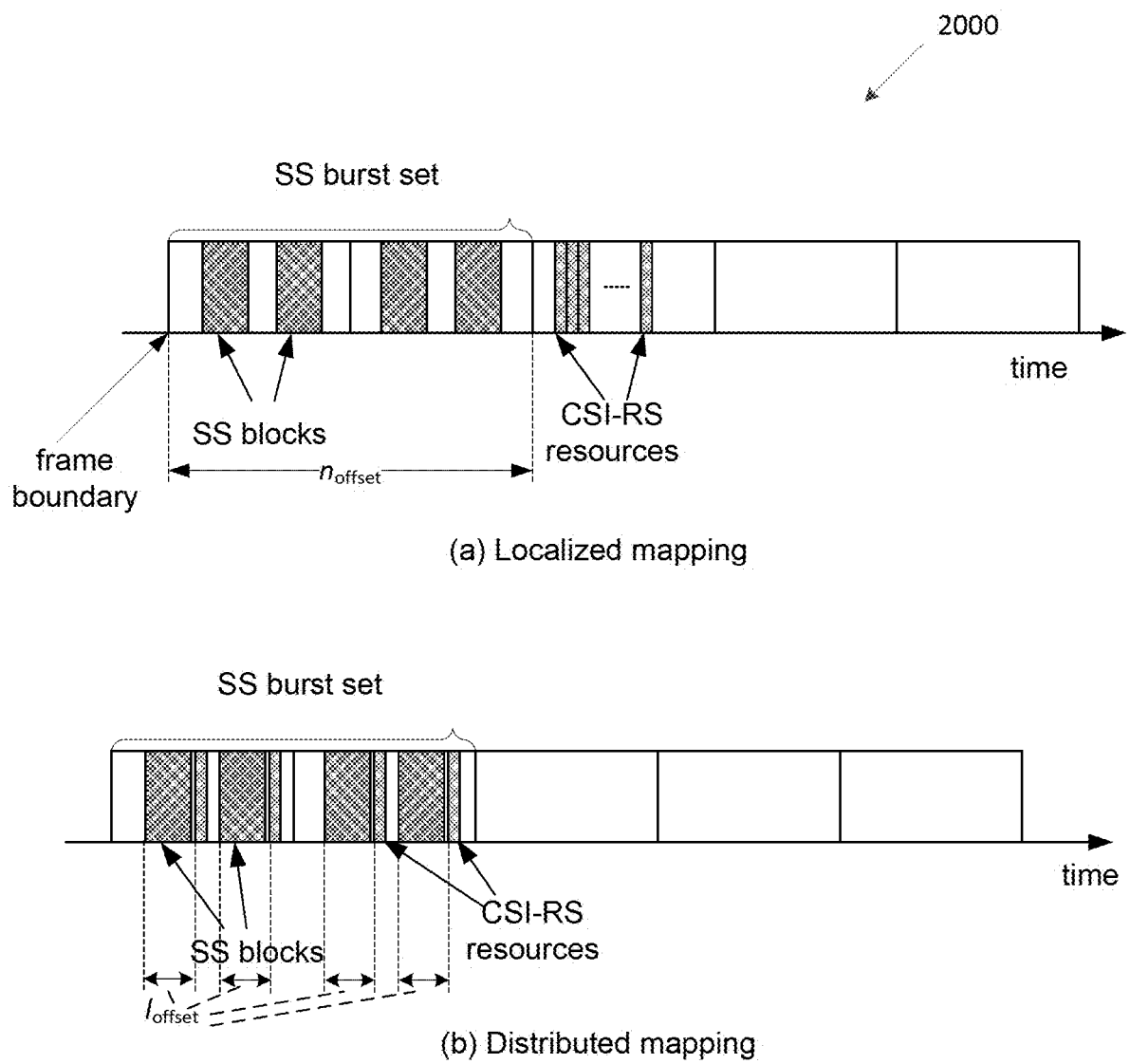
FIG. 20 illustrates an localized and distributed mappings according to embodiments of the present disclosure.

FIG. 20 illustrates an example localized and distributed mappings 2000 according to embodiments of the present disclosure. An embodiment of the localized and distributed mappings 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

For configuring the CSI-RS RE mapping patterns of the CSI-RS resources in a batch, the two alternatives of timing references furthermore give different flavours. If the timing reference is frame boundary, it seems easier to configure the CSI-RS resources in consecutive OFDM symbols (i.e., localized mapping) that are orthogonal to the OFDM symbols used for SS block mapping. On the other hand, if the timing reference is the individual SS block timing, signalling design to configure consecutive OFDM symbols for the multiple CSI-RS resources in a batch seems to be more challenging. In such a case, distributed mapping may be preferred. Examples of the localized and distributed mappings are illustrated in FIG. 20.

Hence, it is also proposed that the UE is indicated to assume localized mapping of CSI-RS if the UE is indicated to use the frame boundary as the timing reference; the UE is indicated assume distributed mapping of CSI-RS if the UE is indicated to use the SS block timing as the timing reference. In a nut shell, for UE power saving involved with the mobility measurement, it is preferred that UE does not need to decode PBCH for the measurement. If frame boundary information can be obtained without PBCH decoding, localized CSI-RS mapping configuration with respect to the frame boundary is feasible with a batch resource configuration. If frame boundary information can be obtained only after PBCH decoding, distributed CSI-RS mapping configuration, where each CSI-RS resource timing is defined with respect to a corresponding SS block can be a better alternative.

As shown in FIG. 20, different options to define the CSI-RS resource timing offset can be considered as a simpler option for the different choices of timing reference. When the frame boundary is the timing reference, the timing offset can be signaled in terms of the number of slots, $n_{offset}$, and the individual CSI-RS resource timing can be configured in terms of OFDM symbol offsets from the slot boundary indicated by the timing offset (i.e., slot $n_{offset}$ in the frame). When the SS block timing is the timing reference, the timing offset of an individual CSI-RS resource can be configured in terms of the number of OFDM symbols, $l_{offset}$, with respect to the starting OFDM symbol number of the associated SS block. In this case, the CSI-RS resource is located at an OFDM symbol that is $l_{offset}$ OFDM symbol apart from the starting symbol number.

The CSI-RS resource timing offset values may be configured individually for all the CSI-RS resources of each CSI-RS resource group; however this approach is likely to incur a large overhead in case a large number of beams are configured. In this case, a list is indicated for the pairs of offset values, i.e., slot offset $n_{offset}$ and an OFDM symbol offset $l_{offset}$, where each pair is applicable to each CSI-RS resource. The CSI-RS resource is mapped in OFDM symbol $l_{offset}$ in slot $n_{offset}$.

Figure 21:
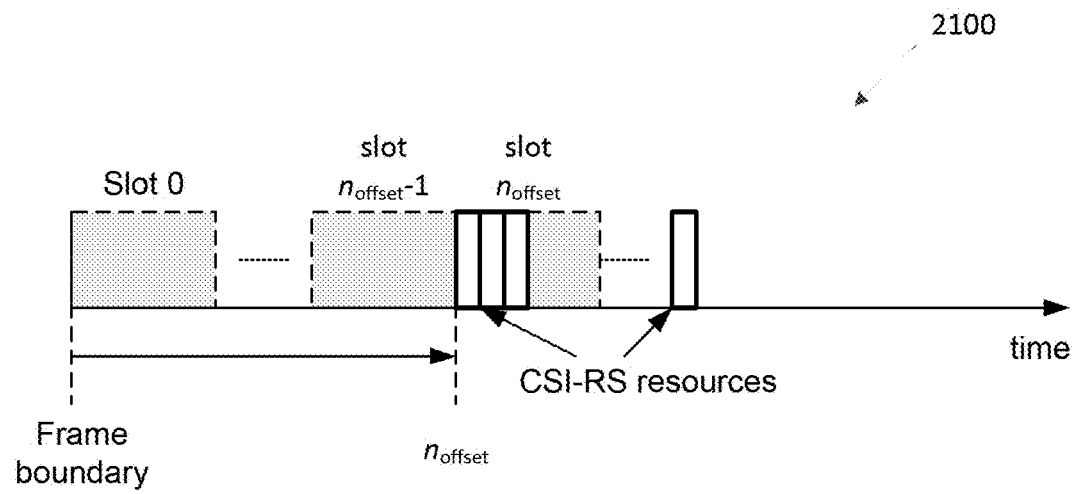
FIG. 21 illustrates an example timing offset value configuration according to embodiments of the present disclosure.
Figure 21:
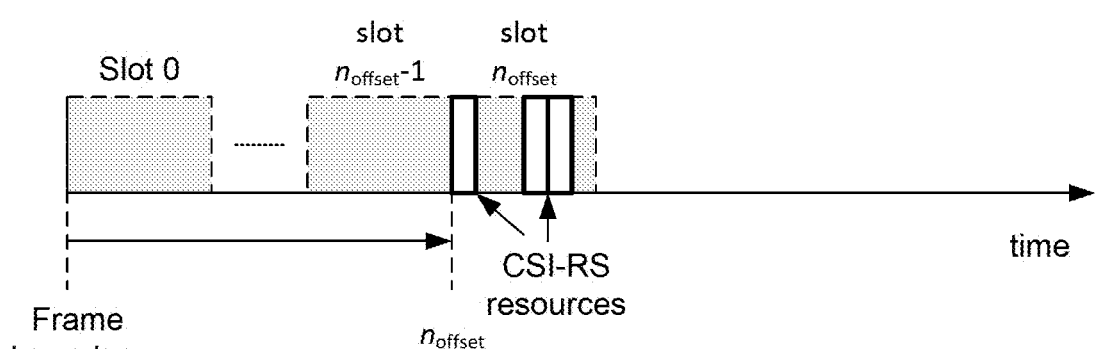

FIG. 21 illustrates an example timing offset value configuration 2100 according to embodiments of the present disclosure. An embodiment of the timing offset value configuration 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

A better alternative is to configure the timing offset values in a batch for the CSI-RS resources corresponding to a CSI-RS resource group. In case of localized mapping where a frame boundary is used as reference timing, at least the following two approaches can be considered. In a first approach, a common $n_{offset}$ is configured for all the resources, and the $N_{SS}$ CSI-RS resources (or resource sets) are sequentially mapped in consecutive OFDM symbols in time domain. In a variant of this approach, an OFDM symbol offset to the slot boundary is additionally configured; in this case the starting OFDM symbol number to map the CSI-RS is $l_{offset}$ in slot $n_{offset}$.

This approach is illustrated in FIG. 21(a). In a second approach, a common $n_{offset}$ is configured for all the resources, and a list of OFDM symbol offsets, $l_{offset}$ are configured for the $N_{SS}$ CSI-RS resources (or resource sets). This approach is illustrated in FIG. 21(b). In case of distributed mapping, a single $l_{offset}$ value can be configured that is commonly applicable to the all the CSI-RS resource (or resource sets).

In some embodiments for a configuration of CSI-RS ports to be mapped to a same OFDM symbol, a single-port based measurement and reporting can be preferred for reducing UE complexity, unless there is a strong necessity to allow multi-port based measurement and reporting. The configuration of L3 mobility CSI-RS resource(s) for an OFDM symbol can be done by either configuring a resource set comprising multiple single-port resources; or configuring a resource comprising multiple ports. In either case, it does not seem to be necessary to configure individual ports or resources if the individual ports or resources are mapped to a same OFDM symbol.

A simple configuration that can configure multiple resources/ports is preferred, similarly to legacy LTE's multi-port CSI-RS resource configurations. For the CSI-RS configured for BM, all the REs on an OFDM symbol in the full CSI-RS BW can be configured to be used only for the CSI-RS mapping. In such cases, no separate RE mapping configuration is necessary; the per-port CSI-RS REs can be identified by the indicated number of unit resources (i.e., number of ports comprising a resource or number of resources comprising a resource set), and a CSI-RS frequency domain mapping method (i.e., IFDMA port cycling vs. full RE port cycling) if both methods are adopted for the BM.

In some embodiments for overall L3 mobility CSI-RS configuration, according to these embodiments, it is proposed to indicate at least some of the following configuration parameters for each L3 mobility CSI-RS resource group (or a resource setting). In one example, a physical cell ID is commonly applicable to all the resources. In one example, a scrambling ID is commonly applicable to all the resources. In one example, CSI-RS numerology defines PRB grid and slot/frame structure with 14 OFDM symbols per slot. In one example, periodicity and offset for CMTC are defined according to the CSI-RS numerology. In one example, information on the SS blocks to associate with the CSI-RS resources is considered for sync timing and QCL. In such example of Alt 1, the number of SS blocks is considered. In such example of Alt 2, a list of SS block IDs is considered. In such example of Alt 3, a bitmap to indicate a "turned on" SS blocks for associating the CSI-RS resources is considered.

In one example, number of antenna ports per resource (or alternatively number of one/two-port resources per resource set) is considered. In one example, CSI-RS timing reference may show either SS block timing or frame boundary. In one example, CSI-RS timing configuration comprises a slot offset and/or an OFDM symbol offset for each CSI-RS resource (defined within a CSI-RS measurement window). In such example, if timing reference is an SS block, an OFDM symbol offset may be sufficient. CSI-RS resource i is transmitted in an $l_{offset}$-th OFDM symbol after the first OFDM symbol of the i-th SS block. The configuration options include: a list of $l_{offset}$ values, one per CSI-RS resource; and a commonly applicable $l_{offset}$ value to all the configured CSI-RS resources.

In such example, if timing reference is a frame boundary, at least slot offset is necessary. If OFDM symbol offset is not explicitly configured, the starting OFDM symbol to map all the CSI-RS resources is the first OFDM symbol of the slot identified by the slot offset. CSI-RS resource i is transmitted in an $l_{offset}(i)$-th OFDM counted from OFDM symbol 0 of slot $n_{offset}(i)$. The configuration options include: a list of pairs of (a slot offset, an OFDM symbol offset), one per CSI-RS resource; a common slot offset applicable to all the CSI-RS resources; and a list of OFDM symbol offset values, one per CSI-RS resource.

The configuration options further include a common slot offset applicable to all the CSI-RS resources; and a single OFDM symbol offset value. In this case, UE can assume that starting from the OFDM symbol identified by the single OFDM symbol offset value and the common slot offset, the configured CSI-RS resources are sequentially and continuously mapped in the time domain. In such configuration options, it is assumed that the $N_{SS}$ CSI-RS resources are partitioned into $N_1$ partitions of $N_2$ resources each. Then, a slot offset is configured per partition that is commonly applicable to all the CSI-RS resources within the partition; and a list of OFDM symbol offset values are configured for the $N_2$ CSI-RS resources belonging to each partition. Alternatively, a slot offset is configured per partition; and a first OFDM symbol offset value is configured for a first CSI-RS resource belonging to each partition. In this case, the rest of CSI-RS resources in the partition are mapped consecutively in the time domain, and the $N_2$ CSI-RS resources occupy $N_2$ consecutive OFDM symbols counting from the OFDM symbol indicated by the first OFDM symbol offset.

Figure 22:
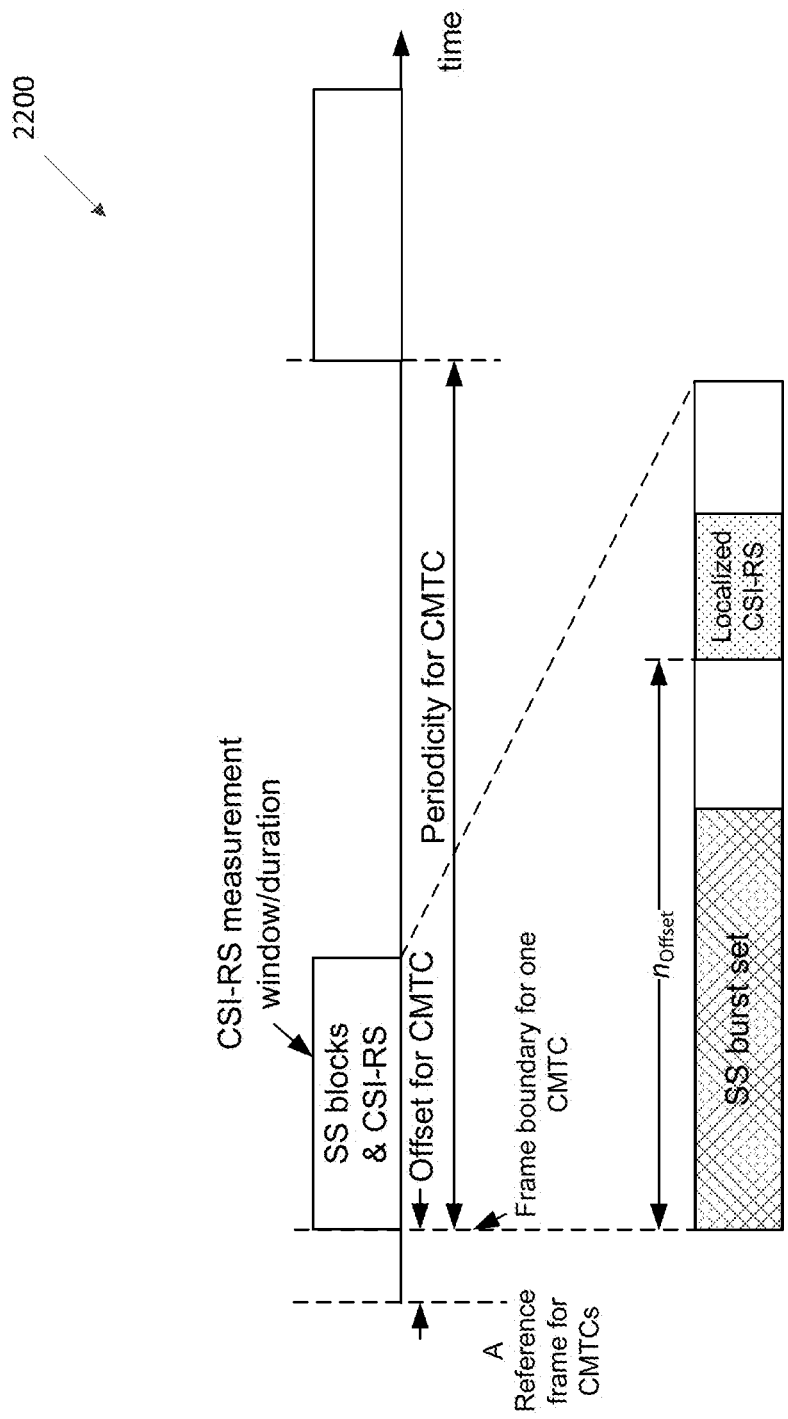
FIG. 22 illustrates an example relationship between CMTC and CSI-RS measurement timing according to embodiments of the present disclosure.

FIG. 22 illustrates an example relationship 2200 between CMTC and CSI-RS measurement timing according to embodiments of the present disclosure. An embodiment of the relationship 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

As shown in FIG. 22, CMTC configures CSI-RS measurement window timing in terms of periodicity and offset. The periodicity and offset for CMTC is likely to be configured in terms of number of frames or msec. In each CMTC period, there is one CSI-RS measurement window comprising a short duration of 1, 5, 10 msec. In the CSI-RS measurement window both SS burst set and CSI-RS are mapped.

FIG. 22 shows one example illustration of the localized CSI-RS mapping when the frame boundary is configured as timing reference. The slot offset, $n_{Offset}$, is configured to indicate the starting position of the localized CSI-RS mapping in time domain, as in some embodiments of the present disclosure. In one embodiment, parameters that are configured per cell may comprise: PCID (10 bits); Numerology (2 bits (either {15, 30, 60} or {60, 120, 240}); measurement/transmission BW (X bits); a list of resource set configuration (each resource set corresponds to a slot (offset)); and periodicity.

In one embodiment, parameters that are configured per resource set may comprise: slot offset (up to 9 bits (when SCS=240 kHz); sequence generation (scrambling ID) (10 bits); QCL information including bitmap for QCL'ed SSBs (the number of "1"s in the bitmap corresponds to the number of OFDM symbols) (64 bits); RE mapping (time/frequency bitmap 14+(up to 12) bits); density ([2] bit); and ResourceRep (repetition on/off) (1 bit).

In one embodiment, parameters that are configured per resource may comprise nothing.

In one embodiment, some parameters listed above are configured in resource level, e.g., one or more of QCL info and RE mapping are provided in resource level.

In some embodiments for resource-set-level RE mapping configuration, alternatives for the RE mapping configuration include the following: (Alt B1) resource-set level parameters indicate RE mapping of CSI-RS resources in a single slot; (Alt B2) resource-set level parameters indicate RE mapping of CSI-RS resources in an OFDM symbol; (Alt B3) a resource-set level parameter indicates OFDM symbol location of CSI-RS resources; and a resource-level parameter indicates the frequency location of the CSI-RS resources; and (Alt B4) RE mapping of each CSI-RS resource is indicated by a resource-level parameter. In this case, the number of bits to indicate the RE mapping is derived according to, with a conservative estimate on the number of supported density values: D=1: 12×14 possible time frequency locations; D=3: 4×14 possible time frequency locations; and total number of states=224→[8] bits.

In one embodiment Alt B1, the RE mapping of the resources that are mapped in a slot is indicated by two bitmaps, one for the time domain and the other for frequency domain. The bit width of the time-domain bitmap is according to the total number of OFDM symbols that can carry the CSI-RS ([14] bits), and the bit width of the frequency-domain bitmap is according to the frequency-domain RE density (if density is D, the bit width is 12/D). The final slot-level CSI-RS REs can be found by taking an outer product (or Kronecker product) of the two bitmaps, and the total number of configured CSI-RS resources in the slot is the same as the number of 1's in the outer-product bitmap.

TABLE 5 illustrates an example of outer-product bitmap, when D=3, constructed with time-domain bitmap of 10010001000011, and frequency domain bitmap of 111. According to the bitmap, CSI-RS resources are configured on OFDM symbols 0, 3, 7, 12, 13 and on each OFDM symbol, three resources constructed with subcarrier offsets 0, 1, 2 are configured. The total number of configured resources according to the bitmap is 15, and the resources can be indexed frequency first (or time first).

TABLE 5

Outer-product bitmap

| 1 | 0 | 0 | 1 | 0 | 0 | 0 | 1 | 0 | 0 | 0 | 0 | 1 | 1 |
| 1 | 0 | 0 | 1 | 0 | 0 | 0 | 1 | 0 | 0 | 0 | 0 | 1 | 1 |
| 1 | 0 | 0 | 1 | 0 | 0 | 0 | 1 | 0 | 0 | 0 | 0 | 1 | 1 |

Considering the trade-off between configuration overhead and flexibility, it is proposed to adopt the aforementioned embodiment of Alt B1.

In some embodiment, RE mapping configuration is provided per resource set, which can configure a number of CSI-RS resources within a slot (recurring with the configured periodicity), corresponding to a cell. In some embodiments, the RE mapping configuration is provided in terms of two bitmaps, where a first bitmap indicates OFDM symbols ([14] bits) and a second bitmap indicates subcarrier offsets (12/D bits). In some embodiments, the outer product of the two bitmaps indicates the configured CSI-RS resources in the slot. The positions of "1" correspond to the configured CSI-RS resources.

In some embodiments for beam RSRP reporting, a UE can be indicated whether or not to assume QCL'ed across all the ports in each configured CSI-RS resource, of which indication parameter can be conveyed in the RRC or DCI.

If the UE is indicated that the CSI-RS ports in a CSI-RS resource are not QCL'ed in a set of parameters including spatial parameters, then the UE is implicitly indicated to measure and report RSRP per port of the configured CSI-RS resource. On the other hand, if the UE is indicated that all the CSI-RS ports in a CSI-RS resource are QCL'ed in a set of parameters including spatial parameters, then the UE is implicitly indicated to measure and report RSRP for a first port of the configured CSI-RS resource.

In some embodiments for alternative signaling, the CSI-RS configuration parameters are provided by the following. In one example, parameters that are configured per cell may comprise: a physical cell ID (10 bits); numerology (i.e., SCS) (2 bits); measurement and transmission BW ([4] bits); RE mapping density (REs per RB per port) (2 bits); periodicity (2 bits to configure {5, 10, 20, 40}); RE mapping density ([2] bit); and a list of resource settings.

In one example, parameters that are configured per resource setting (for a virtual cell) may comprise: a sequence generation (Scrambling ID) (10 bits); a first timing offset (up to 11 bits) to indicate the starting boundary of the CSI-RS mapping; a bitmap of second timing offset (up to 80 bits) to indicate the slots with CSI-RS, from the starting boundary; and a list of resource sets.

In one example, parameters that are configured per resource set (for a slot) may comprise: RE mapping (time/frequency bitmap (14+12/D) bits); and QCL'ed SSB info (a list of SSBs for all the OFDM symbols with CSI-RS). In one example, parameters that are configured per resource may comprise nothing.

To begin with, it is proposed to first identify those parameters that can be configured per cell. In one embodiment, the highest level to configure NR mobility RS parameters is a cell. In one example, at least the following L3 mobility CSI-RS parameters are configured per cell: a physical cell ID (10 bits); numerology (i.e., SCS) (2 bits); measurement and transmission BW ([4] bits); and RE mapping density (REs per RB per port) (2 bits). This embodiment allows to greatly save the resource configuration overhead, although there is some network implementation flexibility loss.

Based on the proposal 1024*(10+2+4+2)=18,432 bit payload becomes 4*(10+2+4+2)=72 bits to configure 1024 resources corresponding to 4 cells. However, even with this proposal, the total payload is still 37,000 bits. Hence additional signaling compression is necessary.

In one embodiment of scrambling ID, similarly to the legacy LTE, CSI-RS frequency reuse within a cell can be achieved by applying different scrambling IDs to different areas. Again, configuration of scrambling ID per resource is too costly and the additional flexibility gain is not much. Hence, it is proposed to configure the scrambling ID one level under than the cell, i.e., resource setting level. In other words, a resource setting may correspond to a "virtual cell," and virtual-cell specific parameters need to be configured per resource setting.

In one embodiment of CMTC (CSI-RS measurement timing configuration), if fully flexible CSI-RS resource configuration and mapping need be supported without any restriction, the CSI-RS timing configuration may be done per resource. However, it is expected that this may incur huge overhead. A simple analysis is conducted to understand the impact of fully configuration timing configurations. There are four periodicity values agreed, which are 5, 10, 20 and 40 msec. If slot based offset is signaled, the worst case signaling overhead to be able to indicate a slot in 5, 10, 20 and 40 msec duration with 240 kHz SCS is (640+320+160+80)=1200 states (11 bits) per resource. To configure 1024 resources, the fully flexible CSI-RS timing configuration may require 11,264 bits.

For mobility CSI-RS to be able to be used for neighbor cell measurement in case serving cell's time/frequency sync cannot be used, UE needs to first acquire sync from neighbor cell's PSS/SSS. In such a case, the time difference between CSI-RS and SSS may not be long, and this possibly motivates reduction of the mobility CSI-RS resource mapping window size. The reduction of resource mapping window size can also help to reduce the configuration overhead.

For example, if the CSI-RS mapping window size is limited to be within 5 msec, then the slot offset may be configured by two numbers: a first offset with respect to a frame/half-frame boundary, which is configured per cell; and a second offset with respect to the first offset, which may be configured lower level than the cell-level. For the first offset, fully flexible offset configuration may be necessary, in which case 11 bits may be used per cell. The second offset only need to be able to indicate up to 80 states (corresponding to number of slots in 5 msec with 240 kHz SCS). The periodicity can also be configured per cell.

Hence, if the signaling is conducted this way, to configure timing for 4 cells and 256 resources per cell, the payload now becomes 4*(11+2)+7*1024=7,220 bits, which has saved ~4,000 bits than the baseline.

To further reduce the configuration overhead of CSI-RS timing, a bitmap to indicate time slots within the CSI-RS measurement window can be considered instead. The bitmap size may be up to 80 bits, and the bit positions with "1" may correspond to the slots with CSI-RS. Based on this proposal, the configuration payload becomes 4*(11+2+80)=372 bits per cell only.

In order to allow for frequency reuse within a cell using virtual cells, the "cell-specific" offset parameters above can be replaced with "virtual cell" specific parameters. Hence, it is proposed to configure those offset parameters per resource setting in the present disclosure. In summary, the following CSI-RS timing configuration in the proposal below can significantly save configuration overhead, with restricting the CSI-RS measurement window within 5 msec.

In one example, CSI-RS timing is configured according to the following method: periodicity is configured per cell (2 bits to configure {5, 10, 20, 40}); a first offset is configured per resource setting (up to 11 bits (for 240 kHz case) to be able to indicate full set of slot offset values); and a bitmap representing the timing offset from the first offset to the CSI-RS time slot is configured per resource setting, whose bit size is 80, 40, 20, 10 and 5 respectively for SCS of 240, 120, 60, 30 and 15 kHz.

Figure 23:
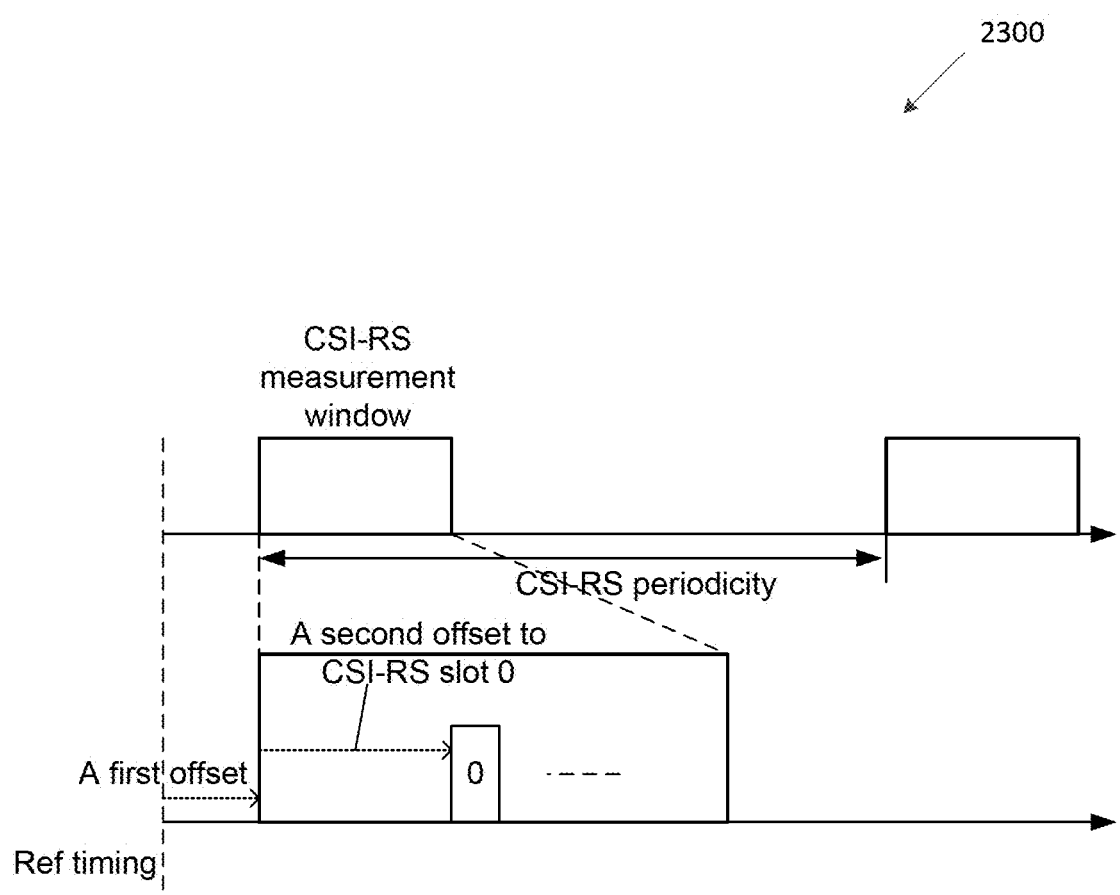
FIG. 23 illustrates an example CSI-RS timing according to embodiments of the present disclosure.

FIG. 23 illustrates an example CSI-RS timing 2300 according to embodiments of the present disclosure. An embodiment of the CSI-RS timing 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure.

In the legacy LTE, CSI-RS slot offset was provided with respect to the frame timing. In NR, the frame timing may not be a good reference for the slot offset, especially when the half frame boundary can be obtained only after the PBCH decoding. From 3 to 6 GHz, although full SSB index is available via PBCH DMRS, upon detecting the PBCH DMRS sequence, UE can only acquire the half frame timing. Hence, in order to allow for UE not to be required to decode PBCH for acquiring CSI-RS timing for mobility measurement, it is proposed to make the CSI-RS timing offset reference to be the half frame starting boundary for which associated SSB is detected. In addition, to resolve the issues arising not knowing the SFN of neighbor cells which transmit CSI-RS when periodicity is >5 msec, it is further proposed that the UE may assume that the cells are half-frame level aligned if the CSI-RS periodicity is >5 msc.

In one embodiment, CSI-RS timing offset reference may be the half frame starting boundary for which associated SSB is detected. In one example, if CSI-RS periodicity is 10, 20 and 40 msec, a UE may assume that the cells are aligned in half-frame level.

In one embodiment for associated SSB index, in contrast to the LTE in which a cell is configured to transmit a single PSS/SSS/PBCH (i.e., a single SS block), an NR cell may be configured to transmit multiple SS blocks with applying potentially different beams for the SS blocks. In LTE DRS configuration, the configured physical cell ID and DMTC periodicity/offset configuration inform UE of an OFDM symbol level timing of single PSS/SSS to detect; and the CSI-RS sync timing is obtained from the detected single PSS/SSS.

On the other hand, in NR multi-beam scenarios, the configured physical cell ID corresponds to multiple time locations (SS blocks) which potentially have different sync timing owing to the different beam radiation patterns. Hence, it can be beneficial to inform UE an SS block of a cell to acquire the sync timing of a CSI-RS resource. In over 6 GHz systems in which UE Rx beamforming may be used for combating high pathloss, an SS block can also be associated with a CSI-RS resource in spatial QCL parameters. When UE is configured with an SS block that is spatially QCL'ed a CSI-RS resource, the UE is allowed to use the same or spatially-correlated Rx beam(s) for receiving both the CSI-RS resource and the SS block, which minimizes/reduces UE latency and power consumption for measuring RSRP/RSRQ on the CSI-RS resource.

In one embodiment, a UE may be allowed to use an SS block associated with a configured CSI-RS resource as sync timing reference; and QCL reference in spatial parameters. If the QCL reference is provided per resource, the worst-case maximum configuration overhead becomes 6×1024=6144 when one out of the L=64 SSBs need to be indicated per resource.

With taking a restriction that multiple CSI-RS resources that are configured in the same OFDM symbol in a resource set are QCL'ed with a single SSB, the number of bits required for QCL indication can be reduced to ½ or ¼ th of the baseline, depending on the number of CSI-RS resources configured per OFDM symbol. Hence, it is proposed to configure associated SSB indices per resource set, with indicating one SSB index per OFDM symbol.

In one embodiment, the N QCL'ed SSBs for the N OFDM symbols with CSI-RS configured by the RE mapping of the resource set, are indicated by N SSB indices configured for the same resource set, according to one-to-one mapping.

In LTE specification, the following is described on RSRQ:

| | |
|---|---|
| Definition | Reference Signal Received Quality (RSRQ) is defined as the ratio N × RSRP/(E-UTRA carrier RSSI), where N is the number of RB's of the E-UTRA carrier RSSI measurement bandwidth. The measurements in the numerator and denominator shall be made over the same set of resource blocks. E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signalling indicates certain subframes for performing RSRQ measurements, then RSSI is measured over all OFDM symbols in the indicated subframes. The reference point for the RSRQ shall be the antenna connector of the UE. If receiver diversity is in use by the UE, the reported value shall not be lower than the corresponding RSRQ of any of the individual diversity branches. |
| Applicable for | RRC_IDLE intra-frequency, RRC_IDLE inter-frequency, RRC_CONNECTED intra-frequency, RRC_CONNECTED inter-frequency |

The main motivation for introducing RSRQ in the legacy LTE was to facilitate network's decision on inter-frequency handover. In the legacy LTE, for the UE to perform inter-frequency measurement, the network configures measurement gaps, which periodically occurs in time with a fixed duration of 6 msec. During the measurement gap, the UE stops receiving serving cell's signals in the serving carrier frequency, and the UE can move to another carrier frequency to make RSRQ measurement.

When the network receives RSRQ measurement results on multiple carrier frequencies, the network can decide to choose a carrier frequency which has a larger RSRQ, as RSRQ is a metric that tends to have a larger value if the loading is lighter. In other words, if the loading is small, the RSSI value may be small; if the loading is high, the RSSI value may be high. Because RSRQ is a ratio between RSRP and RSSI, the RSRQ value is going to be larger in a first carrier frequency if the loading is smaller in the first carrier frequency than a second carrier frequency, when the two carrier frequency has similar level of RSRP values.

In LTE section, the following is described on RS-SINR:

| Definition | Reference signal-signal to noise and interference ratio (RS-SINR), is defined as the linear average over the power contribution (in [W]) of the resource elements carrying cell-specific reference signals divided by the linear average of the noise and interference power contribution (in [W]) over the resource elements carrying cell-specific reference signals within the same frequency bandwidth.<br>For RS-SINR determination, the cell-specific reference signals $R_0$ according TS 36.211 [3] shall be used.<br>The reference point for the RS-SINR shall be the antenna connector of the UE.<br>If receiver diversity is in use by the UE, the reported value shall not be lower than<br>the corresponding RS-SINR of any of the individual diversity branches.<br>If higher-layer signaling indicates certain subframes for performing RS-SINR measurements, then RS-SINR is measured in the indicated subframes. |
|---|---|
| Applicable for | RRC_CONNECTED intra-frequency,<br>RRC_CONNECTED inter-frequency |

The main motivation of introducing RS-SINR is to provide the network an estimate of throughput of a target cell. It was found that neither RSRP nor RSRQ was sufficient for this purpose, and RS-SINR is introduced.

The present disclosure proposes methods for UE to measure and report RSRQ and RS-SINR in the new communication system, including configuration of REs to measure the RSSI (denoted as RSSI measurement resource, RMR), which is required to derive RSRQ value; and configuration of REs to measure SINR (denoted as IMR, i.e., interference measurement resource), which is required to derive RS-SINR and hypothetical PDCCH performance to determine IS/OOS.

The legacy mechanism to measure RSSI and interference uses measurement quantities on REs on OFDM symbols with CRS. The RSSI is measured by taking total sum power across the REs in the configured BW in the configured OFDM symbols. The interference is measured by subtracting the serving cell's CRS power from the RSSI. In the NR, the CRS is not available, and hence alternative resources need to be provided for the RSSI and interference measurement.

In addition, the legacy LTE system has supported wide single beam coverage, while the NR system can also support narrow multi-beam coverage from a single cell's point of view. Especially for mmWave, the use of Rx beamforming at the UE is essential, and which Rx beam to use to receive certain signals need to be clarified. In the NR standardization discussions, the Rx beamforming information is decided to be provided in terms of QCL resources in spatial parameters.

If two RS are "spatial QCL'ed", the UE may take measurement using substantially similar Rx beams. For the IMR and RMR, QCL reference resource in spatial parameters needs to be indicated so that the UE and the network have the same understanding on the measurement results. The QCL reference resources for the IMR and RMR are proposed to be SS block and/or CSI-RS.

The Rx beamforming relation (or the spatial QCL relation between multiple RS) may be alternatively referred to as "same Rx mode," "same Rx port," etc. A different terminology than "QCL," may be defined, without departing from the principles of the present disclosure.

Some requirements for determining the RSSI measurement resource can be considered. Firstly, the RSSI resource may be able to represent the loading condition of a carrier frequency. Secondly, the RSSI resource may be located close in time to the RSRP measurement resource, so that the UE can measure both RSSI and RSRP in the same time window, e.g., configured SMTC duration.

In addition, in mmWave system for which a UE applies Rx beamforming, the Rx beam to be used for the RSSI measurement also needs to be specified.

In the present disclosure, an SS block may refer to an SS/PBCH block. An SS block may refer to an SSS that is used for RSRP measurement. An SS block may refer to a combination of SSS and PBCH DMRS that is used for RSRP measurement. In some alternatively embodiments, an SS block may be replaced with a CSI-RS resource.

In some embodiments for configuration of RSSI measurement resource, the RSSI measurement resource may be configured as the SS block BW in all the OFDM symbols within the SMTC time duration. Although this is a simple method to configure the measurement resource, one drawback is that a large portion of the SMTC duration includes SS blocks, which are always-on signals, and the power measured on SS block REs does not necessarily dependent upon the loading of the carrier frequency.

In some embodiments, the RSSI measurement resource may be configured as the SS block BW in a subset of OFDM symbols, corresponding to all the OFDM symbols in the SMTC duration except for the OFDM symbols containing the SS blocks. In this alternative, the RSSI measurement results may not be too much biased by the measurements based on SS blocks, and hence the resulting RSSI may represent the loading of the carrier frequency better than the previous alternative.

In some embodiments, the RSSI measurement resource may be separately configured from the SMTC, and the RSSI measurement timing configuration (comprising one or more of periodicity, offset and duration) may be referred to as RMTC. In this alternative, the network can flexibly choose the RSSI measurement resource based on the network's requirement.

In such embodiments, SMTC parameters (SMTC periodicity, offset and duration) may be used to derive the RMTC parameters together with other parameters configured for RMTC. In one method, the SMTC time window and a relative offset value determines the RMTC time window. For example, when an SMTC time window is a half frame spanning from subframes 0 to 5 (0 to 5 msec) in a radio frame, and a relative offset for the RMTC is configured/indicated to be 3 msec, then the RMTC time window is determined as subframes 3 to 5, i.e., RMTC time window spans from a time point determined by applying the configured RMTC offset to the starting point of the SMTC time window, to the ending point of the SMTC time window.

Figure 24:
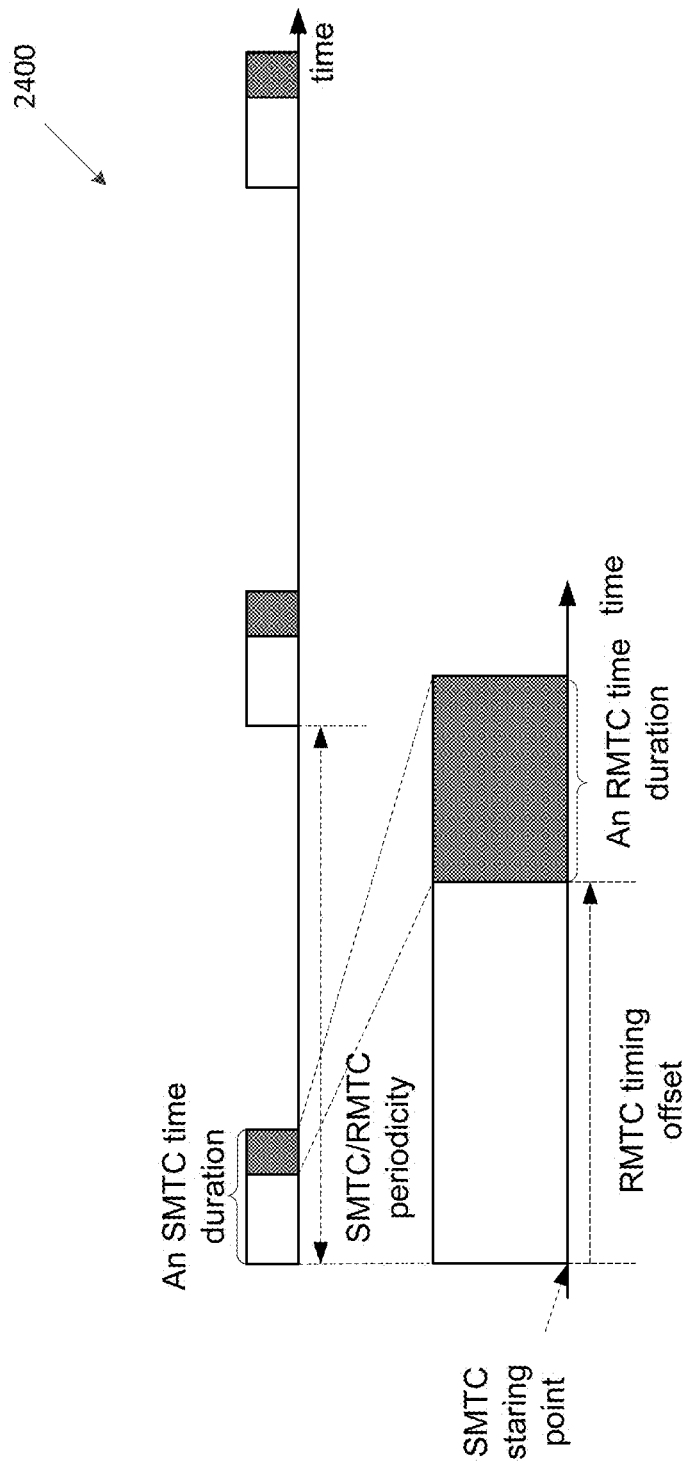
FIG. 24 illustrates an example configuration of RMTC according to embodiments of the present disclosure.

FIG. 24 illustrates an example configuration of RMTC 2400 according to embodiments of the present disclosure. An embodiment of the configuration of RMTC 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

The RMTC and SMTC share the same periodicity, but the timing offset of the RMTC is an offset different from the timing offset of the SMTC, and the offset is indicated by the network. In addition, the RMTC time duration spans until the end point of the SMTC time duration.

In another embodiment, all the RMTC parameters are separately configured from the SMTC parameters.

In another embodiment, the CSI-RS measurement timing configuration (CMTC) is configured, and the UE may measure the RSSI in all the OFDM symbols in the CMTC duration, although UE may measure the CSI-RSRP on the REs for which CSI-RS are mapped. The CMTC may or may not include the SS blocks. Alternatively, the RSSI measurement resource is determined as the SS block or PBCH BW of the OFDM symbols with PBCH. Alternatively, a CORE-SET is configured/indicated as RSSI measurement resource.

In some embodiment for measuring cell-specific & beam-specific RSSI values, just like the RSRP values are differently measured with different Rx beams, the measured RSSI values may also be different depending on the Rx beams. Because RSRQ is a ratio between RSRP and RSSI, it seems necessary to clearly define what exact two values may be used when taking the ratio. To this end, a beam-specific RSRQ can be defined, for which the UE applies the same Rx beam to measure both quantities of RSRP and RSSI.

This way, the UE measures the RSRQ for a specific Rx beam, and the network can use this information to make a decision on inter-frequency hand-over for a reported Tx beam corresponding to the Rx beam. In case where the same time resources are used for both RSRP and RSSI measurement, it seems easy for UE to use the same Rx beam for the measurement. However, in case where different time resources are used for RSRP and RSSI measurement, it seems necessary for the network to inform that the UE may use the same Rx beam to measure the RSSI as the Rx beam having been used for the RSRP measurement. In other words, for a beam, the resources for RSRP and RSSI need to be paired, and the pairing relation may be indicated/configured to the UE. The pairing information may be pre-configured, or indicated by the network.

In one embodiment, SS blocks are configured to be used for RSRQ measurement; and an RSSI measurement resource is configured per SS block (i.e., one-to-one mapping). A UE is further configured to assume spatial QCL between the SS block and the RSSI measurement resource, while the UE may not make any assumption on spatial QCL across different SS blocks and different RSSI measurement resources. As there is a time gap between two adjacent SS blocks, the RSSI measurement resource may correspond to time gap in one alternative. For example, the two consecutive OFDM symbols prior to and adjacent to an SS block are pre-configured as a corresponding RSSI measurement resource corresponding to the SS block (i.e., a UE may assume that these two resources are QCL'ed in spatial parameters). In an alternative example, the two consecutive OFDM symbols later than and adjacent to an SS block are pre-configured as a corresponding RSSI measurement resource.

Figure 25:
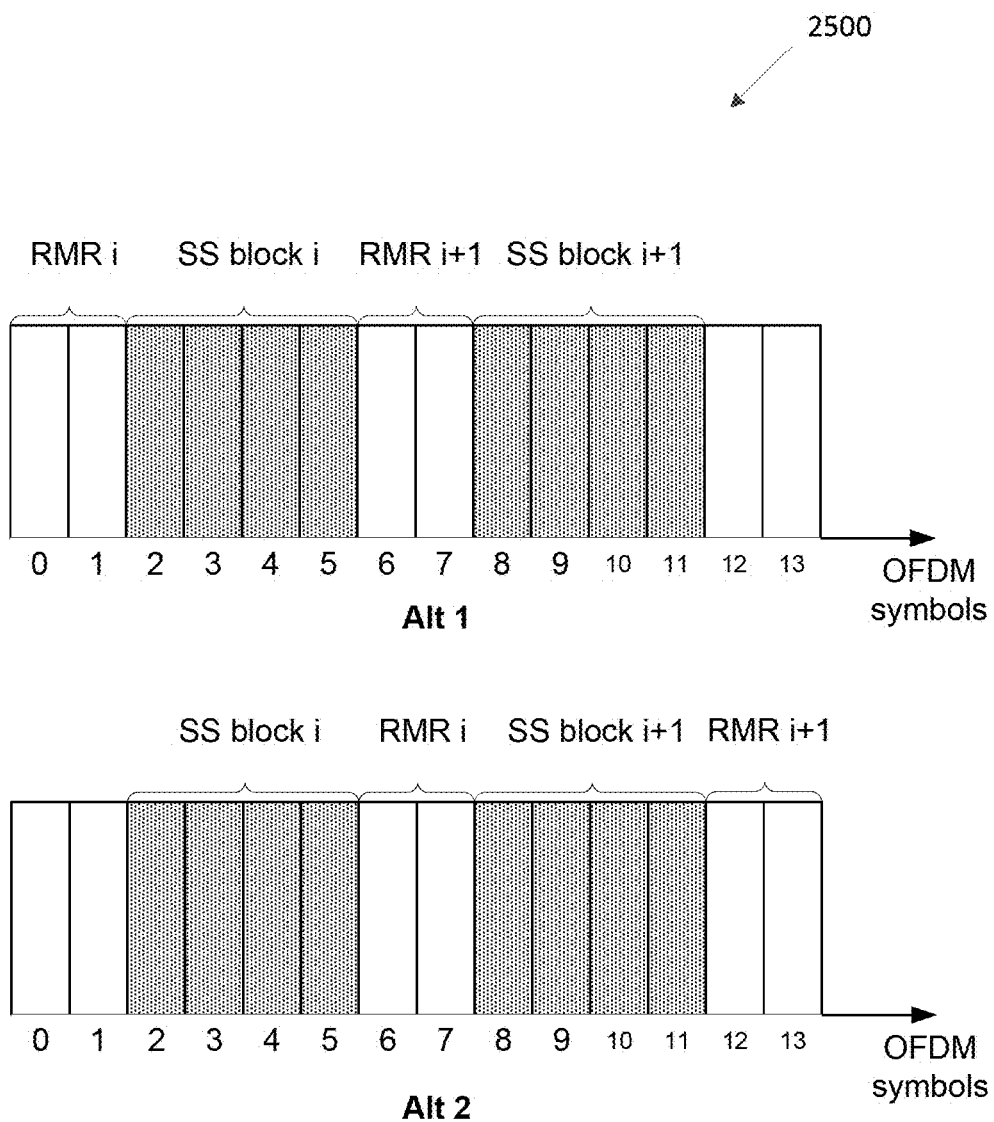
FIG. 25 illustrates an example measuring cell-specific and beam-specific RSSI values according to embodiments of the present disclosure.

FIG. 25 illustrates an example measuring cell-specific and beam-specific RSSI values 2500 according to embodiments of the present disclosure. An embodiment of the measuring cell-specific and beam-specific RSSI values 25000 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

As shown in FIG. 25, RMR implies RSSI measurement resource. In the figure, SS blocks i and i+1 are mapped in OFDM symbol $\{2, 3, 4, 5\}+O$, and $\{8, 9, 10, 11\}+O$, where O is an OFDM symbol offset, which is a multiple of 14. In the first alternative (Alt 1), a corresponding RMR is mapped prior to an SS block. The RMR i is at OFDM symbols $\{0, 1\}+O$; and RMR i+1 is at OFDM symbols $\{6, 7\}+O$. In the second alternative (Alt 2), a corresponding RMR is mapped prior to an SS block. The RMR i is at OFDM symbols $\{6, 7\}+O$; and RMR i+1 is at OFDM symbols $\{12, 13\}+O$.

The UE is configured to apply the same Rx beam set for the RMR and SS block with the same index; in other words, the UE is configured to assume that RMR i is QCL'ed with SS block i in spatial parameters, for every i. In this case, a beam specific RSRQ, i.e., (i-th RSRQ) can be defined as the ratio of (i-th RSSI) and (i-th RSRP) measured respectively with the RMR i and SS block i.

In one embodiment, CSI-RS resources are configured to be used for RSRQ measurement; and an RSSI measurement resource is configured per CSI-RS resource group (comprising a number of CSI-RS resources) that are mapped on the same set of OFDM symbols. UE is further configured to assume spatial QCL between the CSI-RS resource group and the RSSI measurement resource, while the UE may not make any assumption on spatial QCL across different CSI-RS resource group and different RSSI measurement resources.

In one example, a UE is configured to use all the REs in the CSI-RS measurement bandwidth of the CSI-RS resource group as the corresponding RSSI resource.

In another example, a UE is configured with separate sets of OFDM symbols as RSSI measurement resources, wherein a set of OFDM symbols is configured/indicated as an RSSI resource per CSI-RS resource group. In one instance, when a CSI-RS resource group is mapped on OFDM symbol x, the RSSI resource is mapped on OFDM symbol x+o, where o is indicated by the network. In another instance, the RSSI resources are separately indicated from the CSI-RS resources by the network.

Figure 26:
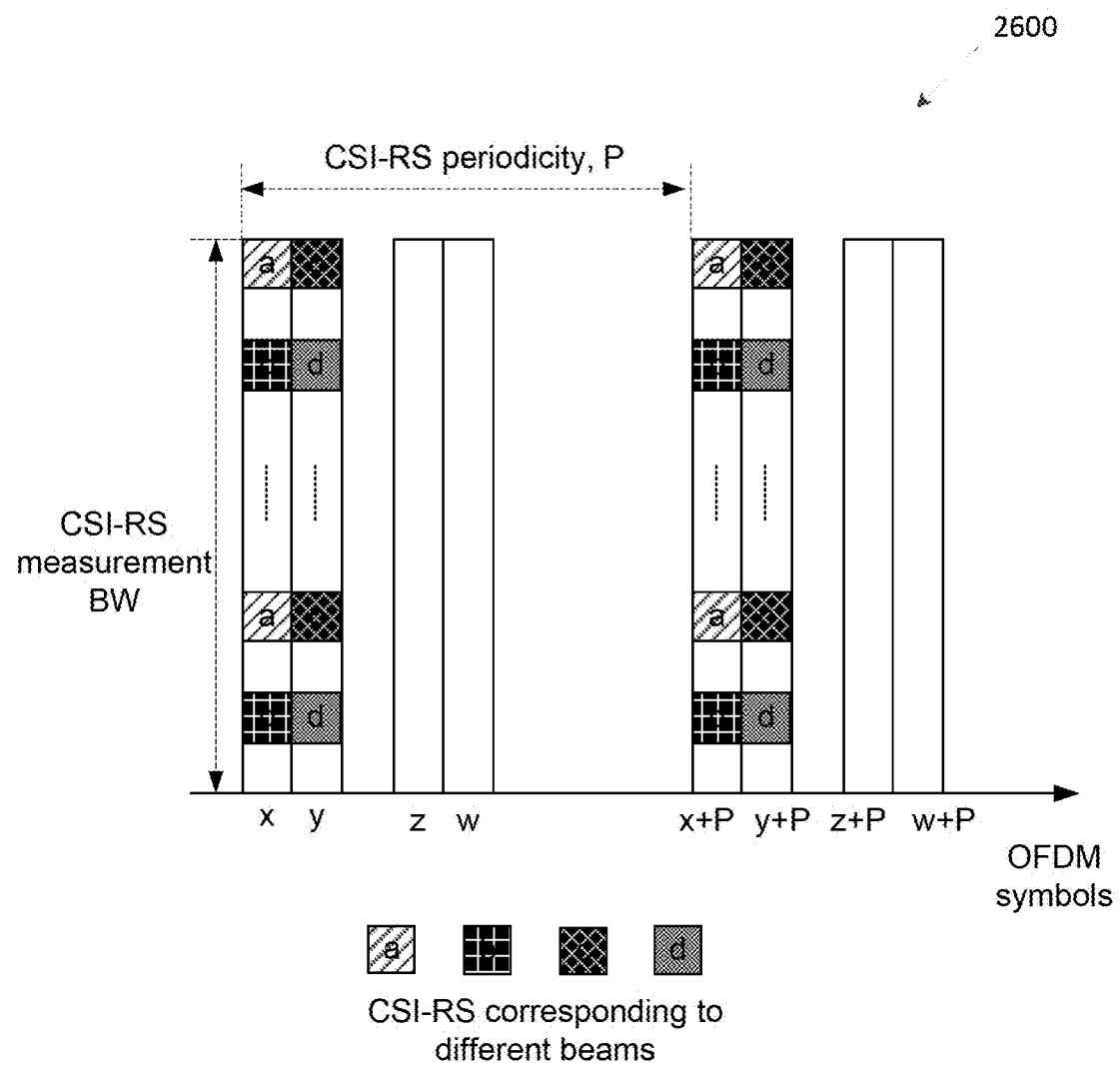
FIG. 26 illustrates an example CSI-RS mapping and RMR configurations according to embodiments of the present disclosure.

FIG. 26 illustrates an example CSI-RS mapping and RMR configurations 2600 according to embodiments of the present disclosure. An embodiment of the CSI-RS mapping and RMR configurations 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions. Other embodiments are used without departing from the scope of the present disclosure.

As shown in FIG. 26, CSI-RS a, b, c and d are transmitted with applying different beams, and the CSI-RS a, b, c and d are mapped to orthogonal time-frequency resources. CSI-RS a, b are mapped on OFDM symbols x and x+P, and CSI-RS c, d are mapped on OFDM symbols y and y+P. The CSI-RS are periodically recurring with a periodicity of P OFDM symbols.

According to the first alternative, the same OFDM symbol is configured as an RMR on which the corresponding NZP CSI-RS is configured. For example, for CSI-RS a and b the RMR is configured as all the REs in the CSI-RS measurement BW in OFDM symbol x, x+P, . . . ; and for CSI-RS c and d the RMR is configured as all the REs in the CSI-RS measurement BW in OFDM symbol y, y+P, . . . . In this case, the UE is configured to derive RSRQ, by taking an RSRP measurement using each NZP CSI-RS (i.e., a, b, c, d) and an RSSI measurement using corresponding RMR (i.e., OFDM symbols x, x, y, y respectively).

According to the second alternative, a separate OFDM symbol is configured as an RMR for the multiple CSI-RS mapped in the same OFDM symbol. For CSI-RS a and b the RMR is configured as all the REs in the CSI-RS measurement BW in OFDM symbol z, z+P, . . . ; and for CSI-RS c and d the RMR is configured as all the REs in the CSI-RS measurement BW in OFDM symbol w, w+P, In this case, the UE is configured to derive RSRQ, by taking an RSRP measurement using each NZP CSI-RS (i.e., a, b, c, d) and an RSSI measurement using corresponding RMR (i.e., OFDM symbols z, z, w, w respectively).

A cell-specific RSRQ may be derived by taking an average of the X beam-specific RSRQ values corresponding to X SS block indices or CSI-RS (resource) indices, all of which are above a configured RSRQ threshold value. In an alternative embodiment, the cell-specific RSRQ is derived by taking an average of the X beam specific RSRQ values corresponding to X SS block indices or CSI-RS (resource) indices, the corresponding RSRP values of which are above a configured RSRP threshold value.

At least one of the cell-specific RSRQ and the beam-specific RSRQs may be configured/indicated to be reported. When the beam-specific RSRQs are reported, the same number of beam specific RSRQs may be reported as the reported number of RSRPs, so that a common signaling is applicable for both RSRP and RSRQ. Alternatively, separate indications may be used respectively for the number of RSRPs to be reported; and for the number of RSRQs to be reported.

Alternatively, a single RMR is configured independently of the SS block locations, and the UE is configured to assume that the RMR is QCL'ed with a configured SS block in spatial parameters. The configured SS block index may be explicitly indicated by the network. Alternatively, the configured SS block may correspond to an SS block for which the RSRP may be reported. In this case, the UE is configured to measure the RSSI with the QCL assumption, and take the ratio of the RSSI and the RSRP corresponding to the configured SS block to derive the RSRQ. In this case, a UE may be configured to report a single RSRQ value, corresponding to the configured SS block only.

For inter-frequency measurement, the QCL relation also needs to be configured to the UE between a pair of an SS block and RMR to measure the RSRQ in one carrier frequency, and a pair in another carrier frequency. In one alternative, a UE is configured to assume that the same OFDM symbols are allocated for RMR i and SS block i in a first and a second carrier frequencies, and also to assume that RMR i and SS block i in the first carrier frequency are QCL'ed with RMR i and SS block i in the second carrier frequency in spatial parameters.

When CSI-RS is configured for the inter-frequency RSRQ measurement, the QCL assumption may be such that a same indexed CSI-RS and a corresponding RMR in an inter-frequency cell are QCL'ed with a CSI-RS and a corresponding RMR in a serving cell, in spatial parameters. For the inter-frequency measurement, a single set of CSI-RS applicable across multiple inter-frequency cells may be configured by RRC/SIB. The single set of CSI-RS comprises a set of CSI-RS resources that recurs with a given periodicity and timing offset. The same indexed resource is mapped on a same OFDM symbol across multiple cells, and UE may make an assumption that spatial QCL relationship holds for the same indexed CSI-RS resource in two different carriers.

A UE may be configured with a first CSI-RS resource setting in a first carrier, and a second CSI-RS resource setting in a second carrier, where the two resource settings have identical number of CSI-RS resources. The UE may be indicated that the two CSI-RS resource settings are QCL'ed in spatial parameters. In that case, the UE may assume that the same-indexed CSI-RS resources from the two resource settings are QCL'ed.

In some embodiments for SINR measurement configuration either NZP CSI-RS or SS block can be configured/indicated for the signal part measurement, and an IMR (interference measurement) can be configured for the interference part measurement.

In one embodiment, NZP CSI-RS are configured for the signal part measurement. In one example, a separate ZP CSI-RS is configured as an IMR for each CSI-RS resource group for which a same Rx beam is used for receiving both the ZP CSI-RS and the CSI-RS resource group. In one example, ZP-CSI-RS and CSI-RS resource group are configured as a pair by a single resource configuration. In another example, ZP-CSI-RS and CSI-RS resource group is configured separately.

In another embodiment, all the REs the set of OFDM symbols in the CSI-RS measurement BW corresponding to the CSI-RS resource group is configured as IMR, and the UE is configured to derive the interference by implementation (e.g., by subtracting the signal portion from the total power measured on the RSSI resources). This way, the beam specific SINR is derived per CSI-RS resource, and the cell-specific SINR may also be derived by taking an average of the beam specific SINRs that are above a configured/indicated threshold value.

In yet another embodiment, the REs corresponding to a PDCCH DMRS of a CORESET (or an OFDM symbols with the DMRS) is configured/indicated as IMR.

In yet another embodiment, SS blocks are configured for the signal part measurement.

In one example, a separate ZP CSI-RS is configured as an IMR for each SS block for which a same Rx beam is used for receiving both the ZP CSI-RS and the SS block. In one example, the time location of the ZP-CSI-RS is configured such that it differs from the SS block by a constant offset, wherein the constant offset can be indicated. In another example, a separate configuration is provided in the RRC that indicates M ZP CSI-RS resources for the M actually transmitted SS blocks, wherein ZP CSI-RS i is used for deriving the interference part for SS block i. The M ZP CSI-RS resources may be configured in a batch, e.g., by indicating the number of (consecutive) OFDM symbols and frequency-domain repetition factor or density.

An OFDM symbol offset may be configured to each SS block to configure a corresponding ZP CSI-RS. For example, the last OFDM symbol number of an SS block is n, the time domain location of the ZP CSI-RS is n+o, where o is an OFDM symbol offset. The offset value o may be preconfigured (e.g., o=1); or indicated by SIB/RRC. The BW of the ZP CSI-RS may be pre-configured to be the SS block BW. In one alternative, the ZP CSI-RS BW is the same as PSS/SSS BW. In another alternative, the ZP CSI-RS BW is the same as PBCH BW. In another alternative, the ZP CSI-RS BW is configured between PSS/SSS BW and PBCH BW.

In the aforementioned examples, a UE may assume that ZP CSI-RS i is QCL'ed with SS block i. For the interference averaging, UE is not allowed to average interference across different ZP CSI-RS, but UE is allowed to average interference across the REs corresponding to the same ZP-CSI-RS, which may be periodically recurring.

The numerology of ZP CSI-RS and RMR may not necessarily be the same as the reference numerology or the SS block numerology. Hence, it is proposed to be able to indicate the numerology for the ZP CSI-RS. In addition, it is proposed to be able to indicate the numerology for the RMR. Here, the numerology includes one or more of subcarrier spacing, cyclic prefix, OFDM symbol length, etc.

In one embodiment, a UE is configured to assume that the numerology of ZP CSI-RS and/or RMR paired with an SS block for RSRQ or SINR measurement (including the RLM measurement for IS/OOS) is the same as that of the SS block.

In another embodiment, a UE is configured to assume that the numerology of ZP CSI-RS and/or RMR paired with a CSI-RS for RSRQ or SINR measurement (including the RLM measurement for IS/OOS) is the same as that of the CSI-RS.

Figure 27:
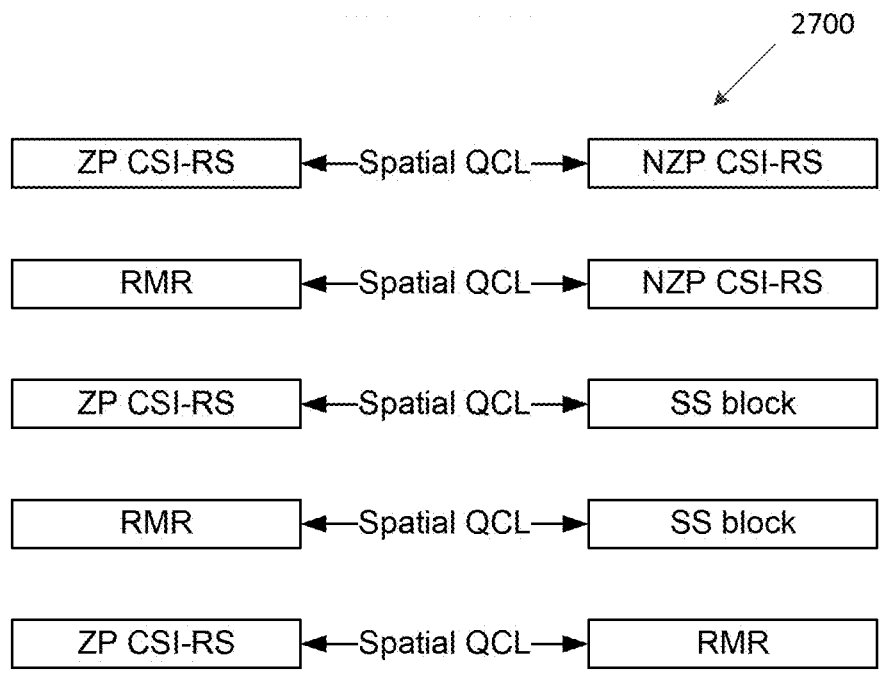
FIG. 27 illustrates an example spatial QCL relationship between different types of RS according to embodiments of the present disclosure.

FIG. 27 illustrates an example spatial QCL relationship 2700 between different types of RS according to embodiments of the present disclosure. An embodiment of the spatial QCL relationship 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions. Other embodiments are used without departing from the scope of the present disclosure.

As shown in FIG. 27, a UE can be indicated/configured by the network so that QCL relation is established between a pair of RS. The pair of RS can be any of ZP CSI-RS and NZP CSI-RS; RMR and NZP CSI-RS; ZP CSI-RS and an SS block; an RMR and an SS block; ZP CSI-RS and RMR. The QCL relation may be explicitly indicated; or implicitly assumed by the UE.

Figure 28A:
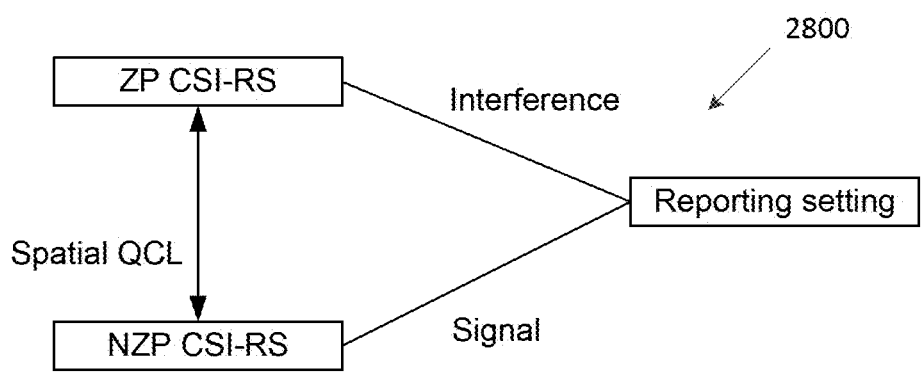
FIG. 28A illustrates an example QCL assumption of the UE according to embodiments of the present disclosure.

FIG. 28A illustrates an example QCL assumption of the UE 2800 according to embodiments of the present disclosure. An embodiment of the QCL assumption of the UE 2800 shown in FIG. 28A is for illustration only. One or more of the components illustrated in FIG. 28A can be implemented in specialized circuitry configured to perform the noted functions or one or more of the components can be implemented by one or more processors executing instructions to perform the noted functions. Other embodiments are used without departing from the scope of the present disclosure.

FIG. 28A illustrates a QCL assumption of the UE when the UE is configured with a CSI reporting setting, linked with a ZP CSI-RS and a NZP CSI-RS respectively for interference and signal measurements. In some embodiments, a ZP CSI-RS corresponds to a resource setting with ZP CSI-RS resources; and a NZP CSI-RS corresponds to a resource setting with NZP CSI-RS resources.

In one embodiment, the UE may assume that the ZP CSI-RS and NZP CSI-RS linked to the reporting setting are QCL'ed in spatial parameters. In general, the UE may assume that all the CSI-RS settings linked to a reporting setting are QCL'ed in spatial parameters, when the reporting setting is configured for CSI reporting.

In another embodiment, the UE is indicated whether the ZP CSI-RS and NZP CSI-RS linked to the reporting setting are QCL'ed in spatial parameters.

Figure 28B:
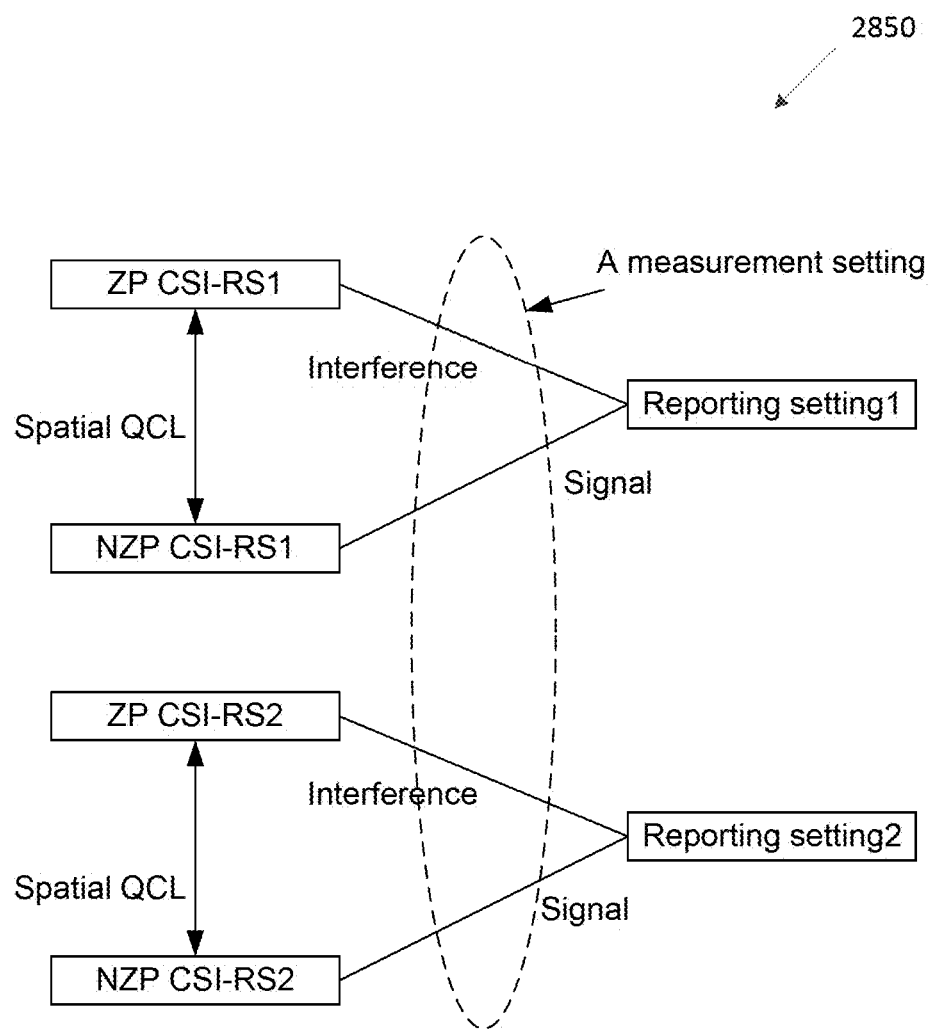
FIG. 28B illustrates another example QCL assumption of the UE according to embodiments of the present disclosure.

FIG. 28B illustrates another example QCL assumption of the UE 2850 according to embodiments of the present disclosure. An embodiment of the QCL assumption of the UE 2850 shown in FIG. 28B is for illustration only. One or more of the components illustrated in FIG. 28B can be implemented in specialized circuitry configured to perform the noted functions or one or more of the components can be implemented by one or more processors executing instructions to perform the noted functions. Other embodiments are used without departing from the scope of the present disclosure.

FIG. 28B illustrates a QCL assumption of the UE when the UE is configured with multiple CSI reporting settings by a measurement setting, where each CSI reporting setting is linked with a ZP CSI-RS and a NZP CSI-RS respectively for interference and signal measurements. In some embodiments, a ZP CSI-RS corresponds to a resource setting with ZP CSI-RS resources; and a NZP CSI-RS corresponds to a resource setting with NZP CSI-RS resources.

In one embodiment, a UE may assume that the ZP CSI-RS and NZP CSI-RS linked to a same reporting setting are QCL'ed in spatial parameters. In general, the UE may assume that all the CSI-RS settings linked to a same reporting setting are QCL'ed in spatial parameters, when the reporting setting is configured for CSI reporting; the UE may not assume that the CSI-RS settings linked to different reporting settings are QCL'ed in spatial parameters.

Figure 29:
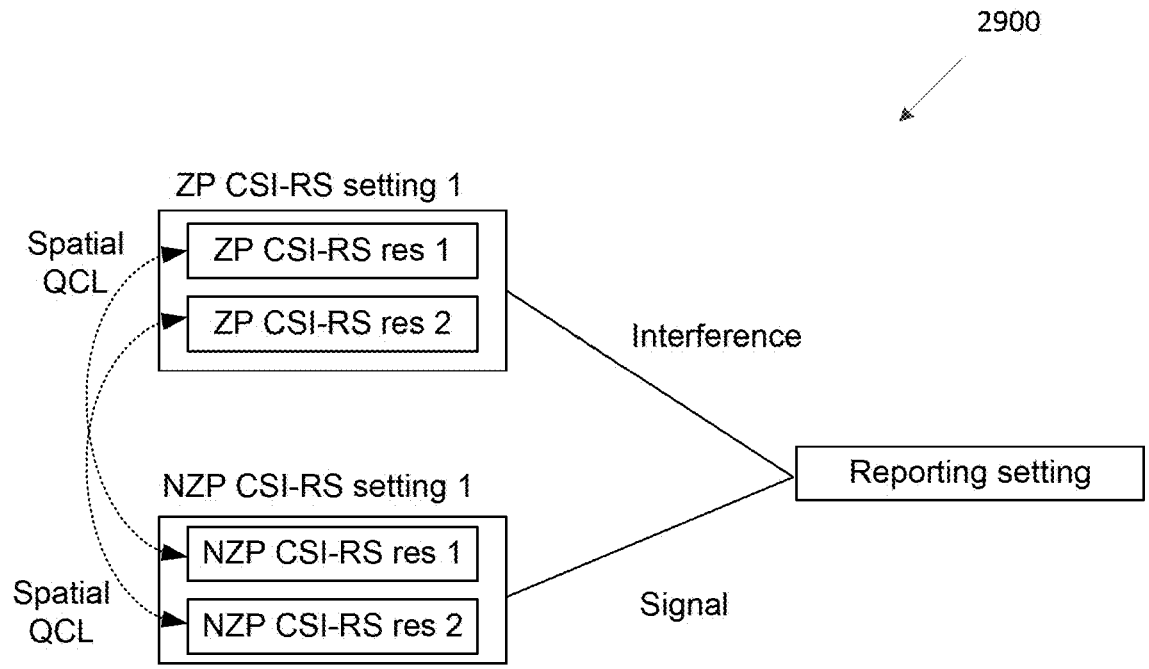
FIG. 29 illustrates an example pair of NZP resource and ZP CSI-RS resource according to embodiments of the present disclosure.

FIG. 29 illustrates an example pair of NZP resource and ZP CSI-RS resource 2900 according to embodiments of the present disclosure. An embodiment of the pair of NZP resource and ZP CSI-RS resource 2900 shown in FIG. 29 is for illustration only. One or more of the components illustrated in FIG. 29 can be implemented in specialized circuitry configured to perform the noted functions or one or more of the components can be implemented by one or more processors executing instructions to perform the noted functions. Other embodiments are used without departing from the scope of the present disclosure.

The NZP CSI-RS may comprise multiple CSI-RS resources which are not QCL'ed in spatial parameters. In such a case, in one method, the network configure a same number of ZP CSI-RS resources as the number of NZP CSI-RS resources, so that UE can measure the reporting quantity based on a pair of NZP resource and ZP CSI-RS resource (i.e., one to one mapping between NZP and ZP CSI-RS resources). This is illustrated in FIG. 29, in which the NZP and ZP resource settings have the same number of resources, and the same numbered ZP and NZP resources may be assumed to be QCL'ed in spatial parameters.

Figure 30:
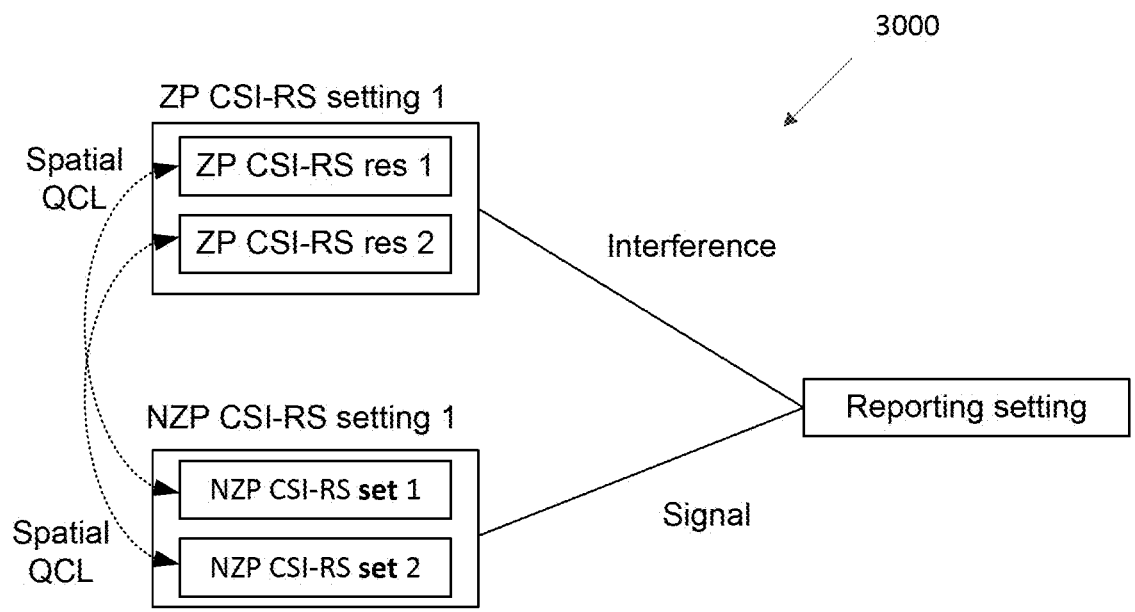
FIG. 30 illustrates another example pair of NZP resource and ZP CSI-RS resource according to embodiments of the present disclosure.

FIG. 30 illustrates another example pair of NZP resource and ZP CSI-RS resource 3000 according to embodiments of the present disclosure. An embodiment of the pair of NZP resource and ZP CSI-RS resource 3000 shown in FIG. 30 is for illustration only. One or more of the components illustrated in FIG. 30 can be implemented in specialized circuitry configured to perform the noted functions or one or more of the components can be implemented by one or more processors executing instructions to perform the noted functions. Other embodiments are used without departing from the scope of the present disclosure.

As shown in FIG. 29, a ZP CSI-RS resource may be assumed to be QCL'ed with a NZP CSI-RS set in spatial parameters. In this case, the CSI-RS resources comprising a resource set may be mapped to a common set of OFDM symbols.

Figure 31:
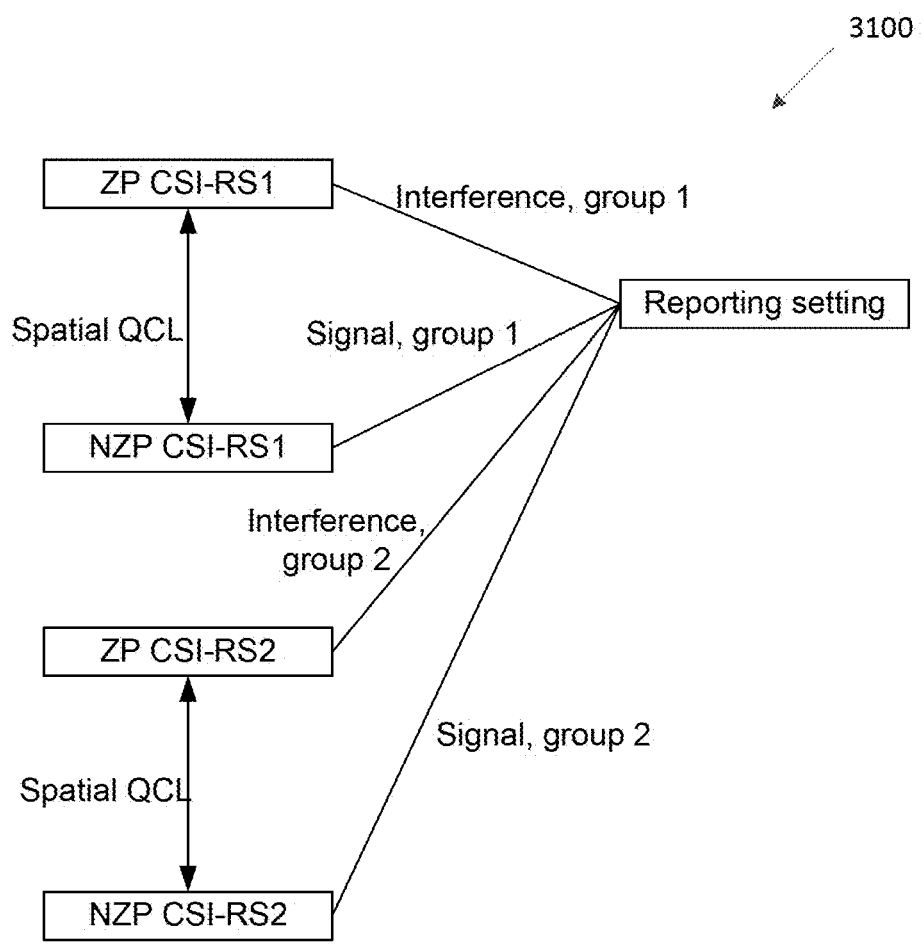
FIG. 31 illustrates another example pair of NZP resource and ZP CSI-RS resource according to embodiments of the present disclosure.

FIG. 31 illustrates another example pair of NZP resource and ZP CSI-RS resource 3100 according to embodiments of the present disclosure. An embodiment of the pair of NZP resource and ZP CSI-RS resource 3100 shown in FIG. 31 is for illustration only. One or more of the components illustrated in FIG. 31 can be implemented in specialized circuitry configured to perform the noted functions or one or more of the components can be implemented by one or more processors executing instructions to perform the noted functions. Other embodiments are used without departing from the scope of the present disclosure.

As shown in FIG. 29, a reporting setting is linked with multiple pairs of a ZP CSI-RS and a NZP CSI-RS, and a (QCL) group index indication is contained for each link, along with the signal/interference measurement indication. UE may assume that the CSI-RS (settings) indicated with a same (QCL) group index are QCL'ed in a set of QCL parameters, e.g., spatial parameters.

Figure 32A:
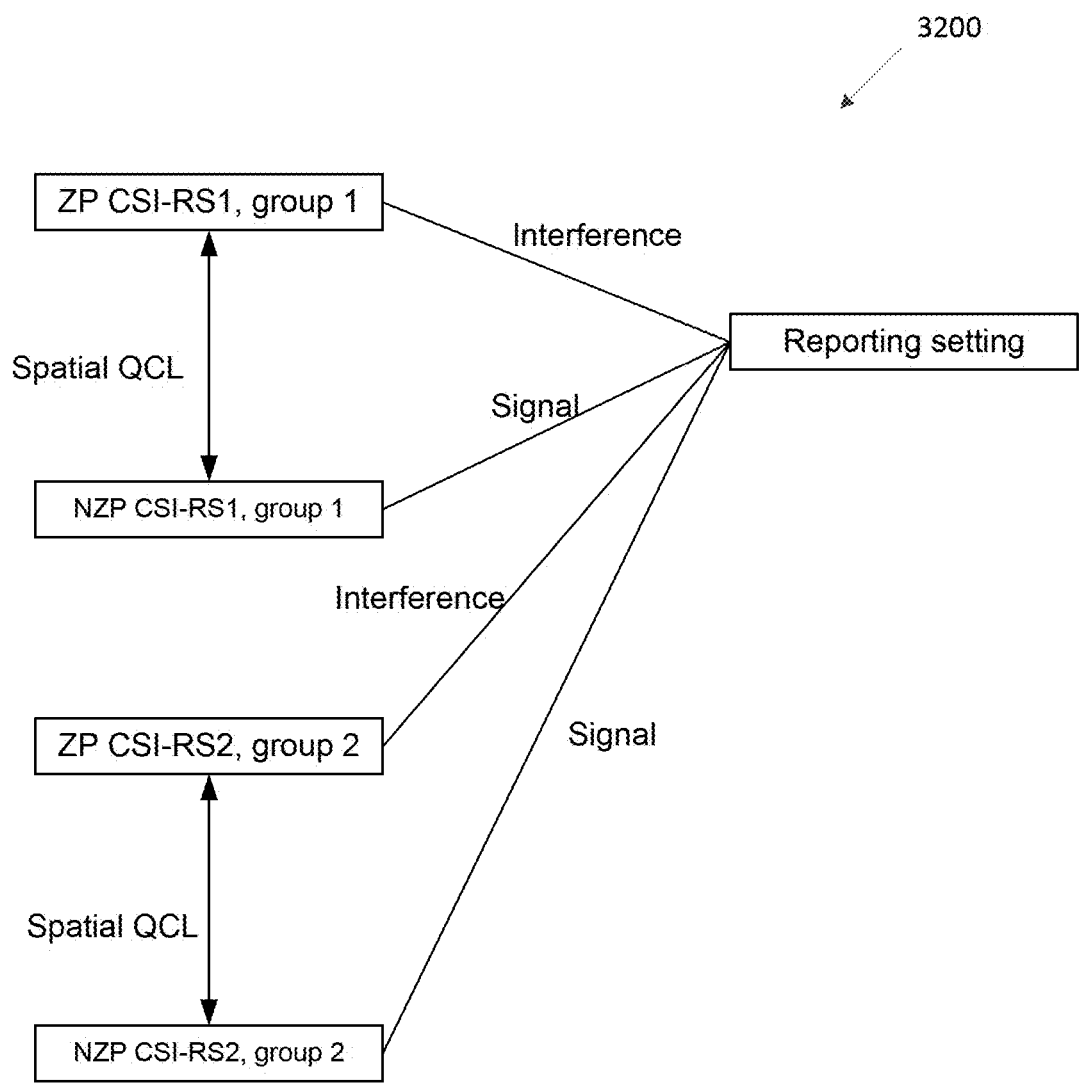
FIG. 32A illustrates another example pair of NZP resource and ZP CSI-RS resource according to embodiments of the present disclosure.

FIG. 32A illustrates another example pair of NZP resource and ZP CSI-RS resource 3200 according to embodiments of the present disclosure. An embodiment of the pair of NZP resource and ZP CSI-RS resource 3200 shown in FIG. 32A is for illustration only. One or more of the components illustrated in FIG. 32A can be implemented in specialized circuitry configured to perform the noted functions or one or more of the components can be implemented by one or more processors executing instructions to perform the noted functions. Other embodiments are used without departing from the scope of the present disclosure.

As shown in FIG. 32A, a reporting setting is linked with multiple pairs of a ZP CSI-RS and a NZP CSI-RS. The (QCL) group index is contained in the resource setting instead, in this embodiment. UE may assume that the CSI-RS (settings) indicated with a same (QCL) group index are QCL'ed in a set of QCL parameters, e.g., spatial parameters.

Figure 32B:
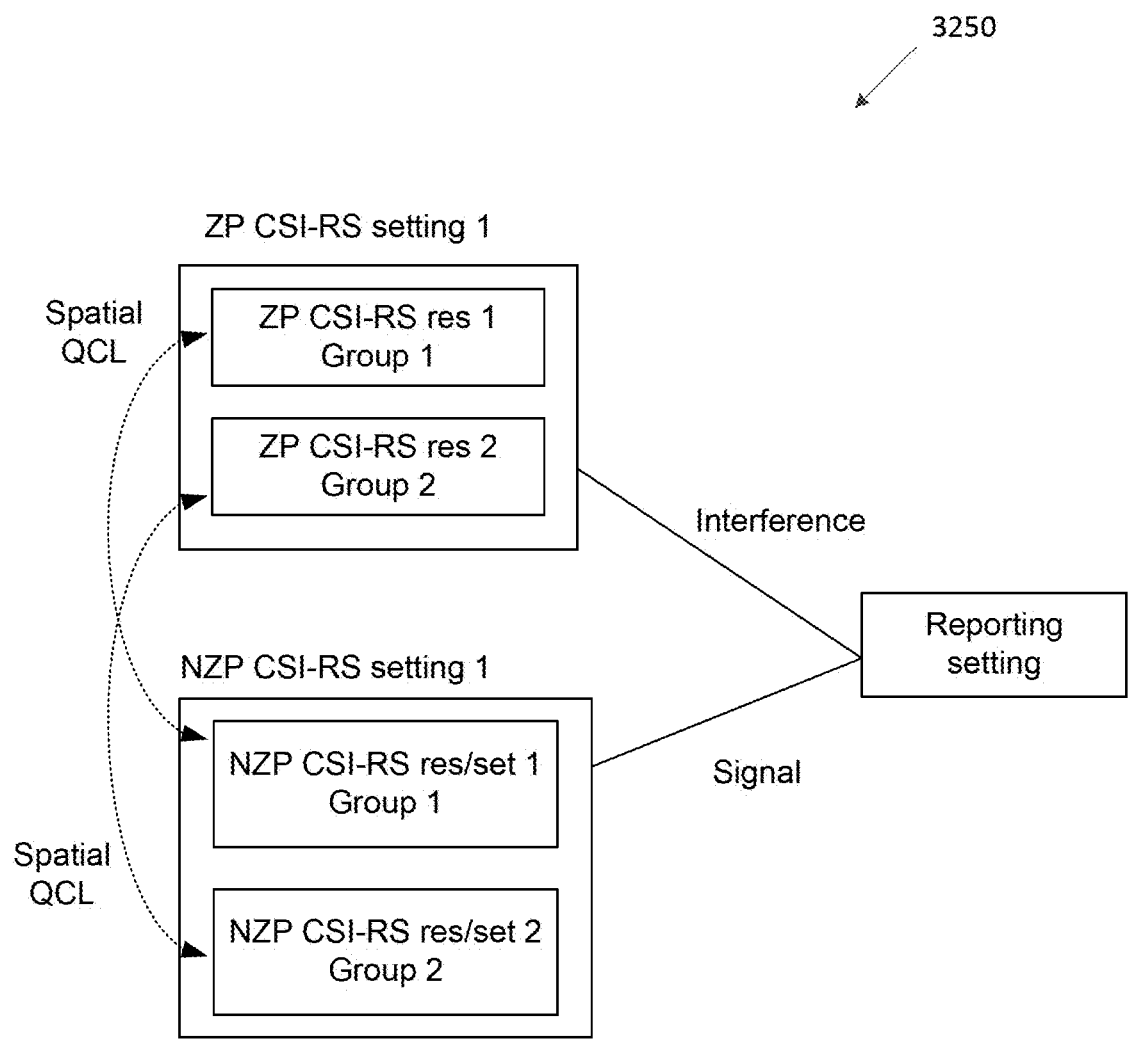
FIG. 32B illustrates another example pair of NZP resource and ZP CSI-RS resource according to embodiments of the present disclosure.

FIG. 32B illustrates another example pair of NZP resource and ZP CSI-RS resource 3250 according to embodiments of the present disclosure. An embodiment of the pair of NZP resource and ZP CSI-RS resource 3250 shown in FIG. 32B is for illustration only. One or more of the components illustrated in FIG. 32B can be implemented in specialized circuitry configured to perform the noted functions or one or more of the components can be implemented by one or more processors executing instructions to perform the noted functions. Other embodiments are used without departing from the scope of the present disclosure.

As shown in FIG. 32B, a reporting setting is linked with a pair of a ZP CSI-RS and a NZP CSI-RS. The (QCL) group index is contained in the resource or resource set configuration instead, in this embodiment. A UE may assume that the CSI-RS resource and the CSI-RS resource/set indicated with a same (QCL) group index are QCL'ed in a set of QCL parameters, e.g., spatial parameters.

The aforementioned embodiments and examples illustrated in FIGS. 28A, 28B, 29, 30, 31, 32A, and 32B are also applicable to all the pairs of measurement resources illustrated in FIG. 27. In other words, the NZP CSI-RS and the ZP CSI-RS can be replaced with any of RMR and NZP CSI-RS; ZP CSI-RS and an SS block; an RMR and an SS block; ZP CSI-RS and RMR.

In one embodiment, the (QCL) group ID in the above embodiments can be replaced with CSI-RS related IDs (at least one of a resource setting ID, resource set ID or resource ID).

In one embodiment, measurement quantities involving both channel and interference measurements (e.g., RSRQ, SINR-like metric such as PDCCH BLER, RS-SINR, CQI, etc.) are derived using any pair of resources shown in FIG. 27, and a UE may assume that the resources comprising the pair are QCL'ed in spatial parameters.

In some embodiments for RS-SINR vs. RLM measurement, in both measurements of RS-SINR and RLM, the UE is configured to measure signal/channel and interference. For the channel measurements, either SS block or CSI-RS can be configured. For the interference measurement, as proposed in the previous embodiments, ZP-CSI-RS, REs/OFDM symbols with NZP CSI-RS or PDCCH DMRS.

The RS-SINR is a metric to represent the data throughput, while the RLM is a metric to represent PDCCH decoding performance. Hence, the place to measure the interference needs to be separately configured. The IMR for RLM may be included in the PDCCH CORESET region, while the IMR for RS-SINR may be included in the PDSCH region.

The IMR for RLM is REs (or OFDM symbols) to map PDCCH DMRS in a CORESET, which is QCL'ed with the SS block or CSI-RS that is configured for the channel part of the RLM measurement. In an alternative embodiment, a ZP-CSI-RS is configured in the OFDM symbols corresponding to the CORESET. The ZP-CSI-RS may have a X REs/RB density in a single OFDM symbol (i.e., the ZP CSI-RS repeats every 12/X REs in frequency domain), and the starting subcarrier offset may be implicitly or explicitly configured, where X can be one of 1, 2, 3, 4, . . . . In one example, the starting offset for the ZP CSI-RS is determined as a function of physical cell ID, e.g., PCID mod (12/X).

The IMR for RS-SINR needs to be separately configured from the IMR for RLM. In one example, the IMR for RS-SINR is configured in the PDSCH region, for which the PDSCH antenna port is QCL'ed with the SS block or CSI-RS that are used for the channel measurement. To derive each RS-SINR value corresponding to a CSI-RS resource or an SS block, the UE is allowed to measure interference in time duration (or time-frequency resources) for which the PDSCH DMRS antenna ports are QCL'ed with the CSI-RS or the SS block. The aforementioned embodiments may be applicable to RLM interference and RSSI measurement as well.

To derive each RLM metric corresponding to a CSI-RS resource or an SS block, the UE is allowed to measure interference in time duration (or time-frequency resources) for which the PDCCH DMRS antenna ports are QCL'ed with the CSI-RS or the SS block.

To derive each (beam specific) RSRQ corresponding to a CSI-RS resource or an SS block, the UE is allowed to measure RSSI in a time duration (or time-frequency resources) for which the DMRS is QCL'ed.

In some embodiments, default RLM-RS resources in case SS blocks are used for channel measurements The default RLM-RS resource(s) may be SS blocks, as CSI-RS may not always be available. Then, the remaining question is which SS blocks may be regarded as default RLM-RS resource(s). It seems natural that UE needs to only monitor actually transmitted SS blocks (SSBs).

In one embodiment, the SSB set composition is indicated in two places: in RMSI; and in RRC. Until UE is indicated by the RRC, the default SSBs to monitor RLM may be all the SSBs indicated by the RMSI. Once the UE is configured by RRC, the default SSBs to monitor RLM may be all the SSBs indicated by RRC. Further reducing the number of RLM resources than the SSBs indicated by RRC does not seem to be desirable, to make the RLF condition stringent (i.e., less service interruption).

As long as some of CORESETs QCL'ed with the SS blocks can have reliable SINR, the UE can still receive PDCCH from the cell, and the UE can still get service from the cell. Based on this discussion, the following is proposed: the default RLM-RS may be SS blocks. Until RRC indication of SSB set composition (SSB-transmitted) is available, the default SSB set to measure RLM metrics is configured according to the RMSI indication of SSB set composition (SSB-transmitted-SIB1).

Once RRC indication of SSB set composition (SSB-transmitted) is available, the default SSB set to measure RLM metrics is configured according to the RRC indication of SSB set composition (SSB-transmitted).

In traditional wireless and mobile communications systems, timing advance (TA) at the UE side is necessary and used to guarantee and maintain uplink signals are synchronized at the base station side. TA is defined as the timing offset between the start of a received downlink reference signal and a transmitted uplink signal.

Figure 33:
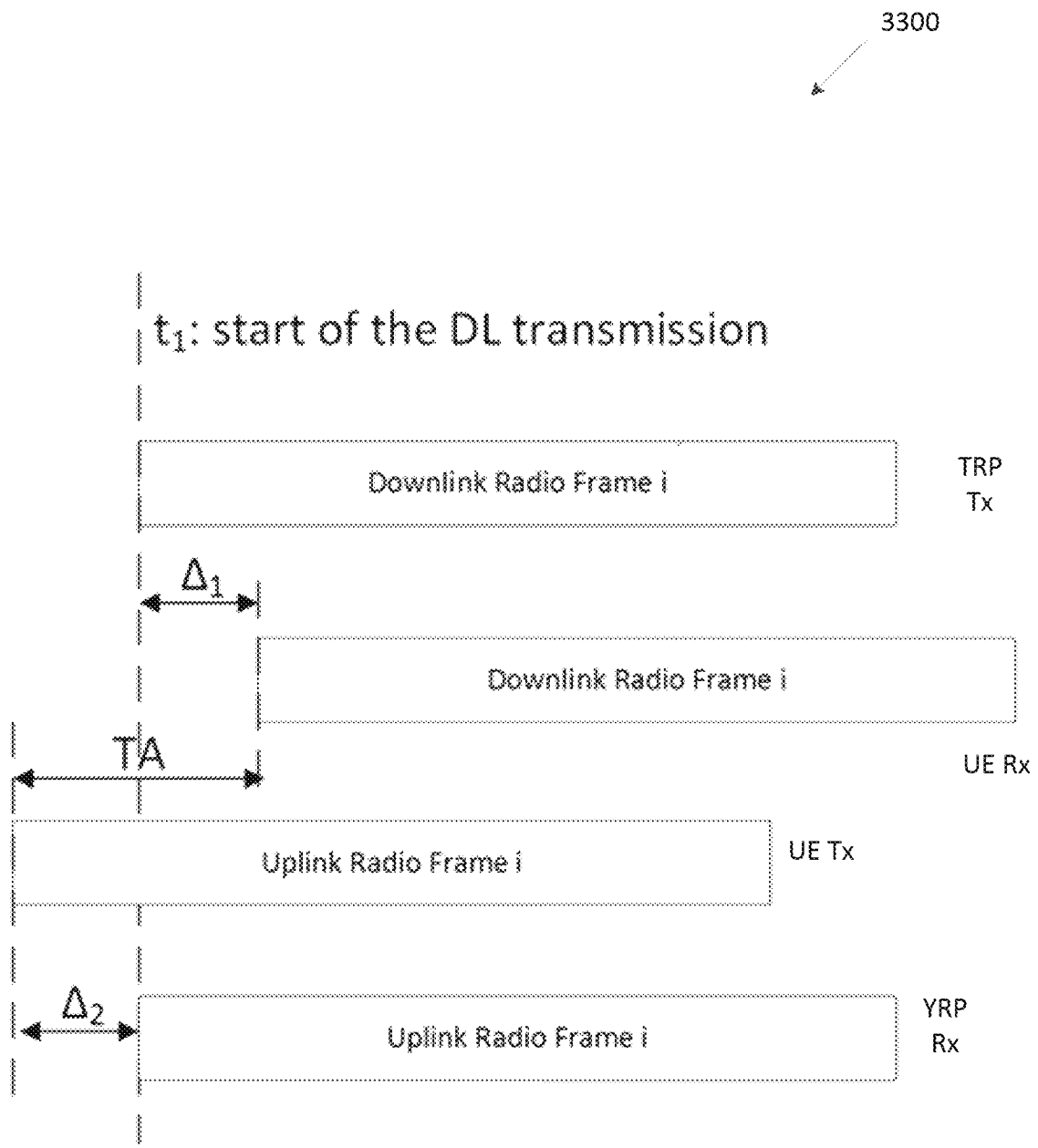
FIG. 33 illustrates an example timing advance according to embodiments of the present disclosure.

FIG. 33 illustrates an example timing advance 3300 according to embodiments of the present disclosure. An embodiment of the timing advance 3300 shown in FIG. 33 is for illustration only. One or more of the components illustrated in FIG. 33 can be implemented in specialized circuitry configured to perform the noted functions or one or more of the components can be implemented by one or more processors executing instructions to perform the noted functions. Other embodiments are used without departing from the scope of the present disclosure.

FIG. 33 shows why timing advance is necessary to ensure the synchronization with the TRP. There is a propagation delay $\Delta_1$ from the TRP to the UE. When the downlink radio frame starts transmission at time $t_1$, the UE can receive the downlink radio frame at $t_1+\Delta_1$. If the UE starts the uplink radio frame at time $t_1$, because of a propagation delay of $\Delta_2$ from the UE to the TRP, the uplink radio frame may arrive at the TRP at time $t_1+\Delta_1+\Delta_2$. In order for the uplink and downlink radio frame at the TRP to time align with each other, the UE is required to start the uplink transmission in advance by $\Delta_1+\Delta_2$ that is the timing advance.

Figure 34:
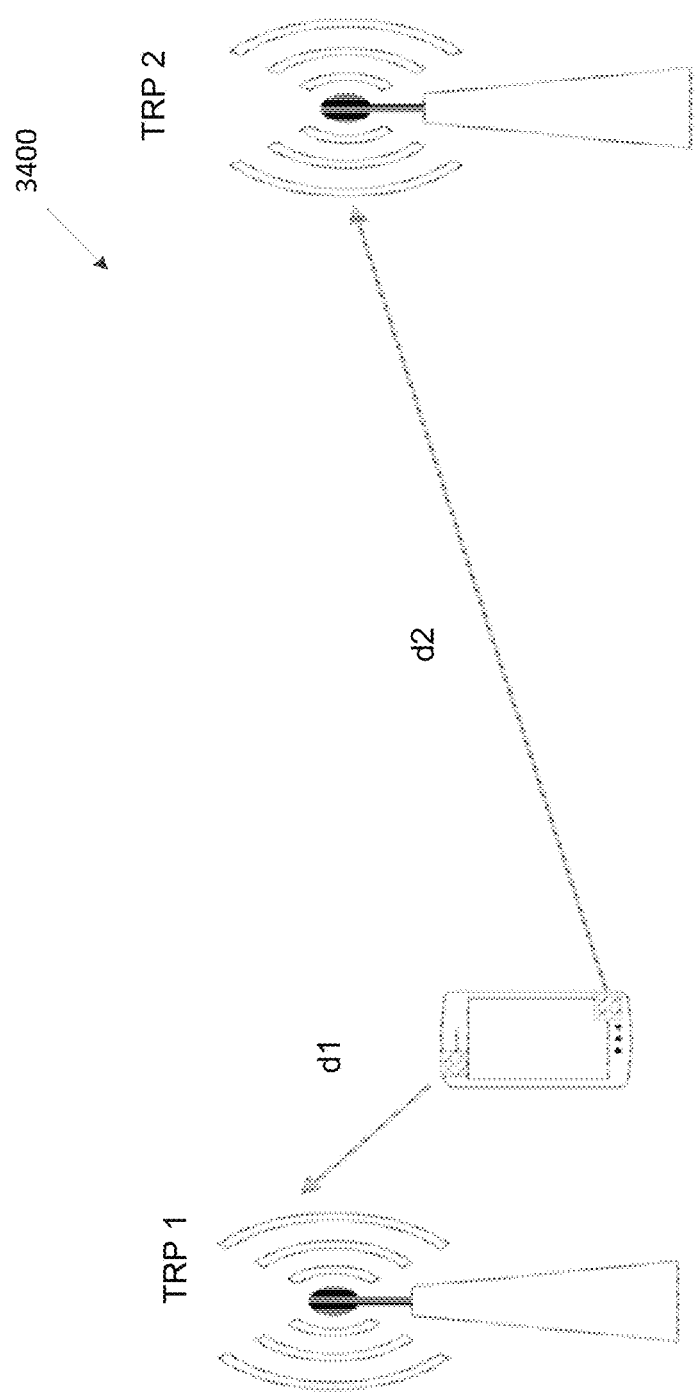
FIG. 34 illustrates an example UE communications with TRP1 and TRP2 simultaneously according to embodiments of the present disclosure.

FIG. 34 illustrates an example UE communications 3400 with TRP1 and TRP2 simultaneously according to embodiments of the present disclosure. An embodiment of the UE communications 3400 shown in FIG. 34 is for illustration only. One or more of the components illustrated in FIG. 34 can be implemented in specialized circuitry configured to perform the noted functions or one or more of the components can be implemented by one or more processors executing instructions to perform the noted functions. Other embodiments are used without departing from the scope of the present disclosure.

In future wireless and mobile communication systems, the UE can communication simultaneously to two or more separate TRPs in order to improve system reliability or capacity. For example, as shown in FIG. 34, the UE communicates with TRP1 and TRP2 simultaneously. The transmission by the UE to TRP1 and TRP2 can be either coherent transmission or non-coherent transmission, or DPS (Dynamic Point Selection transmission) or other CoMP transmission modes.

The carrier frequency used for TRP1 and TRP2 can be different or the same. The transmission points at the UE side can be single panel or multi-panels. No matter in which case, the propagation delay from the UE to TRP1 or TRP2 can be different because the propagation distance d1 and d2 can be different. In some situations, especially in millimeter wave systems where blockage constitutes a big impact on the system, the propagation distance d1 and d2 can be very different. If the UE uses the same TA for these two TRPs, there may be a problem.

Figure 35:
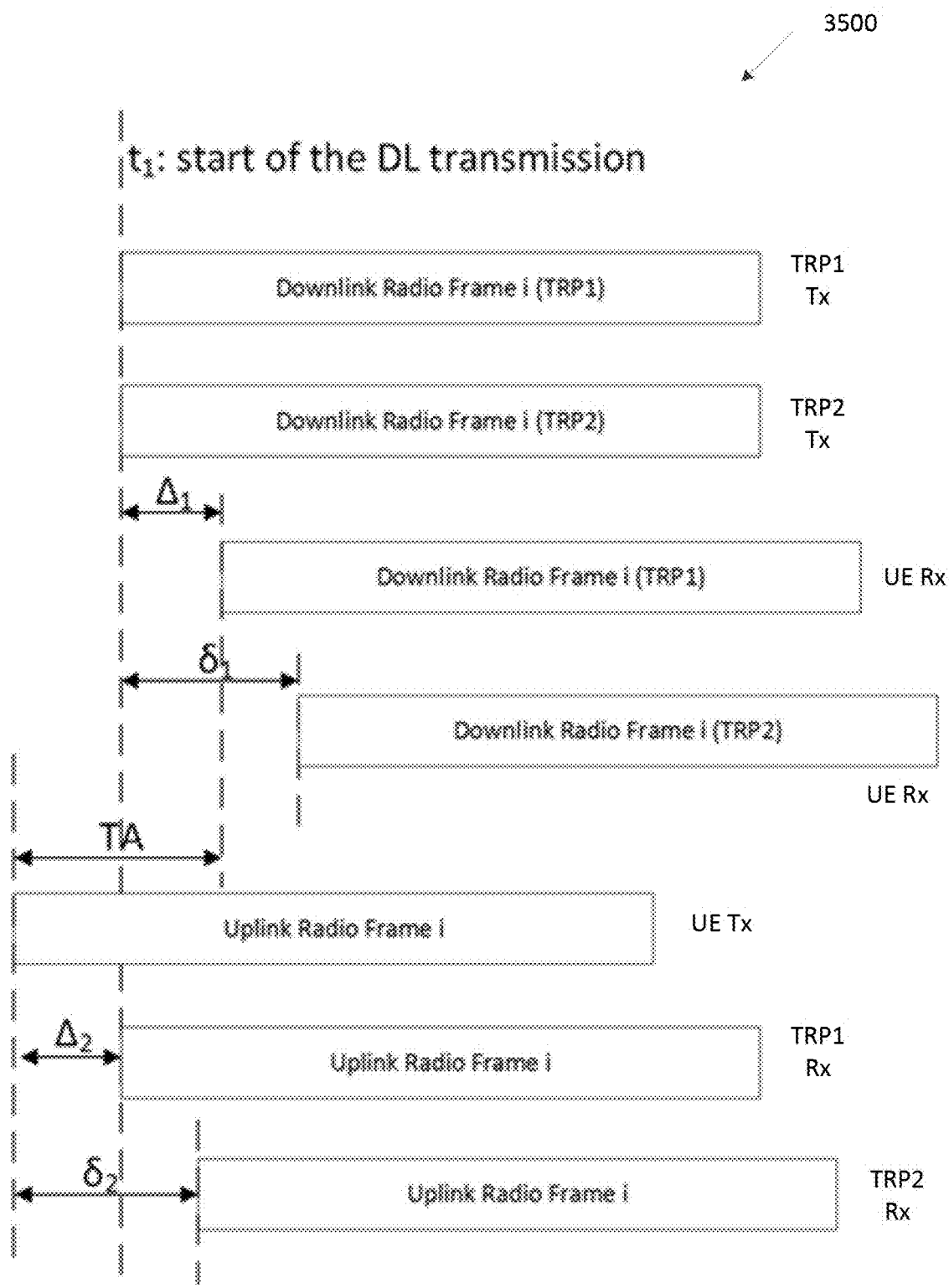
FIG. 35 illustrates an example propagation delay according to embodiments of the present disclosure.

FIG. 35 illustrates an example propagation delay 3500 according to embodiments of the present disclosure. An embodiment of the propagation delay 3500 shown in FIG. 35 is for illustration only. One or more of the components illustrated in FIG. 35 can be implemented in specialized circuitry configured to perform the noted functions or one or more of the components can be implemented by one or more processors executing instructions to perform the noted functions. Other embodiments are used without departing from the scope of the present disclosure.

FIG. 35 illustrates the problem that may happen when only one TA is used for two TRPs that have different propagation distances to the UE and hence different propagation delay. There is a propagation delay of $\Delta_1$ from TRP1 and $\delta_1$ from TRP2 to the UE respectively, propagation delay of $\Delta_2$ and $\delta_2$ from the UE to TRP1 and TRP2 respectively. Here it is assumed that TRP1 is nearer to the UE than TRP2 in distance, hence smaller downlink propagation delay of $\Delta_1$ than $\delta_1$, and also smaller uplink propagation delay of $\Delta_2$ than $\delta_2$.

When the downlink radio frame starts transmission at time $t_1$, the UE can receive the downlink radio frame from TRP1 at time $t_1+\Delta_1$ and from TRP2 at time $t_1+\delta_1$. If the UE applies the TA of $\Delta_1+\Delta_2$ based upon the downlink reference timing of TRP1 and starts the uplink radio frame at time in advance by $\Delta_1+\Delta_2$, then TRP1 may receive the uplink radio frame at time $t_1$ that may ensure the synchronization between uplink and downlink for TRP1. However, for TRP2, it can receive the uplink radio frame at time $t_1+\delta_2-\Delta_2$.

It is assumed that $\delta_2$ is larger than $\Delta_2$, so for TRP2, the downlink and uplink synchronization cannot be ensured. Similarly, if the UE applies the TA of $\delta_1+\delta_2$ based upon the downlink reference timing of TRP2 and starts the uplink radio frame at time in advance by $\delta_1+\delta_2$, then TRP2 may receive the uplink radio frame at time $t_1$ that may ensure the synchronization between uplink and downlink for TRP2. However, for TRP1, it can receive the uplink radio frame at time $t_1+\Delta_2-\delta_2$. We assume $\delta_2$ is larger than $\Delta_2$, so for TRP1, the downlink and uplink synchronization cannot be ensured.

Figure 36:
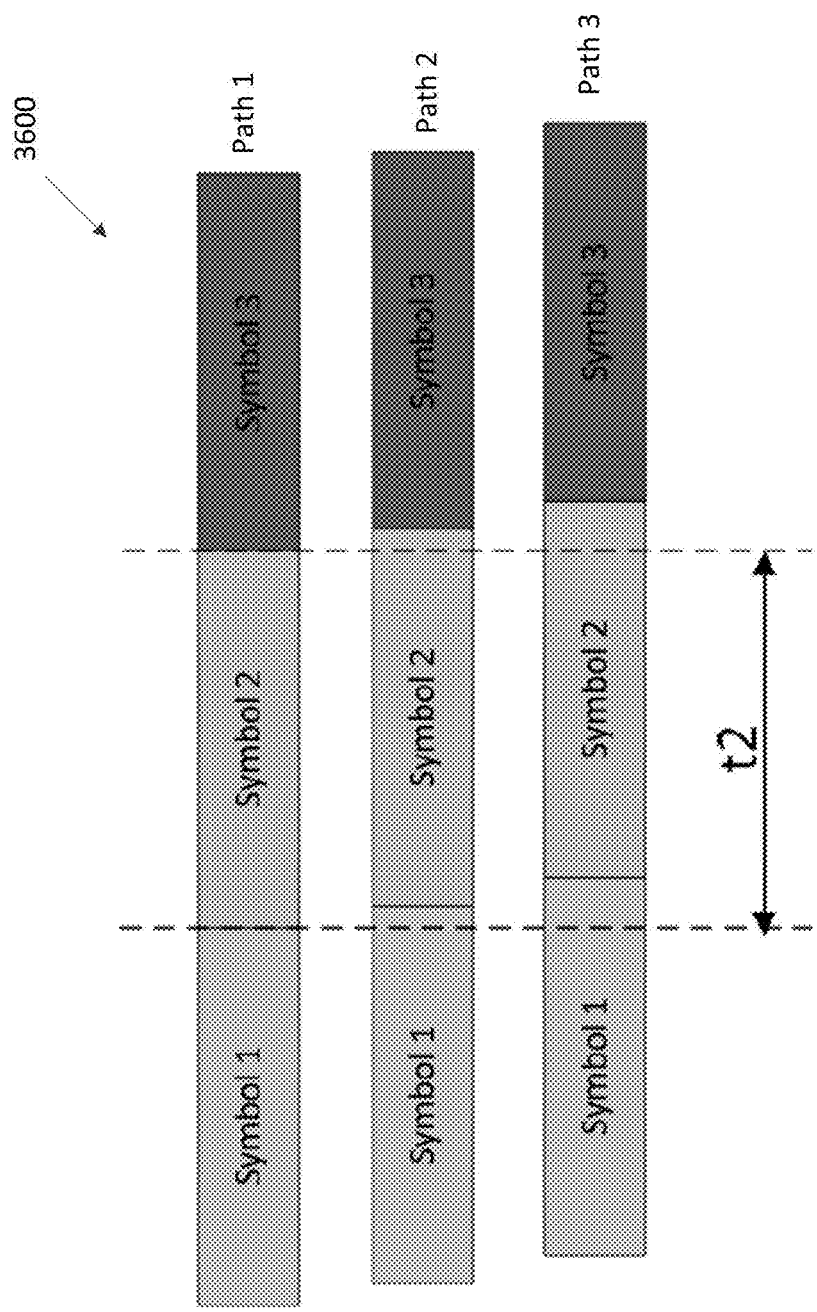
FIG. 36 illustrates an example inter symbol interference according to embodiments of the present disclosure.

FIG. 36 illustrates an example inter symbol interference 3600 according to embodiments of the present disclosure. An embodiment of the inter symbol interference 3600 shown in FIG. 36 is for illustration only. One or more of the components illustrated in FIG. 36 can be implemented in specialized circuitry configured to perform the noted functions or one or more of the components can be implemented by one or more processors executing instructions to perform the noted functions. Other embodiments are used without departing from the scope of the present disclosure.

Because of radio signal transmission properties such as reflection, refraction in wireless channels, multi-path delay is present in wireless communication system where radio signals reach the receiver by more than one path and may result in inter-symbol interference (ISI) as FIG. 36 shows. We assume three multi-paths exist in the system, and the receiver can get three copies of the transmitted symbols. For example, at receiving time window t2, the receiver not only gets the multi-path signal of symbol 2, but also multi-path signal of symbol 1 That means, symbol 1 constitutes ISI to symbol 2.

Figure 37:
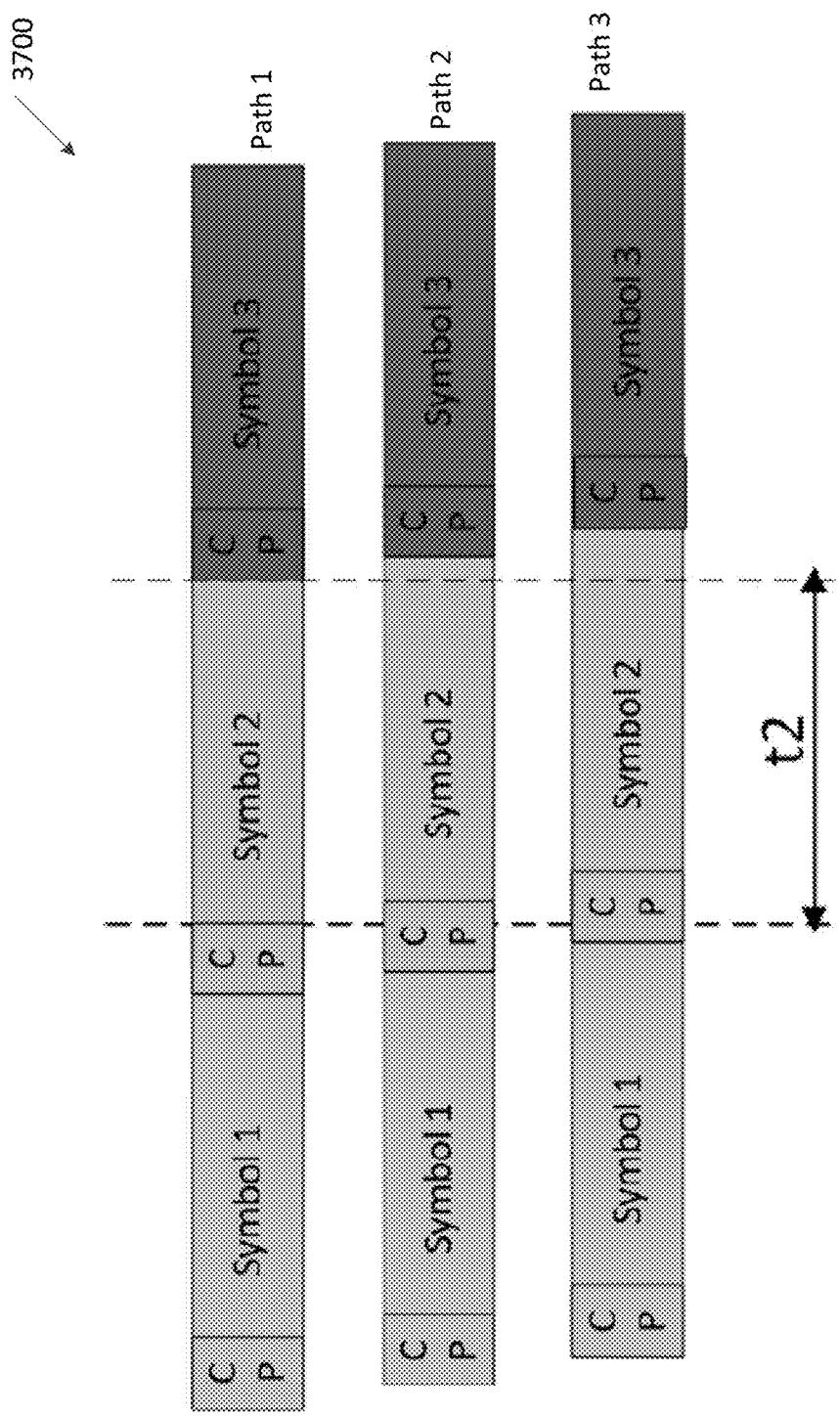
FIG. 37 illustrates an example inter symbol interference and CP according to embodiments of the present disclosure.

FIG. 37 illustrates an example inter symbol interference and CP 3700 according to embodiments of the present disclosure. An embodiment of the inter symbol interference and CP 3700 shown in FIG. 37 is for illustration only. One or more of the components illustrated in FIG. 37 can be implemented in specialized circuitry configured to perform the noted functions or one or more of the components can be implemented by one or more processors executing instructions to perform the noted functions. Other embodiments are used without departing from the scope of the present disclosure.

The cyclic prefix (CP) used in e.g., OFDM systems acts as a guard interval between each OFDM symbol to combat ISI resulting from radio multi-path propagation. The CP is created by preceding each OFDM symbol by a copy of the end part of that same symbol. As FIG. 37 below shows, the ISI can be effectively eliminated by adding CP that is longer than the multi-path delay spread. For example, in the receiving time window t2, only multi-path of symbol 2 is receive, the ISI from symbol 1 is entirely eliminated. The disadvantage of CP is that it takes up system bandwidth and reduces the overall data rate, so the length of CP cannot be two long to reduce the overall system overhead.

For the multi-TRP case as explained above in FIG. 35, CP can be used to combat the propagation delay issue where only one TA is adopted. When multi-path is not taken into account, the propagation delay may be smaller than the length of CP. That is, if $\Delta_2-\delta_2<CP$ in FIG. 35, ISI can be avoided. If multi-path is taken into account, the problem may be more serious. The propagation delay plus multi-path delay spread may be smaller than the length of CP. That is if $\Delta_2-\delta_2$+multi-path delay spread <CP in FIG. 35, ISI can be avoided.

In order for the propagation delay+multi-path delay spread not to exceed the CP length, the transmission distance difference between any two TRPs (i.e., d2−d1 in FIG. 37) that can be supported is calculated as below. Here it is assumed that CDL-A channel model as defined in LTE specification for 28 GHz carrier frequency is considered. The CP length is assumed based upon LTE frame structure numerology and scaled correspondingly according to various SCS (subcarrier spacing). SCS configuration is based upon NR frame structure numerology.

The CP length for various SCS is shown as below in TABLE 6. The calculation result of maximum allowed propagation distance difference between any TRPs is shown as below in TABLE 7. It can be seen from TABLE 7 that, for SCS of 120 KHz and 240 KHz, the maximum allowed propagation distance difference between any two TRPs is short. For example, for narrow BF 2 case, if the propagation distance difference between two TRPs is larger than 21.46 m, the propagation delay+multi-path delay spread may exceed the CP length, ISI may be present.

TABLE 6

| CP length for various subcarrier spacing | |
| --- | --- |
| Subcarrier Spacing (KHz) | CP (us) |
| 60 | 1.30 |
| 120 | 0.65 |
| 240 | 0.33 |

TABLE 7

| Maximum allowed propagation distance difference between TRPs | | | | | | |
| --- | --- | --- | --- | --- | --- | --- |
| | | Scaling Factors (DSdesired) | CDL-A delay spread (us) | d2 − d1 (m) 60 KHz SCS | d2 − d1 (m) 120 KHz SCS | d2 − d1 (m) 240 KHz SCS |
| UMI (28 GHz) | Narrow BF 1 | 30 | 0.29 | 303.70 | 108.39 | 10.73 |
| | Narrow BF 2 | 60 | 0.58 | 216.77 | 21.46 | 0.00 |

For millimeter-wave system, multi-panel antenna structure is proposed for UEs, especially for high-end UEs, where multi-beams can be formed from different panels separately or jointly to further improve system reliability or capacity. Here for multi-panel UE, each panel may have different best TRP to communicate as FIG. 34 shows. If only one TA is used for each panel, the ISI described above may also happen.

One of the solutions to the above problem is the use of multiple timing advance in the multi-TRP systems.

Figure 38:
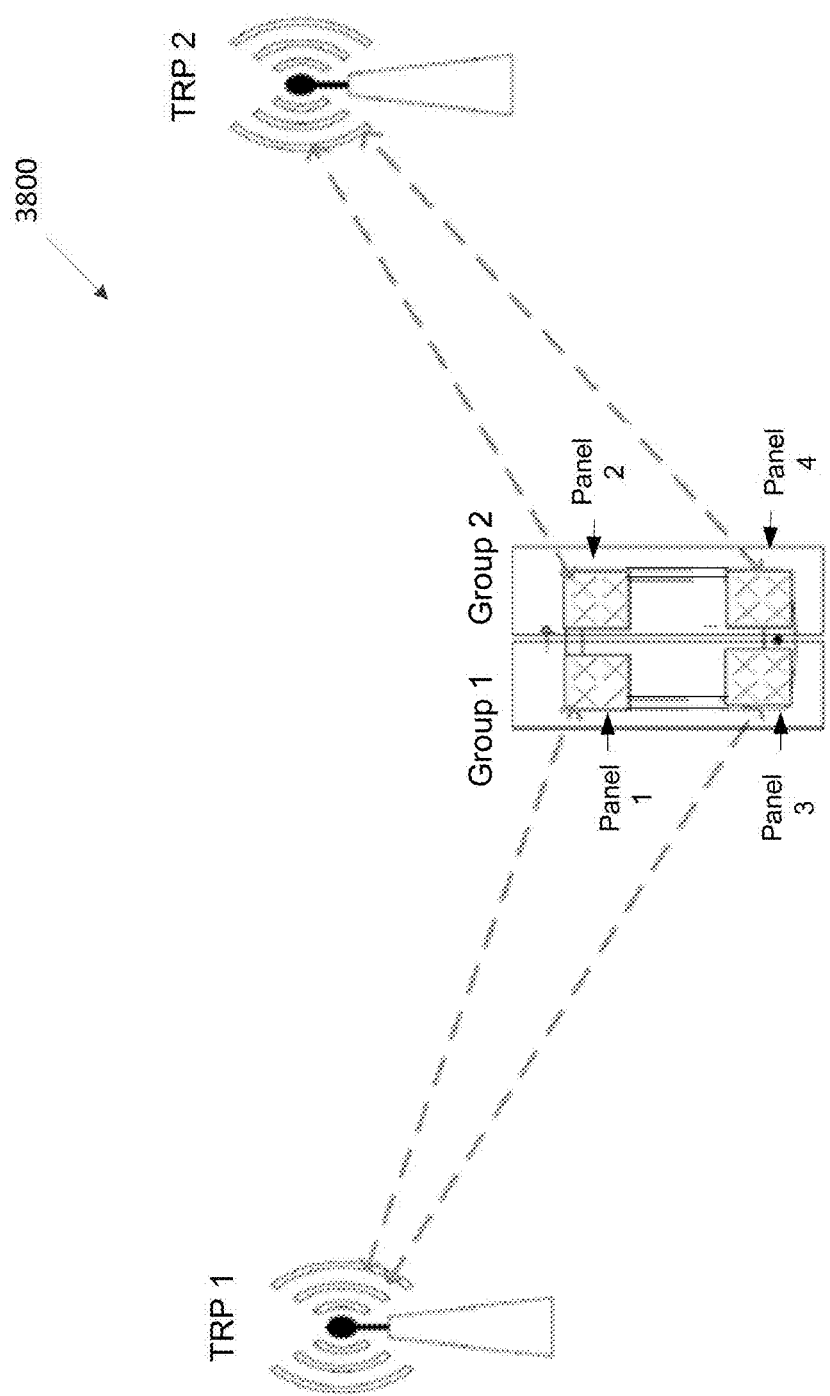
FIG. 38 illustrates an example few panels in a UE according to embodiments of the present disclosure.

FIG. 38 illustrates an example few panels in a UE 3800 according to embodiments of the present disclosure. An embodiment of the few panels in a UE 3800 shown in FIG. 38 is for illustration only. One or more of the components illustrated in FIG. 38 can be implemented in specialized circuitry configured to perform the noted functions or one or more of the components can be implemented by one or more processors executing instructions to perform the noted functions. Other embodiments are used without departing from the scope of the present disclosure.

Suppose that there are a few panels in the UE as in FIG. 38. If a separate TA and PC is configured for each panel, that may make the power control extremely complex, due to independent TRP MAC and scheduling that leads to separate uplink power control B SR reporting, PHR reporting, DRX, asynchronous operation, PRACH procedure, exchange info between TRPs.

Limit the maximum number of groups, e.g., 2. For each group, coherent JT can be used for panels with the same TA and PC. Non-coherent JT can be used between groups. e.g., in FIG. 38, Panels 1 and 3 belong to Group1, Panels 2 and 4 belong to Group2.

The maximum allowed number of TA groups and detailed TA groups information can be configured and indicated by the gNB during the RRC connection establishment or reconfiguration procedures.

There are a few embodiments to support multiple advance timing procedures in the multi-TRP systems. In such embodiments, the gNB either determines additional TAs and configures additional TA operation to the UE or the UE determines the UE's additional TA operation and informs TRPs of the UE's multi-TA operation. Also in each method, the procedures on how to group multiple TAs for multi-panel UEs are elaborated.

SoundingRS-UL-ConfigDedicated IE is added to indicate panel number and number of ports in each panel is indicated by the field srs-AntennaPort.

```
SoundingRS-UL-ConfigCommon ::=     CHOICE {
    release                        NULL,
    setup                          SEQUENCE {
        srs-BandwidthConfig            ENUMERATED {bw0, bw1, bw2, bw3, bw4,
bw5, bw6, bw7},
        srs-SubframeConfig             ENUMERATED {
                                           sc0, sc1, sc2, sc3, sc4, sc5, sc6, sc7,
                                           sc8, sc9, sc10, sc11, sc12, sc13, sc14, sc15},
        ackNackSRS-SimultaneousTransmission   BOOLEAN,
        srs-MaxUpPts                   ENUMERATED {true}         OPTIONAL
        -- Cond TDD
    }
}
SoundingRS-UL-ConfigDedicated ::=  CHOICE{
    release                        NULL,
    setup                          SEQUENCE {
        srs-Bandwidth                  ENUMERATED {bw0, bw1, bw2, bw3},
        srs-HoppingBandwidth           ENUMERATED {hbw0, hbw1, hbw2, hbw3},
        freqDomainPosition             INTEGER (0..23),
        duration                       BOOLEAN,
        srs-ConfigIndex                INTEGER (0..1023),
        transmissionComb               INTEGER (0..1),
        cyclicShift                    ENUMERATED {cs0, cs1, cs2, cs3, cs4, cs5, cs6,
cs7}
    }
}
SoundingRS-UL-ConfigDedicated-v1020 ::=  SEQUENCE {
    srs-AntennaPort-r10                  SRS-AntennaPort
srs-Panel SRS-Panel
}
```

In one embodiment, the gNB configures additional TA operation according to uplink SRS measurements.

In one embodiment, the gNB configures additional TA operation by signalling additional RACH procedure and RACH measurements.

In one embodiment, the gNB configures additional TA operation based upon reported SS block information feedback by the UE.

In one embodiment, the UE determines additional TA operation based upon DL synchronization procedures from multi-TRPs.

Figure 39:
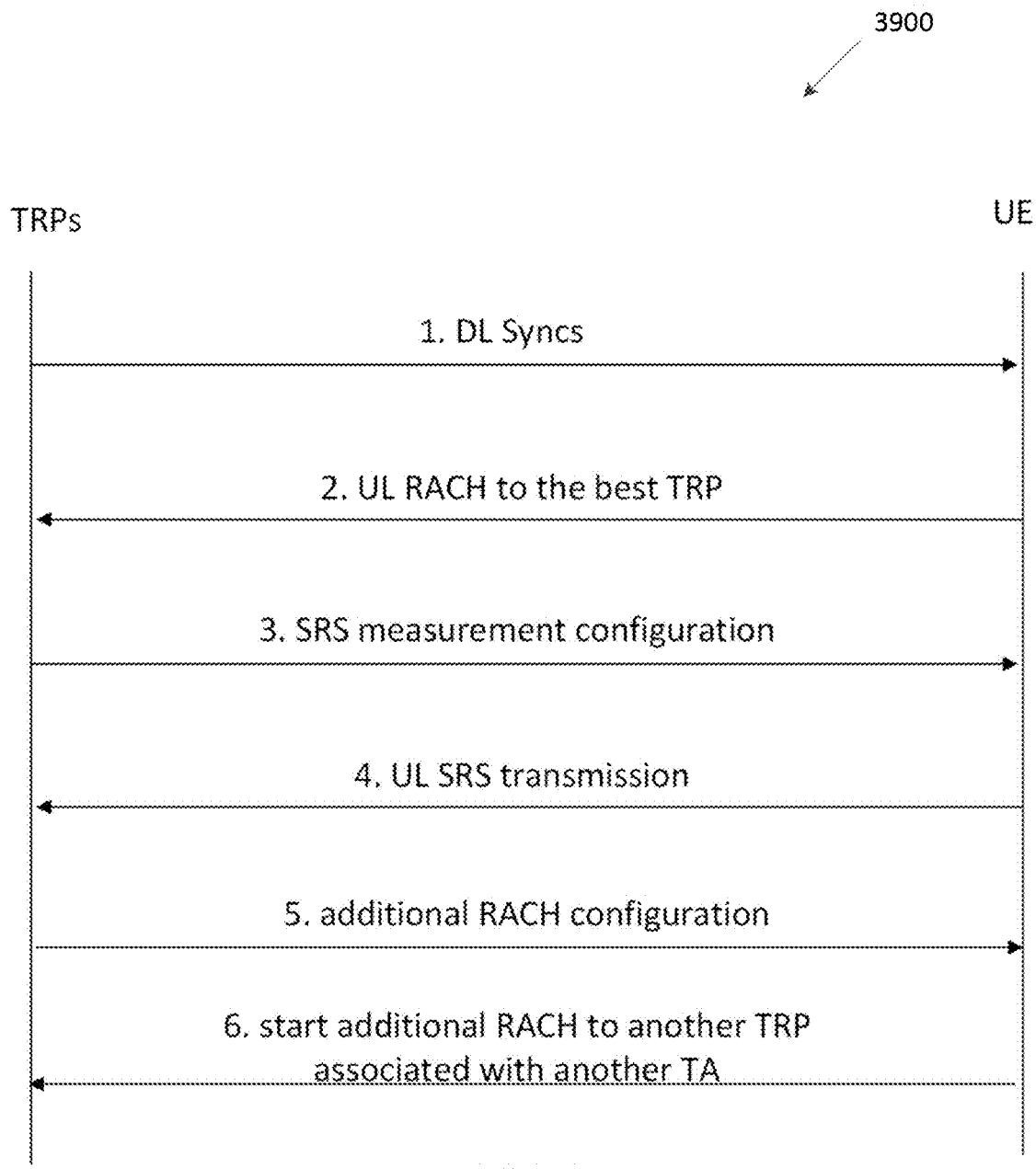
FIG. 39 illustrates an example multi-TA procedure according to embodiments of the present disclosure.

FIG. 39 illustrates an example multi-TA procedure 3900 according to embodiments of the present disclosure. An embodiment of the multi-TA procedure 3900 shown in FIG. 39 is for illustration only. One or more of the components illustrated in FIG. 39 can be implemented in specialized circuitry configured to perform the noted functions or one or more of the components can be implemented by one or more processors executing instructions to perform the noted functions. Other embodiments are used without departing from the scope of the present disclosure.

In one embodiment, the multi-TA procedure is illustrated in FIG. 39. In FIG. 39, at step 1, the UE does DL synchronizations with TRPs, chooses one best DL TRP, and records all the detected SS block index from all the TRPs. At step 2, the UE does UL RACH with the best TRP and RRC connection is established with the best TRP. Uplink QCL information is also reported to the gNB if multi-panel at the UE is used. At step 3, the gNB configures uplink SRS resources via RRC signaling for the UE to do uplink SRS measurements. Based upon uplink QCL information, a pool of SRS resources (panel number, number of ports, periodicity, bandwidth etc.) are mapped to each panel.

In one embodiment for periodic SRS configuration, SRS resources are configured as below. A field of srs-Panel in In another embodiment for aperiodic SRS configuration, SRS resources are configure as below. A field of srs-Panel in SRS-ConfigAp IE is added to indicate panel number and number of ports in each panel is indicated by the field srs-AntennaPortAp.

```
SRS-ConfigAp-r10 ::= SEQUENCE {
    srs-AntennaPortAp-r10            SRS-AntennaPort,
srs-Panel SRS-Panel
    srs-BandwidthAp-r10              ENUMERATED {bw0, bw1,
                                         bw2, bw3},
    freqDomainPositionAp-r10         INTEGER (0..23),
    transmissionCombAp-r10           INTEGER (0..1),
    cyclicShiftAp-r10                ENUMERATED {cs0, cs1, cs2,
                                         cs3, cs4, cs5, cs6, cs7}
}
```

In FIG. 39, at step 4, the UE starts uplink SRS transmissions for each panel based upon the SRS resources configuration. At step 5, the gNB measures the uplink SRS timing of all the TRPs, and determines if additional TA is required. If the timing between any two TRPs is large, additional TA can be decided for the additional TRP. To minimize the complexity of the system, the gNB may also group the TAs, i.e., limiting the maximum number of TAs for each UE. The gNB configures additional RACH procedure for additional TA in association with the SS block index of another TRP.

If there are more panels available than allowed TA groups for the UE, the gNB can indicate via RRC signalling that which panels belong to the same TAG (Timing Advance Group) group. Only one RACH procedure for the panels belonging to the same TA group are configured and triggered by the gNB.

In one embodiment, RACH configuration for non-contention RACH can be as below. A field of srs-Panel in RACH-ConfigDedicated IE in RRC signalling is added to indicate panel number to do the non-contention RACH. The SS-Block-index is added to indicate which SS block index is used for the reference timing.

```
RACH-ConfigDedicated ::=    SEQUENCE {
    ra-PreambleIndex            INTEGER (0..63),
    ra-PRACH-MaskIndex          INTEGER (0..15)
    srs-Panel SRS-Panel
    SS-Block-index SS-Block-index
}
```

In another embodiment, RACH configuration for non-contention RACH can be as below. It is triggered by PDCCH order. A field of srs-Panel in RACH-ConfigDedicated IE is added to indicate panel number to do the non-contention RACH. The SS-Block-index is added to indicate which SS block index is used for the reference timing. The bits for the fields of srs-Panel and SS-Block-index can vary and thus not necessarily be 3 bits. In one example, preamble Index may be 6 bits, PRACH mask index may be 4 bits, srs-Panel may be 3 bits; and SS-Block-index may be 3 bits.

In FIG. 39, at step 6, the UE starts the additional RACH to another TRP. The uplink transmission timing is based upon the reference timing associated with the SS block index indicated by the gNB.

Figure 40:
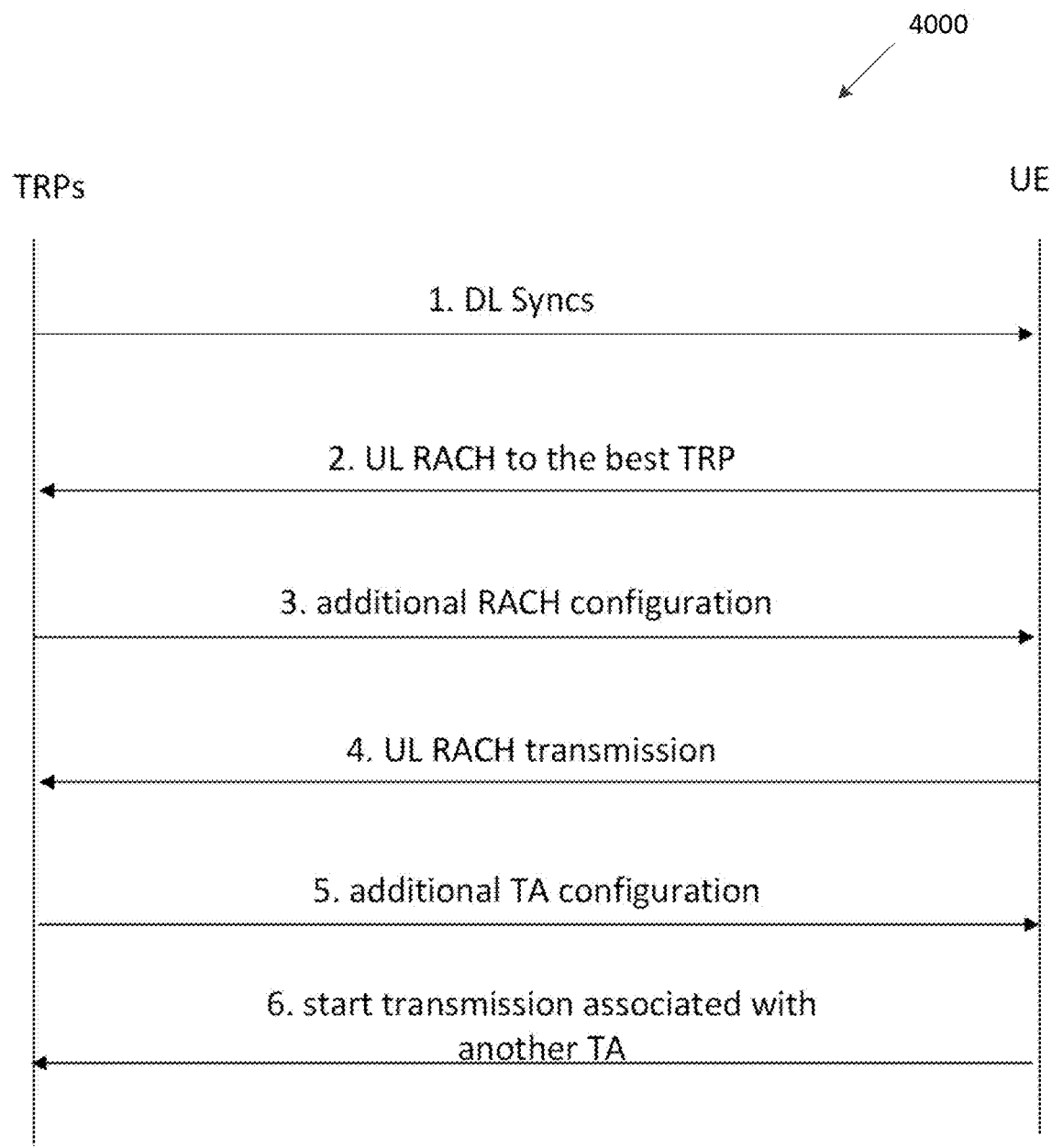
FIG. 40 illustrates another example multi-TA procedure according to embodiments of the present disclosure.

FIG. 40 illustrates another example multi-TA procedure 4000 according to embodiments of the present disclosure. An embodiment of multi-TA procedure 4000 shown in FIG. 40 is for illustration only. One or more of the components illustrated in FIG. 40 can be implemented in specialized circuitry configured to perform the noted functions or one or more of the components can be implemented by one or more processors executing instructions to perform the noted functions. Other embodiments are used without departing from the scope of the present disclosure.

In some embodiments, the multi-TA procedure is illustrated in FIG. 40. In FIG. 40, at step 1, the UE does DL synchronizations with TRPs, chooses one best DL TRP, and records SS block index for all the detected TRPs. At step 2, the UE does UL RACH with the best TRP and RRC connection is established with the best TRP. At step 3, the gNB configures additional uplink RACH procedure via RRC signaling for the UE to do additional RACH to the additional TRP.

In one embodiment, RACH configuration for non-contention RACH can be as below. A field of srs-Panel in RACH-ConfigDedicated IE in RRC signalling is added to indicate panel number to do the non-contention RACH. The SS-Block-index is added to indicate which SS block index is used for the reference timing.

```
RACH-ConfigDedicated ::=    SEQUENCE {
    ra-PreambleIndex            INTEGER (0..63),
    ra-PRACH-MaskIndex          INTEGER (0..15)
    SRS-Panel SRS-Panel
    SS-Block-index SS-Block-index
}
```

In another embodiment, RACH configuration for non-contention RACH can be as below. It is triggered by PDCCH order. A field of srs-Panel in RACH-ConfigDedicated IE is added to indicate panel number to do the non-contention RACH. The SS-Block-index is added to indicate which SS block index is used for the reference timing. In such embodiment, preamble index may be 6 bits; PRACH mask index may be 4 bits; srs-Panel may be 3 bits; and SS-block-index may be 3 bits.

In FIG. 40, at step 4, the UE starts uplink RACH transmissions. The uplink transmission timing is based upon the reference timing associated with the SS block index indicated by the gNB in the RACH configuration. At step 5, the gNB measures the uplink RACH timing, and determines if additional TA is required. If the timing between any two TRPs is large, additional TA can be decided for another TRP. The gNB configures additional TA in association with the SS block index of another TRP via RAR message or RRC signaling.

Figure 41:
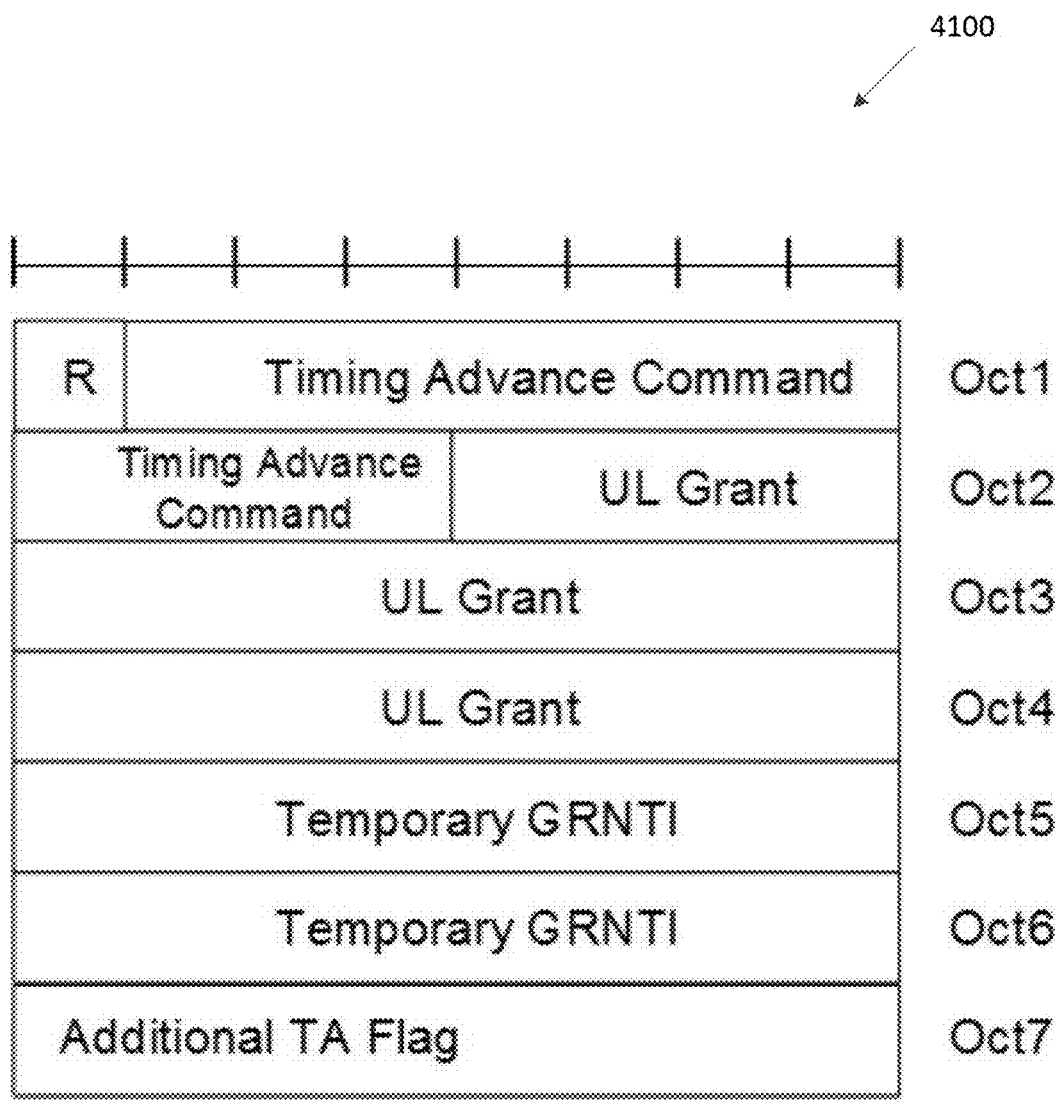
FIG. 41 illustrates an example TA configuration via RAR message according to embodiments of the present disclosure.

FIG. 41 illustrates an example TA configuration 4100 via RAR message according to embodiments of the present disclosure. An embodiment of the TA configuration 4100 shown in FIG. 41 is for illustration only. One or more of the components illustrated in FIG. 41 can be implemented in specialized circuitry configured to perform the noted functions or one or more of the components can be implemented by one or more processors executing instructions to perform the noted functions. Other embodiments are used without departing from the scope of the present disclosure.

In one embodiment, additional TA configuration via RAR message is as shown below in FIG. 41. A new TA flag is added in the RAR message to indicate if an additional TA is decided or not. The field of additional TA flag indicates if a new TA is triggered or an additional TA is used. The additional TA flag can also be the TAG group index. For example, if additional TA flag=1, it means the corresponding panel may use TAG group one. If additional TA flag=2, it means additional TA may be used when only TAG group 1 is used before.

In one embodiment, additional TA configuration is configured via RRC signaling, e.g., via RRC reconfiguration message. In FIG. 41, at step 6, the UE does transmission associated with another TA.

Figure 42:
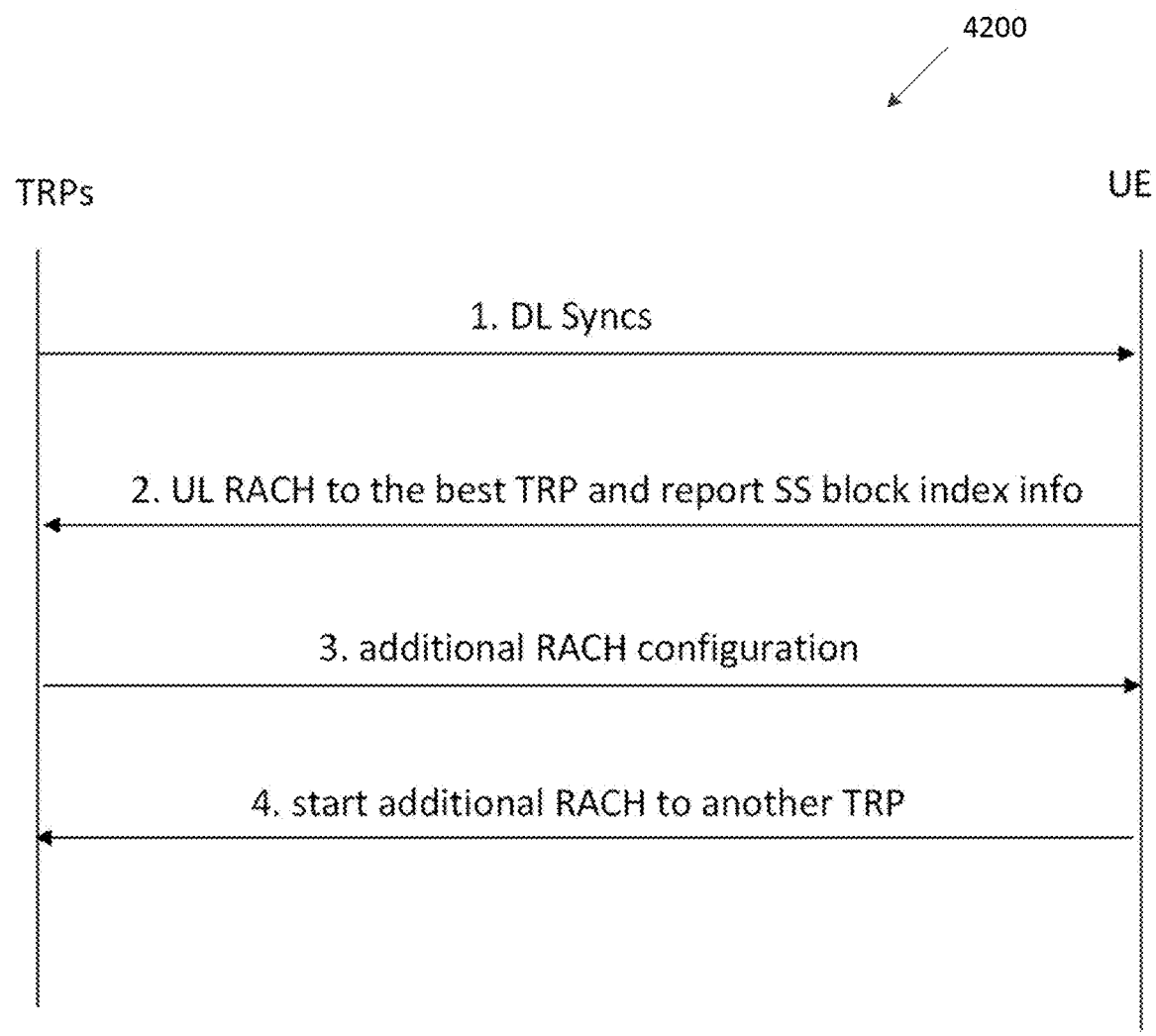
FIG. 42 illustrates yet another example multi-TA procedure according to embodiments of the present disclosure.

In one embodiment, the multi-TA procedure is illustrated in FIG. 42. In FIG. 42, at step 1, the UE does DL synchronizations with TRPs, chooses one best DL TRP, and records SS block index for all the TRPs. At step 2, the UE does UL RACH with the best TRP and RRC connection is established with the best TRP. The UE reports the sync info (panel number, SS block index, signal strength etc.) of all detected TRPs to the gNB.

FIG. 42 illustrates yet another example multi-TA procedure 4200 according to embodiments of the present disclosure. An embodiment of the multi-TA procedure 4200 shown in FIG. 42 is for illustration only. One or more of the components illustrated in FIG. 42 can be implemented in specialized circuitry configured to perform the noted functions or one or more of the components can be implemented by one or more processors executing instructions to perform the noted functions. Other embodiments are used without departing from the scope of the present disclosure.

In one embodiment for RRC signaling, the sync info may include panel number, SS block index, signal strength etc. RRC message can be RRC connection complete message. In FIG. 42, at step 3, the gNB determines if the timing between any two TRPs is large and additional TA can be decided for the additional TRP. If additional TA is required, the gNB configures additional RACH procedure for additional TA in association with the SS block index of another TRP. To minimize the complexity of the system, the gNB may group the TAs, i.e., limiting the maximum number of TAs for each UE.

If there are more panels available than allowed TA groups for the UE, the gNB can indicate via RRC signalling that which panels belong to the same timing advance group (TAG) group. Only one RACH procedure for the panels belonging to the same TA group are configured and triggered by the gNB.

In one embodiment, RACH configuration for non-contention RACH can be as below. A field of srs-Panel in RACH-ConfigDedicated IE in RRC signalling is added to indicate panel number to do the non-contention RACH. The SS-Block-index is added to indicate which SS block index is used for the reference timing.

```
RACH-ConfigDedicated ::=    SEQUENCE {
    ra-PreambleIndex            INTEGER (0..63),
    ra-PRACH-MaskIndex          INTEGER (0..15)
    srs-Panel SRS-Panel
    SS-Block-index SS-Block-index
}
```

In another embodiment, RACH configuration for non-contention RACH can be as below. It is triggered by PDCCH order. A field of srs-Panel in RACH-ConfigDedicated IE is added to indicate panel number to do the non-contention RACH. The SS-Block-index is added to indicate which SS block index is used for the reference timing. In one example, preamble index may be 6 bits; PRACH mask index may be 4 bits; srs-Panel may be 3 bits; and SS-block-index may be 3 bits. In FIG. 42, a step 4, the UE starts the additional RACH with additional TA to the TRP. The uplink transmission timing is based upon the reference timing associated with another SS block index indicated by the gNB.

Figure 43:
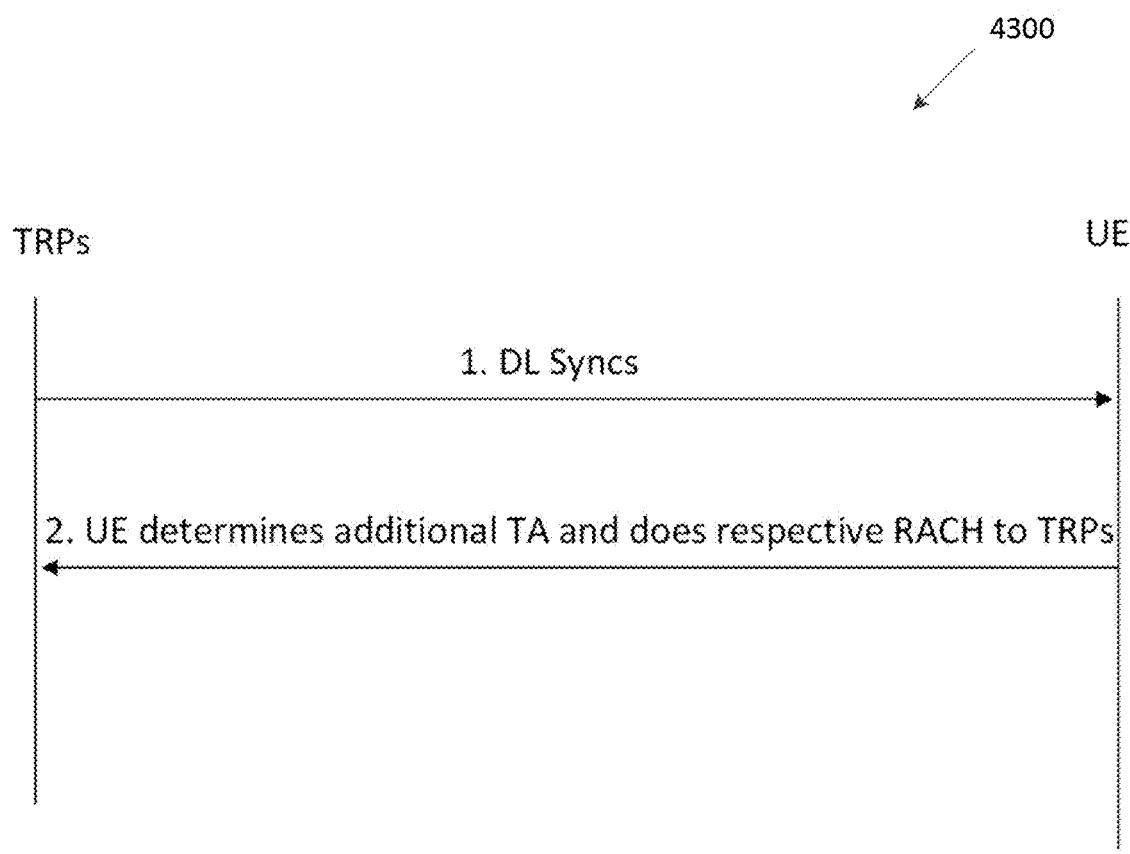
FIG. 43 illustrates yet another example multi-TA procedure according to embodiments of the present disclosure.

FIG. 43 illustrates yet another example multi-TA procedure 4300 according to embodiments of the present disclosure. An embodiment of the multi-TA procedure 4300 shown in FIG. 43 is for illustration only. One or more of the components illustrated in FIG. 43 can be implemented in specialized circuitry configured to perform the noted functions or one or more of the components can be implemented by one or more processors executing instructions to perform the noted functions. Other embodiments are used without departing from the scope of the present disclosure.

In one embodiment, the multi-TA procedure is illustrated in FIG. 43. In FIG. 43, at step 1, the UE does DL synchronizations with TRPs and records SS block index for all the detected TRPs. At step 2, the UE determines the timing information from all the SS block index of detected TRPs, and determines if additional TAs are required. If the timing between any two TRPs is large, separate TAs can be decided and the UE also does the TA grouping based upon the timing information from all the detected SS block index. The UE does separate UL RACH to these respective TRPs for each TAG group and RRC connection is established respectively.

In another embodiment, the combination of the aforementioned embodiments is considered. For example, the aforementioned embodiments are used together to determine whether an additional TA is required or not. It makes use of SRS measurements and additional RACH measurements jointly to determine whether the timing between any two TRPs is large enough to necessitate an additional TA operation.

The reason why SRS and RACH measurements can be taken into account together is as below: the CP in SRS sub-frames is not as large as the guard period used in RACH resources. So the dynamic timing range that SRS can detect and support is not as large as RACH. It is not sufficient to determine if additional TA is required or not solely based on SRS measurements; and SRS timing can be used to have a rough estimation of which TRP is required so that the gNB can configure additional RACH resource for UE transmission and measurement.

Figure 44:
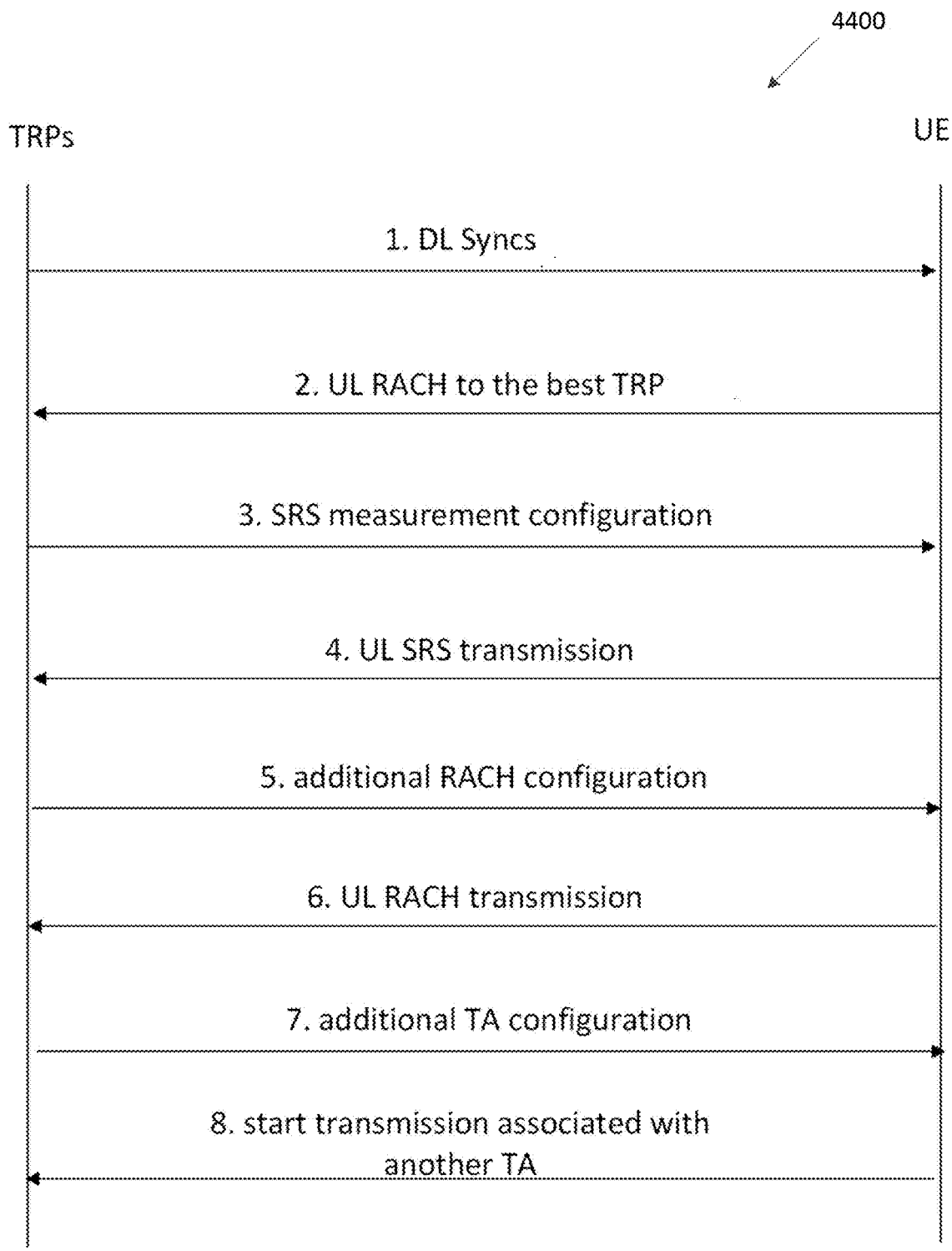
FIG. 44 illustrates yet another example multi-TA procedure according to embodiments of the present disclosure.

FIG. 44 illustrates yet another example multi-TA procedure 4400 according to embodiments of the present disclosure. An embodiment of the multi-TA procedure 4400 shown in FIG. 44 is for illustration only. One or more of the components illustrated in FIG. 44 can be implemented in specialized circuitry configured to perform the noted functions or one or more of the components can be implemented by one or more processors executing instructions to perform the noted functions. Other embodiments are used without departing from the scope of the present disclosure.

In FIG. 44, at step 1, the UE does DL synchronizations with TRPs, chooses one best DL TRP, and records all the detected SS block index from all the TRPs. At step 2, the UE does UL RACH with the best TRP and RRC connection is established with the best TRP. Uplink QCL information is also reported to the gNB if multi-panel at the UE is used. At step 3, the gNB configures uplink SRS resources via RRC signaling for the UE to do uplink SRS measurements. Based upon uplink QCL information, a pool of SRS resources (panel number, number of ports, periodicity, bandwidth etc.) are mapped to each panel. At step 4, the UE starts uplink SRS transmissions for each panel based upon the SRS resources configuration. At step 5, the gNB measures the uplink SRS timing of all the TRPs. If the timing between any two TRPs is large, additional RACH procedure for additional TA in association with the SS block index of another TRP is configured. At step 6, the gNB configures additional uplink RACH procedure via RRC signaling for the UE to do additional RACH to additional TRP. At step 7, the UE starts uplink RACH transmissions. The uplink transmission timing is based upon the reference timing associated with the SS block index indicated by the gNB in the RACH configuration. At step 8, the gNB measures the uplink RACH timing, and determines if additional TA is required. If the timing between any two TRPs is large, additional TA can be decided for another TRP. The gNB configures additional TA in association with the SS block index of another TRP via RAR message or RRC signaling.

To minimize the complexity of the system, the gNB may also group the TAs, i.e., limiting the maximum number of TAs for each UE. If there are more panels available than allowed TA groups for the UE, the gNB can indicate via RRC signalling that which panels belong to the same TAG (Timing Advance Group) group.

Figure 45:
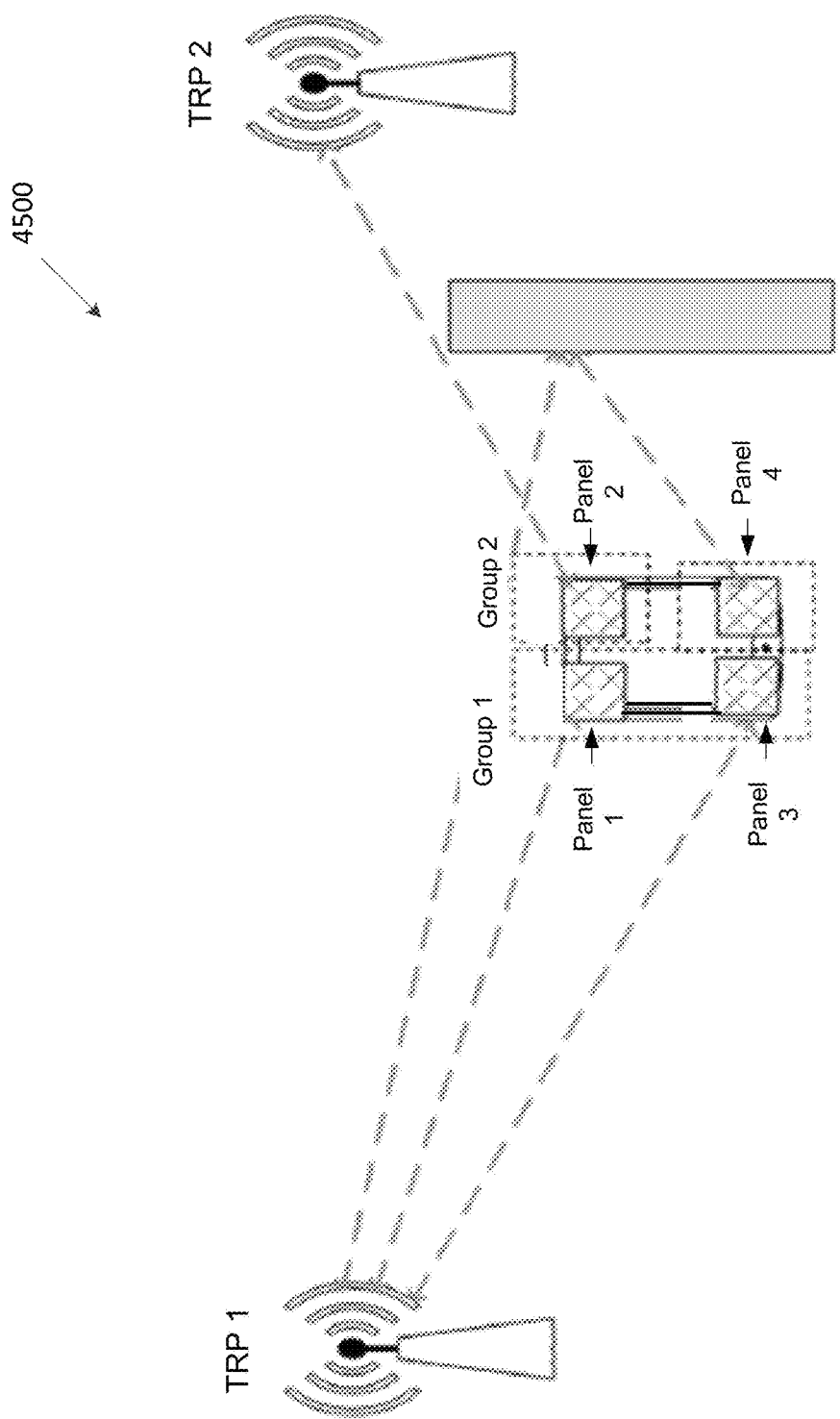
FIG. 45 illustrates an example multi-TA grouping maintenance according to embodiments of the present disclosure.

FIG. 45 illustrates an example multi-TA grouping maintenance 4500 according to embodiments of the present disclosure. An embodiment of the multi-TA grouping maintenance 4500 shown in FIG. 45 is for illustration only. One or more of the components illustrated in FIG. 45 can be implemented in specialized circuitry configured to perform the noted functions or one or more of the components can be implemented by one or more processors executing instructions to perform the noted functions. Other embodiments are used without departing from the scope of the present disclosure.

The aforementioned embodiments can also be used when dynamic TA Grouping is required due to the channel blockage, refection, UE movement and rotation etc. The gNB and UE can determine the updated multi-TA grouping based upon a series of measurements as shown in Multi-TA procedures section. For example, as shown below in FIG.

45, at the beginning, Panels 1 and 3 belong to the same TA group 1. Panels 2 and 4 belong to the other TA group 2. Later, Panel 4 is blocked from TRP2 and receives stronger signal from TRP1 than TRP2, and Panel 4 belongs to TA group 1 in this case.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) comprising:
    a transceiver configured to receive, from a base station (BS), channel state information reference signal (CSI-RS) configuration information comprising a physical cell identifier (PCID) of a cell, a CSI-RS subcarrier spacing, a measurement bandwidth for CSI-RSs, a density of the CSI-RSs, and a plurality of CSI-RS resource configurations for the CSI-RSs; and
    a processor operably connected to the transceiver, the processor configured to:
        determine whether the CSI-RS configuration information includes a synchronization signal (SS) block index associated with a CSI-RS resource configuration among the plurality of CSI-RS resource configurations,
        based on determining that the CSI-RS configuration information includes the SS block index associated with the CSI-RS resource configuration, identify that a timing of a CSI-RS indicated by the CSI-RS resource configuration is based on a timing of a cell corresponding to the SS block index, and
        perform a measurement on the CSI-RSs including on the CSI-RS based on the identified timing of the CSI-RS; and
    wherein the transceiver is configured to transmit measurement information obtained based on the measurement, and
    wherein the CSI-RS resource configuration includes slot configuration information for the CSI-RS configured by the CSI-RS resource configuration, a scrambling ID for the CSI-RS, quasi co-location (QCL) information for the CSI-RS, and time-frequency resource information for the CSI-RS.

2. The UE of claim 1, wherein the slot configuration information comprises a slot offset value for the CSI-RS.

3. The UE of claim 1, wherein the time-frequency resource information for the CSI-RS comprises at least one subcarrier of a CSI-RS resource within a physical resource block (PRB) and a starting orthogonal frequency division multiplexing (OFDM) symbol of the CSI-RS resource within a slot.

4. The UE of claim 3, wherein:
    the at least one subcarrier comprises a starting subcarrier of the CSI-RS resource, and
    one or more other subcarriers of the CSI-RS resource is determined based on the starting subcarrier of the CSI-RS resource.

5. The UE of claim 1, wherein the density of the CSI-RS s indicates a number of frequency-domain CSI-RS resource elements (REs) per resource block (RB) for each CSI-RS antenna port.

6. The UE of claim 1, wherein the QCL information indicates a synchronization signal (SS) block that is QCL'ed with the CSI-RS.

7. A base station (BS) comprising:
    a processor configured to generate channel state information-reference signal (CSI-RS) configuration information comprising a physical cell identifier (PCID) of a cell, a CSI-RS subcarrier spacing, a measurement bandwidth for CSI-RSs for, a density of the CSI-RSs, a plurality of CSI-RS resource configurations for the CSI-RSs, and a synchronization signal (SS) block index associated with a CSI-RS resource configuration among the plurality of CSI-RS resource configurations, wherein inclusion of the SS block index associated with the CSI-RS resource configuration in the CSI-RS configuration information indicates that a timing of a CSI-RS indicated by the CSI-RS resource configuration is based on a timing of a cell; and
    a transceiver operably connected to the processor, the transceiver configured to:
        transmit, to a user equipment (UE), the CSI-RS configuration information; and
        receive measurement information obtained based on measurement of the CSI-RS s including on the CSI-RS based on the indicated timing of the CSI-RS,
    wherein the CSI-RS resource configuration includes slot configuration information for the CSI-RS configured by the CSI-RS resource configuration, a scrambling ID for the CSI-RS, quasi co-location (QCL) information for the CSI-RS, and time-frequency resource information for the CSI-RS.

8. The BS of claim 7, wherein the slot configuration information comprises a slot offset value for the CSI-RS.

9. The BS of claim 7, wherein the time-frequency resource information for the CSI-RS comprises at least one subcarrier of a CSI-RS resource within a physical resource block (PRB) and a starting orthogonal frequency division multiplexing (OFDM) symbol of the CSI-RS resource within a slot.

10. The BS of claim 9, wherein:
    the at least one subcarrier comprises a starting subcarrier of the CSI-RS resource, and
    one or more other subcarriers of the CSI-RS resource is determined based on the starting subcarrier of the CSI-RS resource.

11. The BS of claim 7, wherein the density of the CSI-RS s indicates a number of frequency-domain CSI-RS resource elements (REs) per resource block (RB) for each CSI-RS antenna port.

12. The BS of claim 7, wherein the QCL information indicates a synchronization signal (SS) block that is QCL'ed with the CSI-RS.

13. A method of a user equipment (UE), the method comprising:
    receiving, from a base station (BS), channel state information reference signal (CSI-RS) configuration information comprising a physical cell identifier (PCID) of a cell, a CSI-RS subcarrier spacing, a measurement bandwidth for CSI-RSs, a density of the CSI-RSs, and a plurality of CSI-RS resource configurations for the CSI-RSs;
    determining whether the CSI-RS configuration information includes a synchronization signal (SS) block index associated with a CSI-RS resource configuration among the plurality of CSI-RS resource configurations, based on determining that the CSI-RS configuration information includes the SS block index associated with the CSI-RS resource configuration, identifying that a timing of a CSI-RS indicated by the CSI-RS resource configuration is based on a timing of a cell corresponding to the SS block index, and performing a measurement on the CSI-RSs including on the CSI-RS based on the identified timing of the CSI-RS; and transmitting measurement information obtained based on the measurement, wherein the CSI-RS resource configuration includes slot configuration information for the CSI-RS configured by the CSI-RS resource configuration, a scrambling ID for the CSI-RS, quasi co-location (QCL) information for the CSI-RS, and time-frequency resource information for the CSI-RS.

14. The method of claim 13, wherein the slot configuration information comprises a slot offset value for the CSI-RS.

15. The method of claim 13, wherein the time-frequency resource information for the CSI-RS comprises at least one subcarrier of a CSI-RS resource within a physical resource block (PRB) and a starting orthogonal frequency division multiplexing (OFDM) symbol of the CSI-RS resource within a slot.

16. The method of claim 15, wherein:
the at least one subcarrier comprises a starting subcarrier of the CSI-RS resource, and
one or more other subcarriers of the CSI-RS resource is determined based on the starting subcarrier of the CSI-RS resource.

17. The method of claim 13, wherein the density of the CSI-RSs indicates a number of frequency-domain CSI-RS resource elements (REs) per resource block (RB) for each CSI-RS antenna port.

18. The method of claim 14, wherein the QCL information indicates a synchronization signal (SS) block that is QCL'ed with the CSI-RS.

* * * * *